US012623407B2

(12) United States Patent
Zhang et al.

(10) Patent No.: US 12,623,407 B2
(45) Date of Patent: May 12, 2026

(54) CUSTOMIZED 3D PRINTING LENS DESIGN INTEGRATING VISIBLE-LIGHT OPTICAL COHERENCE TOMOGRAPHY

(71) Applicant: Northwestern University, Evanston, IL (US)

(72) Inventors: Pengpeng Zhang, Evanston, IL (US); Raymond S. Fang, Evanston, IL (US); Cheng Sun, Evanston, IL (US); Hao F. Zhang, Evanston, IL (US)

(73) Assignee: Northwestern University, Evanston, IL (US)

( * ) Notice: Subject to any disclaimer, the term of this patent is extended or adjusted under 35 U.S.C. 154(b) by 204 days.

(21) Appl. No.: 18/643,669

(22) Filed: Apr. 23, 2024

(65) Prior Publication Data

US 2024/0359407 A1 Oct. 31, 2024

Related U.S. Application Data

(60) Provisional application No. 63/461,779, filed on Apr. 25, 2023.

(51) Int. Cl.
*B29C 64/386* (2017.01)
*B29C 64/124* (2017.01)
(Continued)

(52) U.S. Cl.
CPC .......... *B29C 64/386* (2017.08); *B29C 64/124* (2017.08); *B29C 64/20* (2017.08);
(Continued)

(58) Field of Classification Search
CPC ................ B29C 64/124; B29C 64/129; B29C 64/135; B29C 64/386; B29C 64/393; B33Y 50/00; B33Y 50/02
See application file for complete search history.

(56) References Cited

U.S. PATENT DOCUMENTS

| 5,291,008 | A | 3/1994 | Havens et al. |
| 6,331,313 | B1 | 12/2001 | Wong et al. |

(Continued)

FOREIGN PATENT DOCUMENTS

| WO | WO 02/088830 | 11/2002 |
| WO | WO 2005/031400 | 4/2005 |

(Continued)

OTHER PUBLICATIONS

Funes-Lora et al. (2022) "Design of a segmented custom ankle foot orthosis with custom-made metal strut and 3D-printed footplate and calf shell," Prosthetics and Orthotics International, 46(1), 37-41.
(Continued)

*Primary Examiner* — Atul P. Khare
(74) *Attorney, Agent, or Firm* — Leydig, Voit & Mayer, Ltd.

(57) ABSTRACT

Provided herein are systems and methods for additive manufacture of a customized ocular contact lens for a subject in a fast and convenient manner. In various aspects disclosed herein, methods disclosed herein provide for the imaging of the outer surface of a subject's cornea, designing a customized ocular contact lens based on the data from the imaging of the cornea, including determining anterior and posterior surfaces of the ocular contact lens, manufacturing the ocular contact lens using additive manufacturing, verifying the fit of the customized ocular contact lens on the subject's cornea, and verifying the optical power of the customized ocular contact lens. These features allow for the fast and convenient production of an ocular contact lens customized to a subject's cornea and manufactured to a specified optical power.

25 Claims, 28 Drawing Sheets

PC: polarization controller
C: collimator
SM: scanning mirror
DM: dichroic mirror
CCD: CCD camera
TS: TOF sensor, M: mirror
DC: dispersion compensation

(51) Int. Cl.

| | |
|---|---|
| *B29C 64/20* | (2017.01) |
| *B29C 64/393* | (2017.01) |
| *B29D 11/00* | (2006.01) |
| *B33Y 10/00* | (2015.01) |
| *B33Y 30/00* | (2015.01) |
| *B33Y 50/00* | (2015.01) |
| *B33Y 50/02* | (2015.01) |
| *B33Y 80/00* | (2015.01) |
| *G02C 7/02* | (2006.01) |
| *G02C 7/04* | (2006.01) |
| *B29L 11/00* | (2006.01) |

(52) U.S. Cl.

CPC ...... *B29C 64/393* (2017.08); *B29D 11/00038* (2013.01); *B29D 11/00961* (2013.01); *B33Y 10/00* (2014.12); *B33Y 30/00* (2014.12); *B33Y 50/00* (2014.12); *B33Y 50/02* (2014.12); *B33Y 80/00* (2014.12); *G02C 7/027* (2013.01); *G02C 7/04* (2013.01); *G02C 7/047* (2013.01); *B29L 2011/0041* (2013.01)

(56) References Cited

U.S. PATENT DOCUMENTS

| | | | | |
|---|---|---|---|---|
| 7,303,853 | B2 | 12/2007 | Afromowitz | |
| 7,780,293 | B2 * | 8/2010 | Andino | G02C 7/028 |
| | | | | 351/212 |
| 8,216,308 | B2 | 7/2012 | Blake et al. | |
| 9,360,660 | B2 | 6/2016 | Yi et al. | |
| 9,442,095 | B2 | 9/2016 | Jiao et al. | |
| 9,513,260 | B2 | 12/2016 | Zhang et al. | |
| 9,619,903 | B2 | 4/2017 | Yi et al. | |
| 10,524,664 | B2 | 1/2020 | Liu et al. | |
| 10,750,943 | B2 | 8/2020 | Soetikno et al. | |
| 10,830,639 | B2 | 11/2020 | Urban et al. | |
| 11,635,607 | B2 | 4/2023 | Song et al. | |
| 12,285,909 | B2 * | 4/2025 | Chen | B33Y 10/00 |
| 2002/0099112 | A1 | 7/2002 | Turner et al. | |
| 2003/0119962 | A1 | 6/2003 | Border et al. | |
| 2004/0046287 | A1 | 3/2004 | Andino et al. | |
| 2004/0246440 | A1 | 12/2004 | Andino et al. | |
| 2007/0285799 | A1 | 12/2007 | Dreher et al. | |
| 2009/0250828 | A1 | 10/2009 | Rosen et al. | |
| 2009/0326651 | A1 | 12/2009 | Spoor et al. | |
| 2010/0245761 | A1 | 9/2010 | Widman et al. | |
| 2012/0083667 | A1 | 4/2012 | Isogai et al. | |
| 2013/0266326 | A1 | 10/2013 | Joseph et al. | |
| 2013/0313756 | A1 | 11/2013 | Chen et al. | |
| 2014/0277437 | A1 | 9/2014 | Currie | |
| 2016/0059487 | A1 | 3/2016 | DeSimone et al. | |
| 2018/0001581 | A1 | 1/2018 | Patel et al. | |
| 2018/0088048 | A1 | 3/2018 | Dong et al. | |
| 2018/0242844 | A1 | 8/2018 | Liu et al. | |
| 2019/0025476 | A1 | 1/2019 | Sun et al. | |
| 2019/0082952 | A1 | 3/2019 | Zhang et al. | |
| 2021/0016496 | A1 | 1/2021 | Chen et al. | |
| 2021/0346576 | A1 * | 11/2021 | Yang | B29C 64/20 |
| 2022/0063182 | A1 * | 3/2022 | Brown | B29D 11/00355 |
| 2024/0085670 | A1 | 3/2024 | Sun et al. | |

FOREIGN PATENT DOCUMENTS

| | | |
|---|---|---|
| WO | WO 2016/115369 | 7/2016 |
| WO | WO 2019/222605 | 11/2019 |

OTHER PUBLICATIONS

"ISO 18369-2:2017(en), Ophthalmic optics—Contact lenses—Part 2: Tolerances," can be found under https://www.iso.org/obp/ui/en/#iso:std:iso:18369:-2:ed-3:v1:en, n.d.

Alam et al. (2021) "3D Printed Contact Lenses," ACS Biomater. Sci. Eng. 7, 794.

Aono et al. (2000) "Development of large-aperture aspherical lens with glass molding," Advanced Optical Manufacturing and Testing Technology, 4231, 16.

Assia et al. (1992) "Side-view analysis of the lens. I. The crystalline lens and the evacuated bag," Arch Ophthalmol 110: 89-93.

Baker et al. (2012) "Microstereolithography of Three-Dimensional Polymeric Springs for Vibration Energy Harvesting," Smart Materials Research 2012: 1-9.

Birkhoff et al. (1978) "Optical and dielectric functions of liquid glycerol from gas photoionization measurements," The Journal of Chemical Physics, 69, 4185.

Calladine et al. (2012) "Multifocal versus monofocal intraocular lenses after cataract extraction," Cochrane Database Syst Rev 9: 67 pp.

Camposeo et al. (2019) "Additive Manufacturing: Applications and Directions in Photonics and Optoelectronics," Advanced Optical Materials, 7, 1800419.

Cazal et al. (2005) "Accommodative intraocular lens tilting," Am J Ophthalmol 140(2): 341-344.

Chang (2018) "Computer-Assisted Planning and 3D Printing-Assisted Modeling for Chin Augmentation," Aesthetic surgery journal, 38, 1.

Chen et al. (Mar. 2018) "High-speed 3D Printing Millimeter-Size Customized Aspheric Imaging Lenses with Sub 7 nm Surface Roughness", Advanced Materials, 30(18), 1705683.

Cook et al. (1993) "Bacterial adhesion to poly(HEMA)-based hydrogels," Journal of Biomedical Materials Research 27:119-126.

Cumpston et al. (1999) "Two-photon polymerization initiators for three-dimensional optical data storage and microfabrication," Nature 398, 51-54.

Dearnaley et al. (2005) "Biomedical applications of diamond-like carbon (DLC) coatings: A review," Surf Coat Tech, 200, 2518-2524.

Derby (2012) "Printing and Prototyping of Tissues and Scaffolds," Science, 338, 921-926.

Deubel et al. (2004) "Direct laser writing of three-dimensional photonic-crystal templates for telecommunications," Nat Mater, 3, 444.

Erdei et al.A42 (2004) "Tolerancing surface accuracy of aspheric lenses used for imaging purposes," Proc. SPIE 5249, Optical Design and Engineering, 718.

Ficzere (2021) "Effect of 3D Printing Direction on Manufacturing Costs of Automotive Parts," International journal for traffic and transport engineering, 11(1), DOI 10.7708/ijtte.2021.11(1).05.

Filho et al. (2004) "Design and Nomenclature of Contact Lenses," In: Contact Lenses in Ophthalmic Practice. Springer, New York, NY. doi: 10.1007/0-387-21758-4.

Fisher (1977) "The force of contraction of the human ciliary muscle during accommodation," J Physiol 270: 51-74.

Gatto et al. (2006) "High-performance coatings for micromechanical mirrors," Appl Optics, 45, 1602-1607.

Gissibl et al. (2016) "Sub-micrometre accurate free-form optics by three-dimensional printing on single-mode fibres," Nat Commun, 7, 11763.

Gissibl et al. (Jun. 2016) "Two-photon direct laser writing of ultracompact multi-lens objectives," Nat Photonics, 10, 554-560.

Globaldata Reports (2012) "The Global Intraocular Lens Market is Forecast to Reach $3.1 Billion by 2017," 2 pp.

Gong et al. (2008) "Au(Si)-filled $\beta$-Ga$_2$O$_3$ nanotubes as wide range high temperature nanothermometers," Appl Phys Lett, 92, 073101.

Gooi et al. (2012) "Review of Presbyopic IOLs: Multifocal and Accommodating IOLs," Int Ophthalmol Clin 52(2): p. 41-50.

Gul et al. (2018) "3D printing for soft robotics—a review," Science and technology of advanced materials, 19, 243.

Hai et al. (Jan. 2023) "3D Printing a Low-Cost Miniature Accommodating Optical Microscope," Advanced Materials, 35, 2208365.

He et al. (Feb. 2016) "Generation of Customizable Microwavy Pattern through Grayscale Direct Image Lithography," Scientific Reports, 6:21621.

Herkommer (Oct. 2014) "Advances in the design of freeform systems for imaging and illumination applications," Journal of Optics, 43, 261-268.

(56)         References Cited

OTHER PUBLICATIONS

Huang et al. (2021) "Conformal Geometry and Multimaterial Additive Manufacturing through Freeform Transformation of Building Layers," Advanced Materials, 33, 2005672.

Ianchulev et al. (Jan. 2014) "Intraoperative Refractive Biometry for Predicting Intraocular Lens Power Calculation after Prior Myopic Refractive Surgery," Ophthalmology 121: 56-60.

Jiao et al. (2010) "Photoacoustic ophthalmoscopy for in vivo retinal imaging," Opt Express 18(4): 3967-3972.

Jinabhai et al. (2012) "Optical quality for keratoconic eyes with conventional RGP lens and simulated, customised contact lens corrections: a comparison," Ophthalmic & Physiological Optics, 32, 200.

Katsoulos et al. (2009) "Customized hydrogel contact lenses for keratoconus incorporating correction for vertical coma aberration," Ophthalmic and Physiological Optics, 29, 321.

Kawata et al. (2001) "Finer features for functional microdevices," Nature, 412, 697.

Keate et al. (Aug. 2022) "3D-Printed Electroactive Hydrogel Architectures with Sub-100 μm Resolution Promote Myoblast Viability," Macromolecular Bioscience, 22, 2200103.

Kopecek (2009) "Hydrogels: From Soft Contact Lenses and Implants to Self-Assembled Nanomaterials," Journal of Polymer Science: Part A: Polymer Chemistry 47:5929-5946.

Kotz et al. (Apr. 2017) "Three-dimensional printing of transparent fused silica glass," Nature, 544, 337-339.

Kubal (2011) "Multifocal Versus Accommodating Intraocular Lenses: A Review of the Current Technology, Outcomes, and Complications," Int Ophthalmol Clin 51(2): 131-141.

Laronda et al. (May 2017) "A bioprosthetic ovary created using 3D printed microporous scaffolds restores ovarian function in sterilized mice," Nat Commun, 8:15261.

Lee et al. (2000) "Processing of Organic/Inorganic Composites by Stereolithography," Mater. Res. Soc. Symp. Proc. 625, 165.

Li et al. (2005) "Photopolymerization of HEMA/DEGDMA hydrogels in solution," Polymer 46:11540-11547.

Li et al. (Mar. 2022) "3D-Printed Micro Lens-in-Lens for In Vivo Multimodal Microendoscopy," Small, 18, 2107032.

Liu et al. (2013) "Automatic retinal vessel segmentation based on active contours method in Doppler spectral-domain optical coherence tomography," J Biomed Opt 18(1): 016002, 4 pp.

Loke et al. (2019) "Structured multimaterial filaments for 3D printing of optoelectronics," Nat Commun, 10, 4010.

Loughnan (1997) "Intraocular lens materials and styles," Australian and New Zealand Journal of Ophthalmology 25: 251-251.

Malinauskas et al. (2013) "Ultrafast laser nanostructuring of photopolymers: A decade of advances," Physics Reports, 533, 1.

Malitson (1965) "Interspecimen Comparison of the Refractive Index of Fused Silica," Journal of the Optical Society of America 55, 1205-1209.

Marcos et al. (Jan. 2014) "Three-Dimensional Evaluation of Accommodating Intraocular Lens Shift and Alignment In Vivo," Ophthalmology 121(1): 45-55.

Marsack et al. (2007) "On-eye Performance of Custom Wavefrontguided Soft Contact Lenses in a Habitual Soft Lens-wearing Keratoconic Patient," J Refract Surg, 23, 960.

Menapace et al. (2007) "Accommodating intraocular lenses: a critical review of present and future concepts," Graefe's Arch Clin Exp Ophthalmol 245: 473-489.

Efron et al. (2011) "Development of Contact Lenses from a Biomaterial Point of View—Materials, Manufacture, and Clinical Application," Comprehensive Biomaterials (Ed.: P. Ducheyne), Elsevier, Oxford, pp. 517-541.

Nguyen et al. (2017) "3D-Printed Transparent Glass," Advanced Materials, 29, 1701181.

O'Brien (2003) "Advances in Intraocular Lens Materials and Designs: Maximizing Biocompatibility and Optical Performance," Ophthalmologica 217(Suppl 1):5-18; discussion 42.

Ong et al. (May 2014) "Accommodative intraocular lens versus standard monofocal intraocular lens implantation in cataract surgery," Cochrane Database Syst Rev 2014, 5: CD009667, 38 pp.

Pan et al. (2012) "Smooth surface fabrication in mask projection based stereolithography," Journal of Manufacturing Processes 14:460-470.

Pan et al. (Oct. 2016) "Meniscus process optimization for smooth surface fabrication in Stereolithography" Additive Manufacturing, vol. 12, Part B, 321-333.

Pan et al. (Sep. 2015) "Smooth Surface Fabrication Based on Controlled Meniscus and Cure Depth in Microstereolithography," Journal of Micro and Nano-Manufacturing, 3, 031001.

Perez-Merino et al. (May 2014) "Aberrometry in Patients Implanted With Accommodative Intraocular Lenses," Am J Ophthalmol 157(5): 1077-1089.e1.

Raman et al. (Mar. 2016) "High-Resolution Projection Microstereolithography for Patterning of Neovasculature," Adv. Healthcare Mater., 5, 610.

Rathi et al. (2013) "Contact lens in keratoconus," Indian J Ophthalmol, 61, 410.

Read et al. (2011) "Dynamic Contact Angle Analysis of Silicone Hydrogel Contact Lenses," Journal of Biomaterials Applications, 26(1) 85-99.

Rheims et al. (1997) "Refractive-index measurements in the near-IR using an Abbe refractometer," Meas Sci Technol, 8, 601.

Roach et al. (2012) "Eyes on Europe: New Options in Multifocal IOLs," AAO Newsletter, 16 pp.

Rogers et al. (2004) "Realization of refractive microoptics through grayscale lithographic patterning of photosensitive hybrid glass," Optics Express, vol. 12, No. 7; 1294-1303.

Sabesan et al. (2007) "Vision improvement by correcting higher-order aberrations with customized soft contact lenses in keratoconic eyes," Opt. Lett., OL, 32, 1000.

Sager et al. (2008) "Use of parameter estimation for stereolithography surface finish improvement," Rapid Prototyping Journal, 14, 213-220.

Samy et al. (2015) "Simplified compact fisheye lens challenges and design," J Opt, 44, 409-416.

Schaedler et al. (2011) "Ultralight Metallic Microlattices," Science, 334, 962-965.

Shao et al. (2020) "3D Printing Customized Optical Lens in Minutes," Advanced Optical Materials, 8, 1901646.

Shapiro et al. (2016) "Additive Manufacturing for Aerospace Flight Applications," Journal of Spacecraft and Rockets, 53, 952.

Sheppard et al. (2010) "Accommodating intraocular lenses: a review of design concepts, usage and assessment methods," Clin Exp Optom 93: 441-452.

Shu et al. (2017) "Visible-light optical coherence tomography: a review," J Biomed Opt, 22, 121707.

Song et al. (2012) "Integrating photoacoustic ophthalmoscopy with scanning laser ophthalmoscopy, optical coherence tomography, and fluorescein angiography for a multimodal retinal imaging platform," J Biomed Opt 17(6): 061206, 7 pp.

Song et al. (publicly available Oct. 2014) "A combined method to quantify the retinal metabolic rate of oxygen using photoacoustic ophthalmoscopy and optical coherence tomography," Sci Rep (2015) 4: 6525, pp. 1-7.

Sun et al. (2002) "Experimental and numerical investigations on microstereolithography of ceramics," Journal of Applied Physics 92(8):4796-4802.

Sun et al. (2002) "The influences of the material properties on ceramic micro- stereolithography," Sensors and Actuators A: Physical 101:364-370.

Sun et al. (2005) "Projection micro-stereolithography using digital micro-mirror dynamic mask," Sensors and Actuators A: Physical 121:113-120.

Sun et al. (2019) "3D Printing for Low-cost, Rapid Prototyping of Eyelid Crutches," Orbit (Amsterdam), 38, 342.

Tao et al. (Feb. 2014) "Annealing of Compression Molded Aspherical Glass Lenses," J Manuf Sci Eng., 136(1): 011008.

Thiele et al. (Feb. 2017) "3D-printed eagle eye: Compound microlens system for foveated imaging," Sci Adv, 3.

(56)          References Cited

OTHER PUBLICATIONS

Tomas-Juan et al. (publicly available Sep. 2014) "Axial movement of the dual-optic accommodating intraocular lens for the correction of the presbyopia: Optical performance and clinical outcomes," J Optom (2015) 8: 67-76.

Tseng et al. (2012) "Risk of Fractures Following Cataract Surgery in Medicare Beneficiaries," JAMA 308(5): 493-501.

Tumbleston et al. (2015) "Continuous liquid interface production of 3D objects," Science, 347, 1349.

Turner et al. (2013) "Miniature chiral beamsplitter based on gyroid photonic crystals," Nat Photonics, 7, 801.

Van Lith et al. (Oct. 2016) "3D-Printing Strong High-Resolution Antioxidant Bioresorbable Vascular Stents," Adv. Mater. Technol., 1, 1600138.

Van Meerbergen et al. (2002) "A Hierarchical Symmetric Stereo Algorithm Using Dynamic Programming," International Journal of Computer Vision 47(1/2/3): 275-285.

Wei et al. (2011) "Image chorioretinal vasculature in albino rats using photoacoustic ophthalmoscopy," J Mod Opt 58(21): 1997-2001.

Werner (2008) "Biocompatibility of intraocular lens materials," Curr Opin Ophthalmol 19: 41-49.

Wilkins et al. (2013) "Randomized Trial of Multifocal Intraocular Lenses versus Monovision after Bilateral Cataract Surgery," Ophthalmology 120(12): 2449-2455.e1.

Wong et al. (2012) "A Review of Additive Manufacturing," ISRN Mechanical Engineering 2012, Article ID 208760.

Wu et al. (2014) "Bioinspired Fabrication of High-Quality 3D Artificial Compound Eyes by Voxel-Modulation Femtosecond Laser Writing for Distortion-Free Wide-Field-of-View Imaging," Advanced Optical Materials, 2, 751.

Yang et al. (Apr. 2017) "In vivo imaging of neural activity," Nat Methods, 14, 349.

Yi et al. (2013) "Visible-light optical coherence tomography for retinal oximetry," Opt Lett. 38(11):1796-1798.

Yi et al. (publicly available Sep. 2014) "In vivo functional microangiography by visible-light optical coherence tomography," Biomed Opt Express 5:3603-3612 (published Oct. 2014).

Yi et al. (Sep. 2015) "Visible light optical coherence tomography measures retinal oxygen metabolic response to systemic oxygenation," Light: Science & Applications 4: e334, pp. 1-10.

Zare et al. (2021) "pHEMA: An Overview for Biomedical Applications," International Journal of Molecular Sciences, 22, 6376.

Zhang et al. (1999) "Micro-stereolithography of polymeric and ceramic microstructures," Sensors and Actuators A: Physical 77:149-156.

Zhang et al. (2021) "Suppressing the Step Effect of 3D Printing for Constructing Contact Lenses," Advanced Materials, 34, 2107249.

Zhang et al. (Apr. 23-27, 2023) "Abstract: OCT Imaging-driven 3D Printing of Customized Contact Lens," ARVO Annual Meeting Abstract, held in New Orleans, LA.

Zhang et al. (Jan. 31, 2024) "OCT Imaging-driven 3D Printing of Customized Contact Lens", Proc. SPIE PC12830, Optical Coherence Tomography and Coherence Domain Optical Methods in Biomedicine XXVIII, PC128302F; https://doi.org/10.1117/12.3005468.

Zhao et al. (2019) "An approach for simulating the fitting of rigid gas-permeable contact lenses using 3D printing technology," Contact Lens and Anterior Eye, 42, 165.

Zheng et al. (Jun. 2014) "Ultra-light, Ultra-stiff Mechanical Metamaterials," Science, 344, 1373-1377.

Zheng et al. (Oct. 2016) "Multiscale metallic metamaterials," Nat Mater, 15, 1100.

Zhou et al. (2011) "Hiding a Realistic Object Using a Broadband Terahertz Invisibility Cloak," Sci Rep. 1: 78, 1-5.

Zhou et al. (Apr. 2016) "Additive Manufacturing of a 3D Terahertz Gradient-Refractive Index Lens," Advanced Optical Materials, 4, 1034-1040.

* cited by examiner

Figure 1:
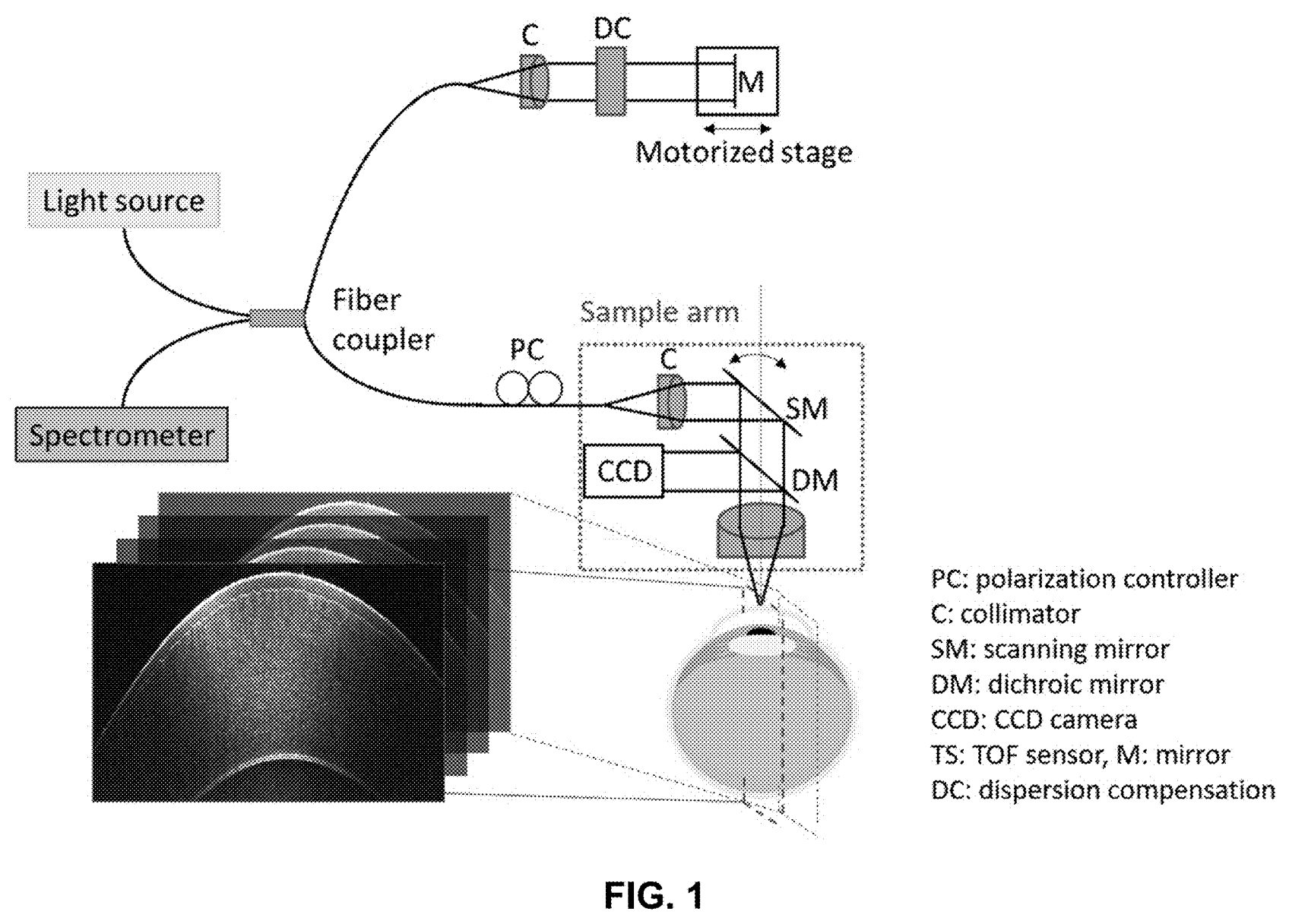

PC: polarization controller
C: collimator
SM: scanning mirror
DM: dichroic mirror
CCD: CCD camera
TS: TOF sensor, M: mirror
DC: dispersion compensation

OCT image

Designed contact lens

Slicing image for 3D printing

From OCT images to printable images

PC: polarization controller
C: collimator
SM: scanning mirror
DM: dichroic mirror
CCD: CCD camera
M: mirror
DC: dispersion compensation

Scanning (vis – OCT)

Quality inspection

Fabrication (μCLIP)

FIG. 7B
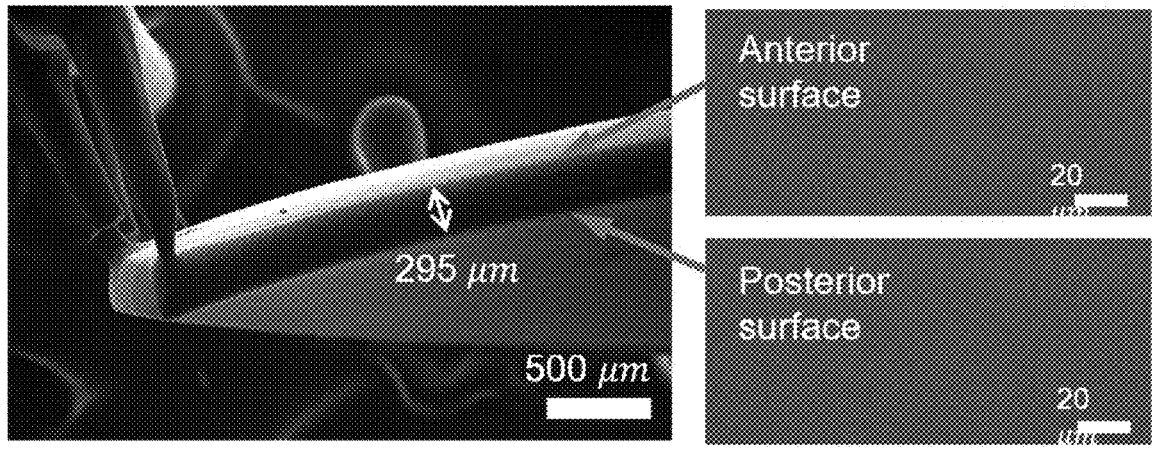
FIG. 7A        FIG. 7C
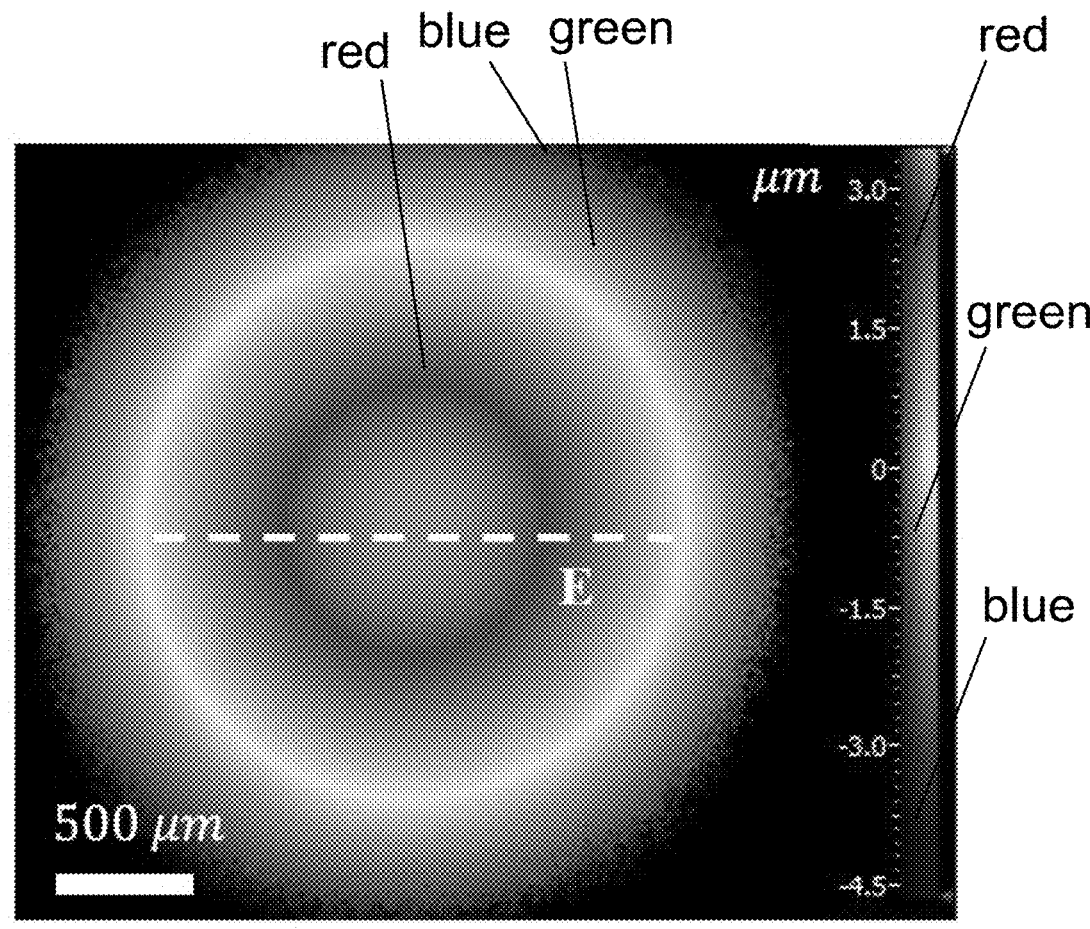
FIG. 7D

FIG. 7E
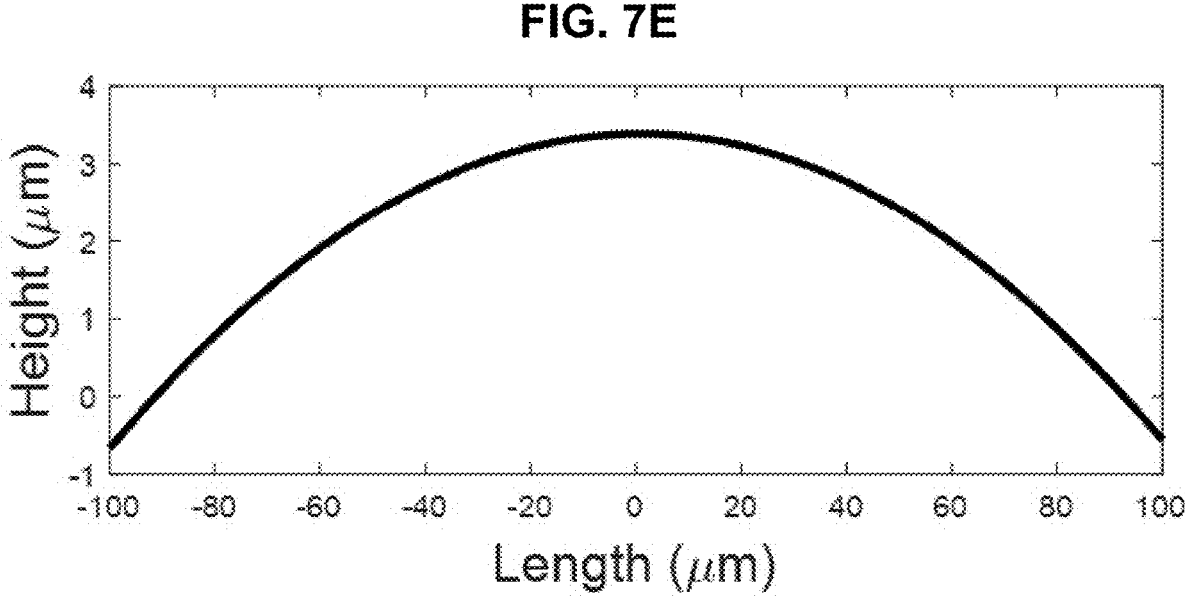
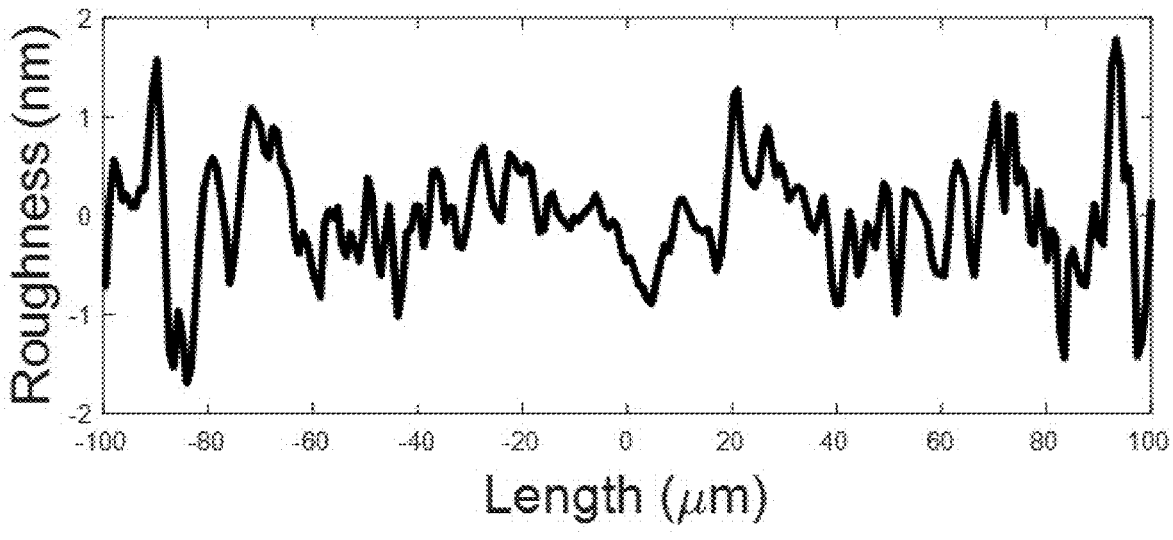
FIG. 7F

Anterior Surface

3D Printed Contact Lens

Posterior surface

Cornea top surface

200 μm 5 mm 5 mm

OCT Imaging

Contact lens

Pig Eyeball

| Step 1 Acquisition of customized Profile | Step 2 Lens Design | Step 3 3D Printing | Step 4 Final Validation |
|---|---|---|---|
FIG. 9
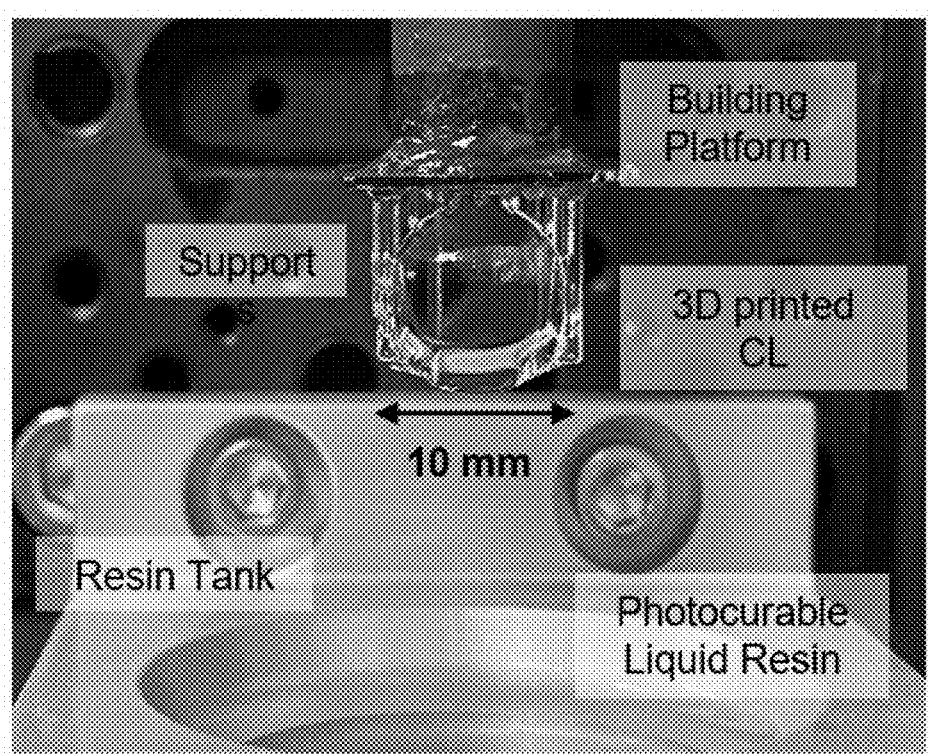
FIG. 10A
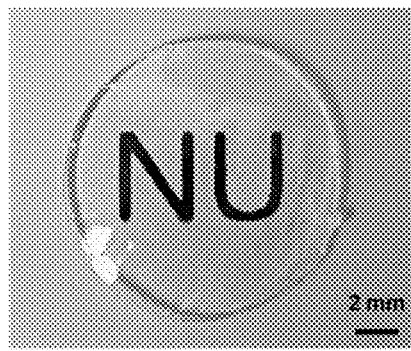
FIG. 10B

Given as mean±SD, n=5

Given as mean±SD, n=5

$$RMS = 9.7582\ nm$$

FIG. 15

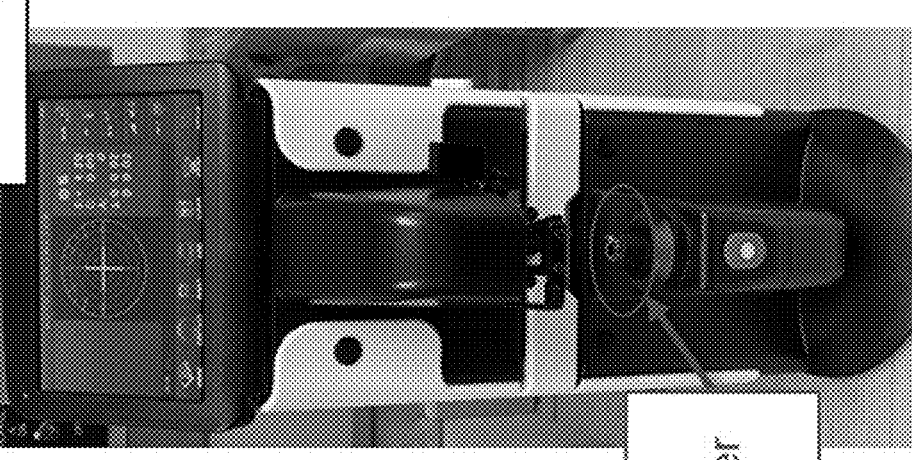
3DP CL's power was measured via a lensometer
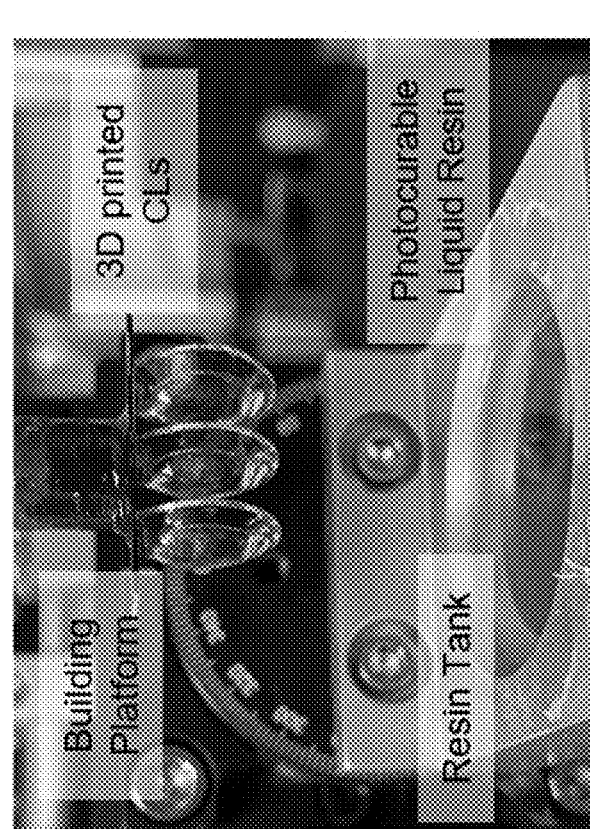
Building Platform
3D printed CLs
Photocurable Liquid Resin
Resin Tank
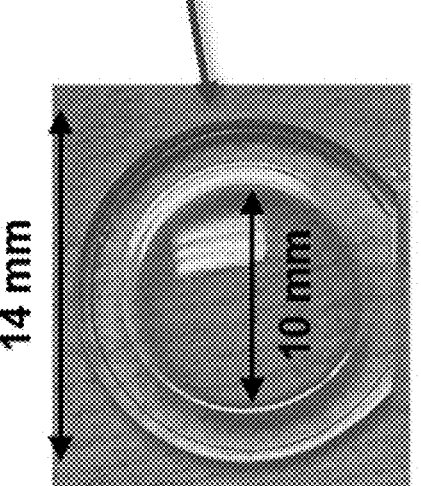
3DP CL with designed power of +4D
14 mm
10 mm
FIG. 17A

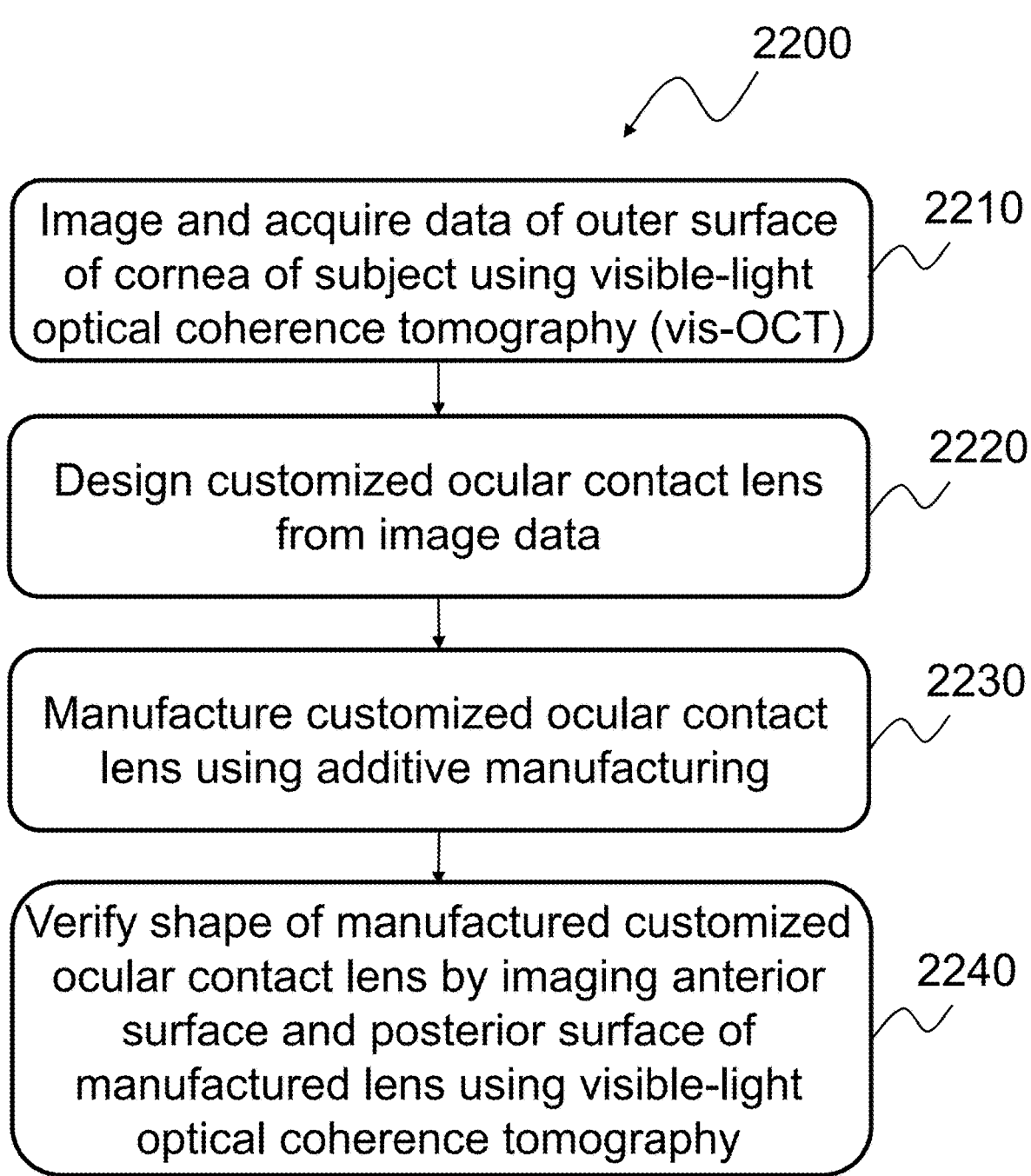

2200

2210
Image and acquire data of outer surface of cornea of subject using visible-light optical coherence tomography (vis-OCT)

2220
Design customized ocular contact lens from image data

2230
Manufacture customized ocular contact lens using additive manufacturing

2240
Verify shape of manufactured customized ocular contact lens by imaging anterior surface and posterior surface of manufactured lens using visible-light optical coherence tomography

FIG. 19

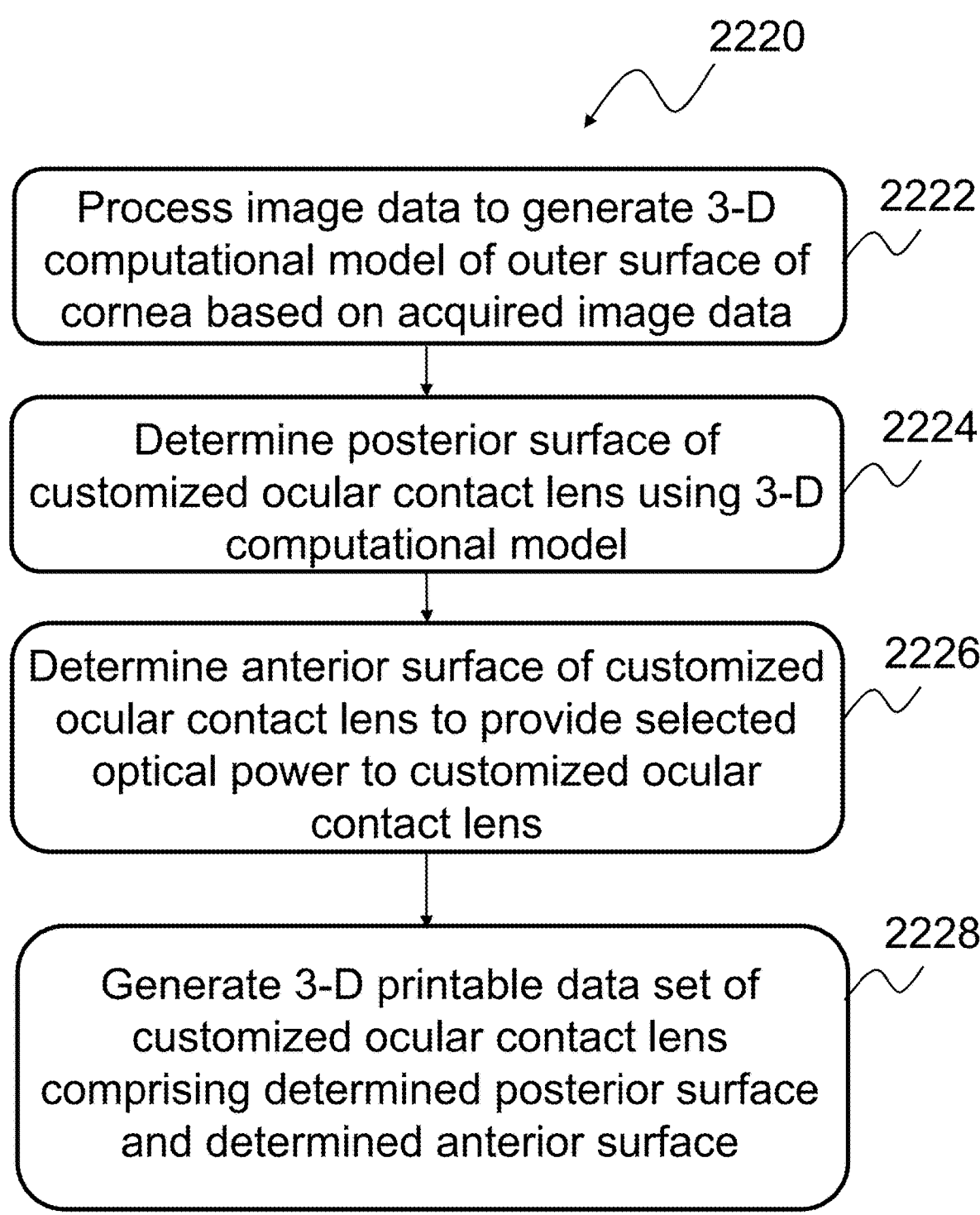

2220

Process image data to generate 3-D computational model of outer surface of cornea based on acquired image data — 2222

Determine posterior surface of customized ocular contact lens using 3-D computational model — 2224

Determine anterior surface of customized ocular contact lens to provide selected optical power to customized ocular contact lens — 2226

Generate 3-D printable data set of customized ocular contact lens comprising determined posterior surface and determined anterior surface — 2228

FIG. 20

Simple
design

Flat
border

Positive
border

Lenticular with
negative border

CUSTOMIZED 3D PRINTING LENS DESIGN INTEGRATING VISIBLE-LIGHT OPTICAL COHERENCE TOMOGRAPHY

CROSS-REFERENCE TO RELATED APPLICATIONS

This application claims the benefit of priority to U.S. Provisional Patent Application No. 63/461,779, filed Apr. 25, 2023, which is hereby incorporated by reference in its entirety.

STATEMENT REGARDING FEDERALLY SPONSORED RESEARCH OR DEVELOPMENT

This invention was made with government support under grant number EY034033 awarded by the National Institutes of Health. The government has certain rights in the invention.

BACKGROUND OF INVENTION

Additive manufacturing (AM), commonly known as three-dimensional (3D) printing, has undergone significant advancements. The ability to construct intricate and complex geometries with additive methods and directly translate the design model to the final product has not only enhanced design possibilities, but has also significantly reduced production costs and time, making AM an attractive option to be applied in a myriad of fields. Notably, AM revolutionized optical manufacturing processes by enabling the construction of complex geometries and design possibilities. Two-photon polymerization, as one of the highest spatial resolution 3D printing techniques which can achieve a sub-100 nm voxel resolution, has been demonstrated to fabricate micro- and nano-optics with complex lens design, however the application of two-photon polymerization was practically limited to produce microlenses due to its rather slow "point-by-point" fabrication nature.

SUMMARY OF THE INVENTION

Provided herein are systems and methods for additive manufacture of an ocular device in a fast and convenient manner, such as a ocular contact lens customized for a subject. In various aspects disclosed herein, methods disclosed herein provide for the imaging of the outer surface of a subject's cornea, designing a customized ocular contact lens based on the data from the imaging of the cornea, including determining anterior and posterior surfaces of the ocular contact lens, manufacturing the ocular contact lens using additive manufacturing, verifying the fit of the customized ocular contact lens on the subject's cornea, and verifying the optical power of the customized ocular contact lens. These features allow for the fast and convenient production of an ocular contact lens customized to a subject's cornea and manufactured to a specified optical power.

Aspects disclosed herein include a method for additive manufacture of a customized ocular contact lens for a subject, the method comprising steps of: imaging and acquiring image data of an outer surface of a cornea of the subject using visible-light optical coherence tomography (vis-OCT); designing the customized ocular contact lens from the image data; manufacturing the customized ocular contact lens using additive manufacturing based on the a 3-D printable data set of the customized ocular contact lens; and verifying a shape of the manufactured customized ocular contacts lens by imaging the anterior surface and posterior surface of the manufactured customized ocular contact lens using vis-OCT.

Aspects disclosed herein include a method for additive manufacture of a customized ocular contact lens for a subject, wherein designing the customized ocular contact lens from the image data comprises: processing the image data to generate a 3-D computational model of the outer surface of the cornea based on the acquired image data; determining a posterior surface of the customized ocular contact lens using the 3-D computational model; determining an anterior surface of the customized ocular contact lens to provide a selected optical power to the customized ocular contact lens; and generating a 3-D printable data set of the customized ocular contact lens comprising the determined posterior surface and the determined anterior surface.

Aspects disclosed herein include the method of any of the previous aspects, wherein imaging the anterior surface and the posterior surface of the manufactured customized ocular contact lens comprises imaging the anterior surface and posterior surface of the manufactured customized ocular contact lens when the manufactured customized ocular contact lens is wet.

Aspects disclosed herein include the method of any one of the previous aspects, wherein imaging the anterior surface and posterior surface of the manufactured customized ocular contact lens comprises imaging the anterior surface and posterior surface of the manufactured customized ocular contact lens when the manufactured customized ocular contact lens is suspended in a liquid. In some aspects, the liquid is water, oil, or diluted intralipid.

Aspects disclosed herein include the method of any one of the previous aspects, wherein imaging the anterior surface and posterior surface of the manufactured customized ocular contact lens comprises imaging the anterior surface and posterior surface of the manufactured customized ocular contact lens when the manufactured customized ocular contact lens is positioned on and in contact with the cornea of the subject.

Aspects disclosed herein include the method of any one of the previous aspects, wherein at least one of the steps of processing the image data, determining the posterior surface, determining the anterior surface, generating the 3-D printable data set, and manufacturing is performed computationally and automatically without human intervention.

Aspects disclosed herein include the method of any one of the previous aspects, wherein each of the steps of processing the image data, determining the posterior surface, determining the anterior surface, generating the 3-D printable data set, and manufacturing is performed computationally and automatically without human intervention.

Aspects disclosed herein include the method of any one of the previous aspects, wherein generating the 3-D printable data set comprises adding support structures to the 3-D printable data set. In some aspects, the support structures are physically connected to the customized ocular contact lens at an edge of the customized ocular contact lens. In some aspects, the support structures are configured to be removed from the customized ocular contact lens. In some aspects, removal of the support structures does not damage the customized ocular contact lens.

Aspects disclosed herein include the method of any one of the previous aspects, wherein generating the 3-D printable data set comprises generating high-resolution slicing images of the 3-D printable data set. In some aspects, generating the 3-D printable data set comprises generating at least 1000 high-resolution imaging slices of the 3-D printable data set. In some aspects, the high-resolution slicing images of the 3-D printable data set have a thickness selected from the range of 5 to 10 μm Aspects disclosed herein include the method of any one of the previous aspects, wherein sharp corners are computationally and automatically removed from the 3-D printable data set.

Aspects disclosed herein include the method of any one of the previous aspects, wherein the vis-OCT is characterized by an axial resolution less than or equal to 19 μm. In some aspects, the vis-OCT is characterized by an axial resolution less than or equal to 20 μm, 15 μm, 10 μm, 5 μm, or 2 μm.

Aspects disclosed herein include the method of any one of the previous aspects, wherein the vis-OCT is characterized by a lateral resolution less than or equal to 8 μm. In some aspects, the vis-OCT is characterized by a lateral resolution less than or equal to 10 μm.

Aspects disclosed herein include the method of any one of the previous aspects, wherein processing the image data to generate a 3-D computational model of the outer surface of the cornea comprises: translating the data into binarized images; using a Sobel edge detection function to delineate the cornea from the binarized images; and using a surface fit function to generate the 3-D computational model of the outer surface of the cornea.

Aspects disclosed herein include the method of any one of the previous aspects, wherein the selected optical power is selected from the range of −6D to +6D. In some aspects, the selected optical power is selected from the range of −10D to +10D, −7D to +7D, −5D to +5D, −4D to +4D, −3D to +3D, −2D to +2D, or −1D to +1D.

Aspects disclosed herein include the method of any one of the previous aspects, wherein the posterior surface is determined to have the same shape as the 3-D computational model.

Aspects disclosed herein include the method of any one of the previous aspects, wherein a best-fit spherical shape is generated based on the 3-D computational model, and the best-fit spherical shape is used to design the customized ocular contact lens.

Aspects disclosed herein include the method of any one of the previous aspects, wherein the anterior surface is determined using the lensmaker equation.

Aspects disclosed herein include the method of any one of the previous aspects, wherein the step of designing comprises determining one or more edge surfaces connecting the anterior surface with the posterior surface. In some aspects, the one or more edge surfaces comprise a simple design, a flat border, a positive border, or a lenticular with negative border.

Aspects disclosed herein include the method of any one of the previous aspects, wherein the additive manufacturing comprising projection micro-stereolithography (PμSL), micro-continuous liquid interface production (μCLIP), digital light processing (DLP), or any combination thereof.

Aspects disclosed herein include the method of any one of the previous aspects, wherein the additive manufacturing manufactures the customized ocular contact lens in a vertical orientation, such that each of a majority of printable layers of the customized ocular contact lens comprise a portion of both the posterior surface and the anterior surface. In some aspects, each of at least 60%, 70%, 80%, 90%, 95%, or 99% of the printable layers of the customized ocular contact lens comprises a portion of both the posterior surface and the anterior surface.

Aspects disclosed herein include the method of any one of the previous aspects, wherein the entire method is completed within 30 minutes or less. In some aspects, the entire method is completed within 25 minutes or less, or within 23 minutes or less.

Aspects disclosed herein include the method of any one of the previous aspects, wherein the steps of processing the image data, determining the posterior surface, determining the anterior surface, generating the 3-D printable data set, and manufacturing are completed within a total time of 30 minutes of less. In some aspects, the steps of processing the image data, determining the posterior surface, determining the anterior surface, generating the 3-D printable data set, and manufacturing are completed within 25 minutes or less, or within 23 minutes or less.

Aspects disclosed herein include the method of any one of the previous aspects, wherein the additive manufacturing has a voxel resolution of 6 μm or less. In some aspects, the additive manufacturing has a voxel resolution of 10 μm or less, 5 μm or less, or 1 μm or less.

Aspects disclosed herein include the method of any one of the previous aspects, wherein the customized ocular contact lens has a diameter selected from the range of 3 mm to 15 mm. In some aspects, the customized ocular contact lens has a diameter selected from the range of 1 mm to 15 mm, or about 10 mm.

Aspects disclosed herein include the method of any one of the previous aspects, wherein the customized ocular contact lens has a surface roughness of 2 nm or less. In some aspects, the customized ocular contact lens has a surface roughness of 10 nm or less, or 5 nm or less.

Aspects disclosed herein include the method of any one of the previous aspects, wherein the customized ocular contact lens has a thickness selected from the range of 300 μm to 700 μm. In some aspects, the customized ocular contact lens has a thickness selected from the range of 100 μm to 900 μm.

Aspects disclosed herein include the method of any one of the previous aspects, wherein the customized ocular contact lens has a tolerance in thickness of less than 5%. In some aspects, the customized ocular contact lens has a tolerance in thickness of less than 3% or less than 1%.

Aspects disclosed herein include the method of any one of the previous aspects, wherein the customized ocular contact lens has an absorption/absorbance of less than 1% at wavelengths selected from the range of 400 nm to 800 nm. In some aspects, the customized ocular contact les has absorbance of less than 5% at wavelengths selected from the range of 400 nm to 800 nm. In some aspects, the absorbance is measured via ellipsometry measurements.

Aspects disclosed herein include the method of any one of the previous aspects, wherein the customized ocular contact lens has a refractive index between 1.4 and 1.6 for all wavelengths selected from the range of 400 nm to 800 nm. In some aspects, the refractive index is measured via ellipsometry measurements. In some aspects, the customized ocular contact lens has a refractive index of about 1.5 for wavelengths selected from the range of 400 nm to 800 nm.

Aspects disclosed herein include the method of any one of the previous aspects, wherein the customized ocular contact lens is hydrophilic such that the contact angle of deionized water thereon is selected from the range of 35° to 50°. In some aspects, the contact angle of deionized water thereon is selected from the range of 30° to 60°, or 40° to 50°.

Aspects disclosed herein include the method of any one of the previous aspects, wherein the entire method is completed in an hour or less. In some aspects, the entire method is completed in less than 2 hours.

Aspects disclosed herein include the method of any one of the previous aspects, wherein the manufactured customized ocular contact lens has a composition comprising one or more of methacrylate polymers, poly(ethylene glycol) diacrylate, trimethylolpropane ethoxylate triacrylate, ethylene glycol dimethacrylate, avobenzone, Irgacure 819 (phenylbis (2,4,6-trimethylbenzoyl) (phosphine oxide)), or any combination thereof.

Aspects disclosed herein include the method of any one of the previous aspects, wherein the manufactured customized ocular contact lens is characterized by: an ultimate tensile strength (UTS) selected from the range of 6 MPa to 900 MPa; a maximum elongation at failure selected from the range of 8% to 175%; or any combination thereof. In some aspects, the UTS is selected from the range of 100 MPa to 1000 MPa. In some aspects, the maximum elongation at failure is selected from the range of 10% to 200%.

Aspects disclosed herein include a system for additive manufacture of a customized ocular contact lens, the system comprising: a visible-light optical coherence tomography (vis-OCT) apparatus configured to perform vis-OCT on a subject's eye; an additive manufacturing apparatus configured to manufacture the customized ocular contact lens; and a non-transitory computer readable medium having stored thereon computer implementable instructions executable by a processor in a computing device configured to: image and acquire image data of an outer surface of a cornea of the subject using the vis-OCT apparatus; process the image data to generate a 3-D computational model of the outer surface of the cornea based on the acquired image data; determine a posterior surface of the customized ocular contact lens using the 3-D computational model; determine an anterior surface of the customized ocular contact lens to provide a selected optical power to the customized contact lens; generate a 3-D printable data set of the customized ocular contact lens comprising the determined posterior surface and the determined anterior surface; manufacture the customized ocular contact lens based on the 3-D printable data set of the customized ocular contact lens using the additive manufacturing apparatus; verify the shape of the manufactured customized ocular contact lens using the apparatus for vis-OCT to image the anterior surface and posterior surface of the manufactured customized ocular contact lens.

Aspects disclosed herein include the system of the previous aspect, wherein the additive manufacturing apparatus comprises an apparatus for micro-continuous liquid interface production (µCLIP).

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1: Schematic of a visible light optical coherence tomography (vis-OCT) system, including a light source, a spectrometer, a fiber coupler, a first collimator, a dispersion compensation, a motorized stage, a polarization controller, a second collimator, a scanning mirror, a dichroic mirror, a charge-coupled device (CCD) camera, and a cornea of a patient.

Figures 2A, 2B, 2C, 2D:
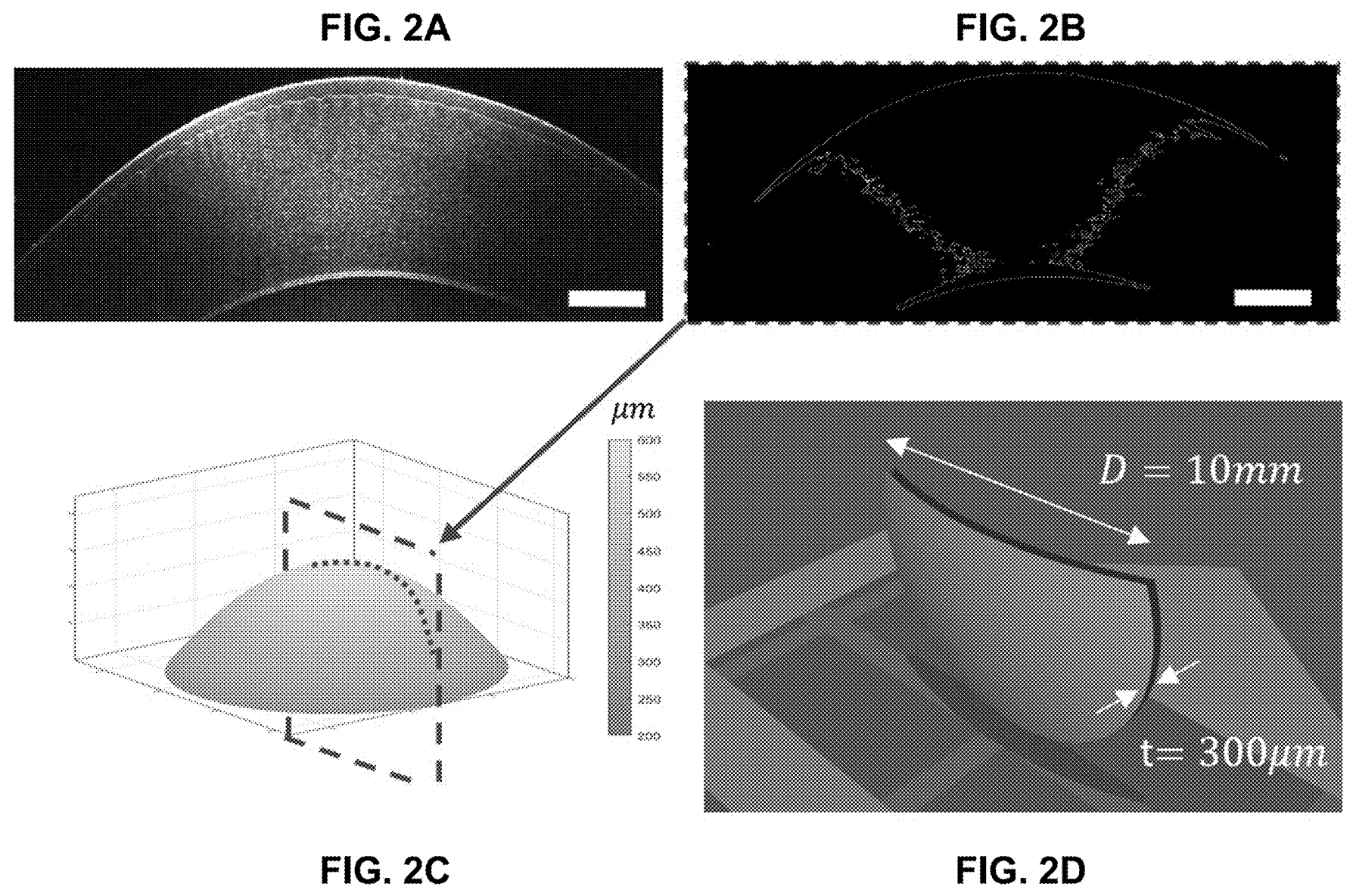

FIGS. 2A-2F: Convert OCT images to 3D printing slicing images. FIG. 2A: Raw OCT B-scan image of the pig cornea. FIG. 2B: Sobel edge detection function was used to delineate the cornea structure from FIG. 2A. FIG. 2C: A 3D reconstruction of the corneal anatomy was generated relying on data from FIG. 2B. FIG. 2D: Customized contact lens (CL) was designed based on the cornea geometry from FIG. 2C and saved as a STL file via our MATLAB code. FIG. 2E: MATLAB generated STL file was imported into CHITU-BOX software, then the necessary support structures are added, and (FIG. 2F) final high-resolution slicing images were created.

FIG. 3A: Schematic of a vis-OCT system. FIG. 3B: The outline of the pig cornea was obtained from OCT images and used as blueprint to design the customized contact lens. The 3D CAD module of designed contact lens was converted to 3D printable slicing images via CHITUBOX software (a commercial software). FIG. 3C: Schematic of our home-made µ-CLIP apparatus. FIG. 3D: OCT was used to verify the fit of the 3D printed contact lens.

FIG. 4A: Tensile stress in MPa of poly (hydroxyethyl)methacrylate (pHEMA) as a function of strain from a tensile test of pHEMA following the ASTM-D412 standard. As can be seen from the chart, fully hydrated 3D printed pHEMA has an ultimate tensile strength (UTS) of 1.6 MPa and presents a maximum elongation of 170% at failure. FIG. 4B: Complex refractive index of pHEMA in both real part (n) and complex part (k) as a function of wavelength. Wavelength dependent complex refractive index of dry pHEMA was obtained from ellipsometry measurements which are consistent with the work of others, for example, in Brandrup, J.; Immergut, E. H.; Grulke, E. A. *Polymer Handbook*, $4^{th}$ ed: John Wiley & Sons Inc.: New York, 1998. FIG. 4C: Image of a water droplet on a dry pHEMA thin film and the resulting water contact angle. The water contact angle is in the range of 38-45° shortly after a droplet was formed on a dry pHEMA thin film and decreases as pHEMA gets wet. This confirms that pHEMA is hydrophilic.

FIG. 5A: Tensile stress in MPa of polyethylene glycol diacrylate (PEGDA) as a function of strain from a tensile test of PEGDA following the ASTM-D412 standard. As can be seen from the chart, 3D printed PEGDA has an ultimate tensile strength (UTS) of greater than 5.5 MPa and presents a maximum elongation of about 9% at failure. FIG. 5B: Complex refractive index of PEGDA in both real part (n) and complex part (k) as a function of wavelength. Wavelength dependent complex refractive index of dry PEGDA was obtained from ellipsometry measurements which are consistent with the work of others FIG. 5C: Image of a water droplet on a dry PEGDA thin film and the resulting water contact angle. The water contact angle is in the range of 53-60° shortly after a droplet was formed on a dry PEGDA thin film and decreases as PEGDA gets wet. This confirms that PEGDA is hydrophilic.

FIG. 6A: Schematic of an alternative vis-OCT system Schematic of a vis-OCT system. FIG. 6B: Schematic of our home-made µ-CLIP apparatus. FIG. 6C: Partial schematic of a vis-OCT system configured to confirm the shape of a contact lens. Shown here are collimators (C), a scanning mirror (SM), and the contact lens (CL). The contact lens can be placed on the patient's cornea, or in a diluted intralipid solution. FIG. 6D: An anterior segment OCT (AS-OCT) image of a cornea. FIG. 6E: A 3D CAD module of designed contact lens. FIG. 6F: A 3D-printable slice image. FIG. 6G: An OCT image of the 3D-printed contact lens (CL) on the cornea (left) and on its own (right).

FIGS. 7A-7F: Optical surface qualities of 3D printed contact lens. FIG. 7A: SEM image of the cross-section of the printed lens. FIGS. 7B-7C: SEM images of both sides of 3D printed customized contact lens. FIG. 7D: Quantitative surface profile measured by white light interferometry. FIGS. 7E-7F: A nanometer level surface smoothness was shown.

FIG. 8A: Schematic of vis-OCT scanning of contact lens on the eyeball. FIG. 8B: Vis-OCT scan to characterize the fitness of 3D printed contact lens. FIGS. 8C-8D: Optical Images to illustrate the placement of 3D printed contact lens on the same pig eyeball.

FIG. 9: An overview of OCT imaging driven 3D printed contact lens. Briefly, a customized profile is acquired, a contact lens is designed, the contact lens is 3D printed, and the printed contact lens is validated. More detail is given in FIGS. 22 and 23.

FIGS. 10A-10E: FIG. 10A: An image of a μCLIP system used to 3D print the customized contact lens. Highlighted are a building platform, where the contact lens is printed; the 3D printed contact lens; 3D printed supports to support the contact lens as it is being printed; and a resin tank containing a photocurable liquid resin.

FIG. 10B: A 3D printed contact lens with zero power. FIG. 10C: A series of 3D printed contact lens with various optical powers, from −6D to +6D. FIG. 10D: Graph showing the accuracy of the optical power of the 3D printed lenses. In particular, five lenses were printed at each power, after which the power of the lenses was measured using a lensometer. FIG. 10E: Graph showing the percent change in thickness, width, length, volume, and mass of printed contact lenses after the dry contact lenses are submerged in water for more than 48 hours.

FIG. 11A: A qualitative surface profile measured by white light interferometry of a commercial contact lens made of poly(methyl methacrylate) (PMMA). FIG. 11B: The height of the commercial contact lens as a function of the length as measured by white light interferometry. FIG. 11C: The roughness of the 3D printed contact lens as a function of the length.

FIG. 15: A diagram showing how slicing images of the contact lens are obtained based on the CAD design of the contact lens. The slicing images are subsequently input to a 3D printer to complete the 3D printing.

FIG. 16A: An image of the 3D printer printing the contact lens towards the beginning of the printing process. FIG. 16B: An image of the 3D printer printing the contact lens towards the middle of the printing process. FIG. 16C: An image of the 3D printer printing the contact lens at the end of the printing process. Notably, it can be seen that the contact lens was printed in a vertical orientation.

FIGS. 17A-17B: FIG. 17A: Multiple contact lens can be 3D printed simultaneously. The 3D printed contact lenses have a 2 mm support ring for handling of the lens. The lens is placed on the lensometer to measure the optical power of the lens. FIG. 17B: The optical power of the 3D printed contact lenses is measured using a lensometer. In the graph, the y axis shows the actual optical power data from the lensometer, while the x axis shows the designed optical power.

FIG. 19: A flowchart illustrating a method for additive manufacture of a customized ocular contact lens for a subject.

FIG. 20: A flowchart illustrating a method for designing a customized ocular contact lens from image data.

STATEMENTS REGARDING CHEMICAL COMPOUNDS AND NOMENCLATURE

Figures 2E, 2F:
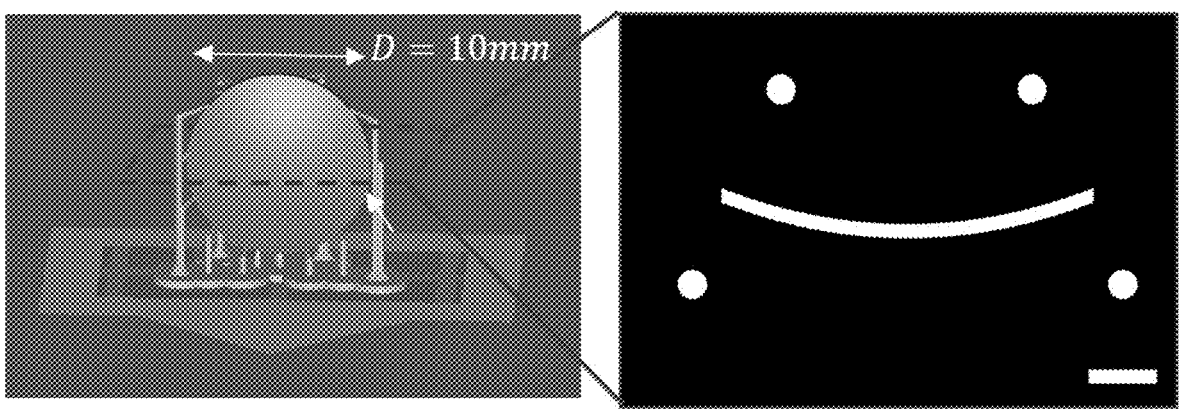
Figures 3A, 3B:
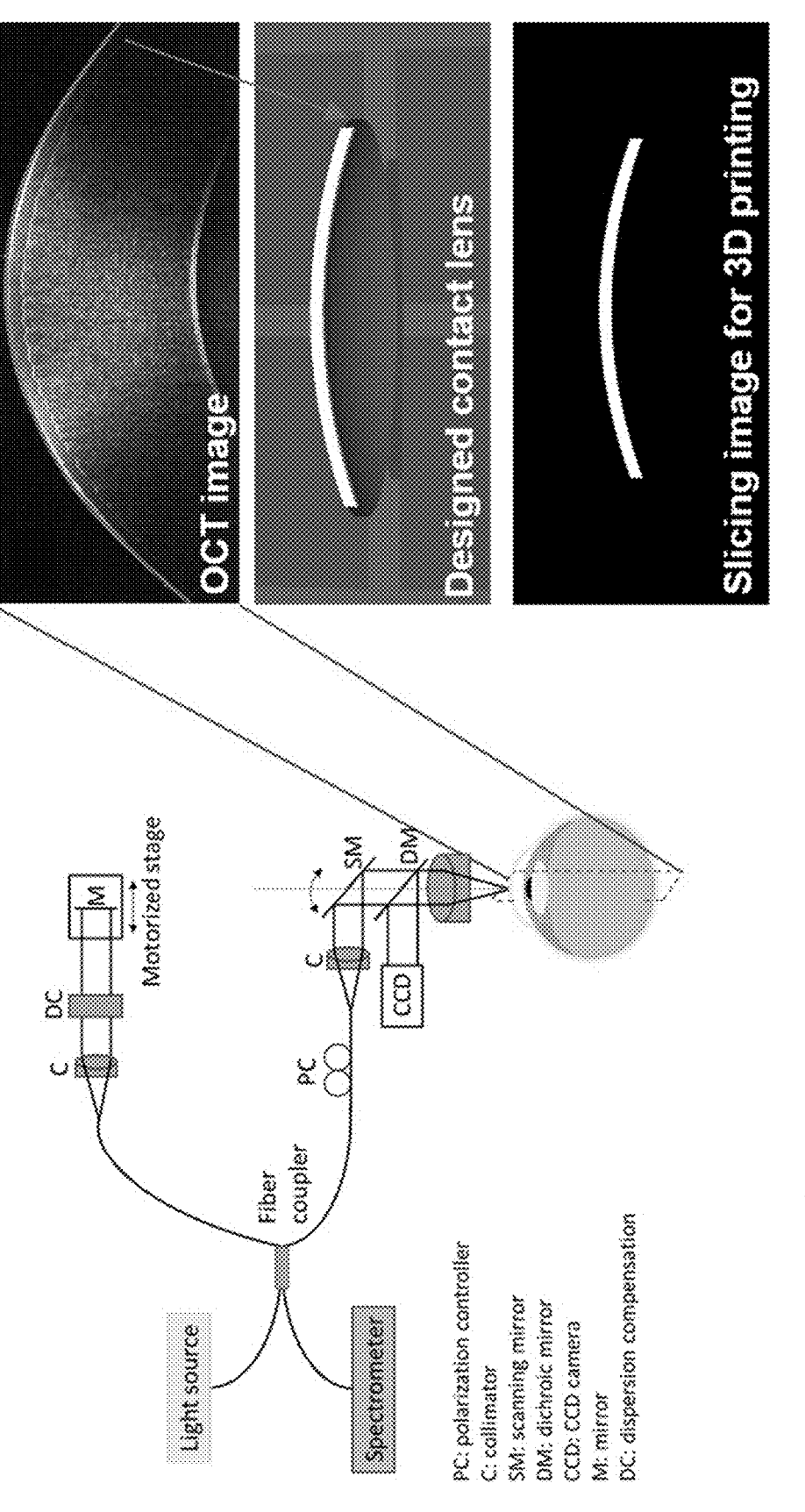
FIGS. 3A-3D: Overall procedure of vis-OCT image-driven on demand 3D printing customized contact lens.
Figure 3D:
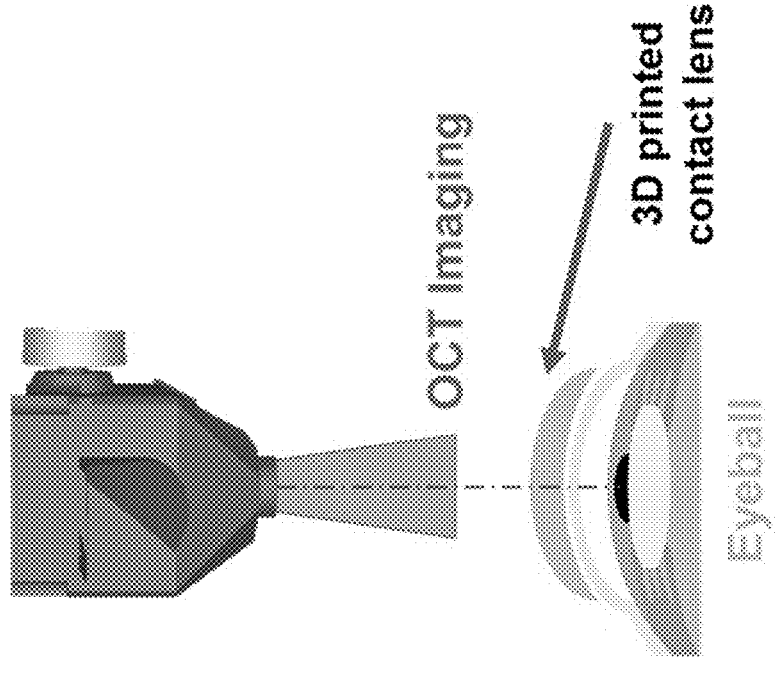
Figure 3C:
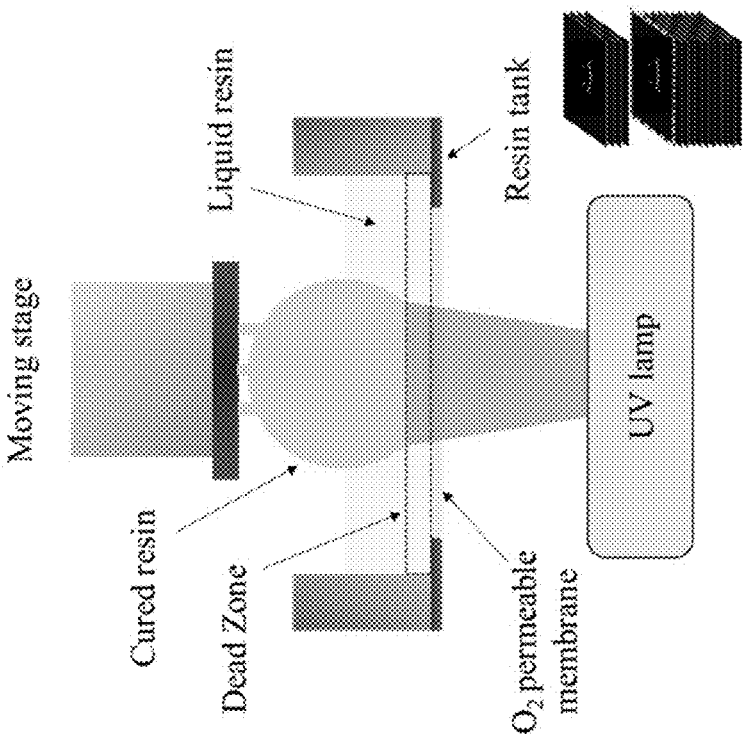

In general, the terms and phrases used herein have their art-recognized meaning, which can be found by reference to standard texts, journal references and contexts known to those skilled in the art. The following definitions are provided to clarify their specific use in the context of the invention.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer may be used interchangeably. In some embodiments, a resin is an exemplary prepolymer. In some embodiments, a "prepolymer" refers to a starting monomer, monomer mixture, mixture comprising one or more monomers where the monomer(s) have been reacted to an intermediate molecular mass state, resin, and/or polymer, which can be further cross-linked upon exposure to actinic radiation and/or heat to obtain a cross-linked polymer having a molecular weight higher than the starting prepolymer. Examples of actinic radiation are UV irradiation, ionized radiation (e.g. gamma ray or X-ray irradiation), microwave irradiation, and the like. In some embodiments, a "prepolymer" refers to a starting monomer, monomer mixture, mixture comprising one or more monomers where the monomer(s) have been reacted to an intermediate molecular mass state, resin, and/or polymer, which can be further hardened upon exposure to actinic radiation and/or heat to obtain a further hardened polymer having a hardness higher than the starting prepolymer.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

The term "feature" refers to a portion, structure, surface, or other feature of an object. Exemplary features include, but are not limited to, corner or corner-like features, step or step-like features, flat surfaces, curved surfaces, and any combinations of these.

The term "average," when used in reference to a property of a material, feature, or object, refers to a calculated arithmetic mean of at least two, or preferably at least three, identical measurements or calculations of said property. For example, an average maximal imaging resolution of a lens is the arithmetic mean of at least two measurements performed identically, of the maximal imaging resolution of said lens. In some embodiments, the at least two measurements are performed at different portions of the object.

The term "additive manufacture" refers to a process for forming a structure, feature, element, object, or a combination of these, via deposition, or otherwise building up, of a material. The terms "additive manufacture process" and "additive manufacturing process" may be used interchangeably. An additive manufacture process may involve layer-by-layer deposition of a material to form a complex three-dimensional structure, feature, object, or combination of these. The deposited material may include, but is not limited to, inorganic materials, hybrid organic-inorganic materials, polymers, metals, or combinations of these. Exemplary additive manufacture processes include, but are not limited to, 3D printing, stereolithography (SLA), microstereolithography, projection micro-stereolithography (PµSL), and any combinations thereof. In some embodiments, an additive manufacture process does not require a subtractive manufacture to form the structure or element. Examples of subtractive manufacture processes include, but are not limited to, milling, machining, electron discharge machining, carving, shaping, grinding, drilling, and etching. In an embodiment, an additive manufacture process involves or is aided by computer-aided design (CAD) of a computational (e.g., CAD) model based on which an object is manufactured via the additive manufacture process. A photohardening or photopolymerization process of an additive manufacture process can be carried out continuously without layers, discontinuously (either with same or different or variable layer thicknesses); partially continuously and partially discontinuously (discontinuously either with same or different or variable layer thicknesses); or in a combination of various possibilities. In some embodiments, the additive manufacture process is particularly suitable for building a three-dimensional object in a voxel matrix independent from layers or using layers. In some examples, additive manufacturing may include but is not limited to selective laser sintering, direct laser sintering, casting and/or stamping.

The term "computational model" refers to a computer-aided design (CAD) model. A model may be of a three-dimensional (3D) object, feature, element, structure, or combination of these. A computational model can be stored on computer-readable storage medium, such as a hard disk drive (HDD), a solid-state drive (SSD), read-only memory (ROM), and/or random-access memory (RAM). The computational model may be read or processed with the aid of a computer processor via software, or computer-readable instructions. The computational model can be processed, for example, by computationally slicing the model into virtual slices, layers, or portions and/or dividing the model into pixels and/or voxels. For example, a virtual slice of a model may correspond to one of a plurality of layers of an object formed by an additive manufacture process, where the object or layer(s) thereof is formed based on the computational model.

The term "substantially" refers to a property, condition, or value that is within 20%, within 10%, within 5%, within 1%, optionally within 0.1%, or is equivalent to a reference property, condition, or value. The term "substantially equal", "substantially equivalent", or "substantially unchanged", when used in conjunction with a reference value describing a property or condition, refers to a value that is within 20%, within 10%, optionally within 5%, optionally within 1%, optionally within 0.1%, or optionally is equivalent to the provided reference value. For example, a diameter is substantially equal to 3 mm (or, "is substantially 3 mm") if the value of the diameter is within 20%, optionally within 10%, optionally within 5%, optionally within 1%, within 0.1%, or optionally equal to 3 mm. The term "substantially greater", when used in conjunction with a reference value describing a property or condition, refers to a value that is at least 1%, optionally at least 5%, optionally at least 10%, or optionally at least 20% greater than the provided reference value. The term "substantially less", when used in conjunction with a reference value describing a property or condition, refers to a value that is at least 1%, optionally at least 5%, optionally at least 10%, or optionally at least 20% less than the provided reference value.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

The term "and/or" is used herein, in the description and in the claims, to refer to a single element alone or any combination of elements from the list in which the term and/or appears.

The term "dynamic photomask" refers to a device or element that may provide a light masking, light filtering effect, or otherwise light altering effect, wherein the light masking or light filtering effect of the dynamic photomask may be altered, modified, or changed. For example, the light masking, light filtering effect, or otherwise light altering effect can be changed in-situ, or during the additive manufacture process, optionally without requiring the stopping or pausing of the process to change the light masking, light filtering effect, or otherwise light altering effect. In some embodiments, the light masking, light filtering effect, or otherwise light altering effect of the dynamic photomask can be changed directly or indirectly as a result of an electronic signal and/or computer-readable instructions. In some embodiments, the light masking, light filtering effect, or otherwise light altering effect of the dynamic photomask can be changed directly or indirectly via voltage signal(s) applied to, at, or within the dynamic photomask. Exemplary dynamic photomasks include, but are not limited to, devices selected from the group consisting of a spatial light modulator (SLM), a projection unit based on digital light processing or DLP®, a digital micromirror device or a DMD®, a liquid crystal display (LCD), an image light amplification device or an ILA®, a liquid crystal on silicon (LCOS) device, a silicon X-tal reflective display (SXRD), a microelectromechanical system (MEMS), a deformable mirror device, and any combination thereof. The light masking, light filtering effect, or otherwise light altering effect can comprise transmission, reflection, absorption, diffraction, and/or scattering of light. The light masking, light filtering effect, or otherwise light altering effect can include changing the intensity and/or spectrum of the light modified by the light masking, light filtering effect, or otherwise light altering effect. For example, the dynamic photomask can accomplish the light masking, light filtering effect, or otherwise light altering effect via an image, such as an image displayed or otherwise formed by the dynamic photomask such that light interacts with said image.

The term "grayscale image," when referring to a dynamic photomask, refers to an image displayed or otherwise formed by a dynamic photomask for the purpose of providing a light filter or light masking effect, wherein the image comprises a plurality of pixels, each pixel corresponding to a light intensity (or, light amount) value. The grayscale image includes at least two pixels having different light intensity values with respect to each other. Light intensity represented by each pixel can correspond to white, black, or a gray-tone. In some embodiments, a grayscale image is an 8-bit grayscale image, wherein each pixel corresponds to one of 256 shades, tones, or intensity values. An intensity of light interacting with a pixel can be reduced according to the shade, tone, or intensity value of the pixel. In some embodiments, a grayscale image may also comprise transparent portions or pixels. In some embodiments, light is directed to an image of a dynamic photomask, light interacts with said image, and light modified by the image, or pixels thereof, is reflected from the image. In some embodiments, said reflected light is used to photopolymerize a precursor material to form an object, or portion thereof. In some embodiments, light transmitted through an image is used to photopolymerize a precursor material to form an object, or portion thereof.

The term "photoharden" or "photohardening" refers to hardening of a precursor material due to interaction of said material with light. An exemplary photohardening process is photopolymerization, such as photopolymerization of a prepolymer, or portion thereof, to a polymer, such as via light-induced cross-linking of prepolymer to form a polymer. The term "grayscale photoharden" or "grayscale photohardening" refers to hardening, such as photopolymerization, of a precursor material due to interaction of said precursor material with light modified by a grayscale image of a dynamic photomask. Grayscale photopolymerization is an exemplary grayscale photohardening process. The term "hardening" may include photohardening and/or heat-induced hardening. In some embodiments, "hardening" refers to an increase in a hardness of a material, object, feature, element, or any portion or any combination of these. In some embodiments, "hardening" refers to cross-linking of a pre-polymer material, optionally increasing its molecular weight with respect to its molecular weight before hardening.

The term "light" refers to electromagnetic radiation, such as, but not limited to, ultraviolet light, visible light, infrared light, or any combination thereof.

Application of a hardened meniscus coating, or "applying a meniscus coating," refers generally refers to a meniscus equilibrium post-curing process, or any combination of steps thereof, as described herein.

The term "precursor material" refers to a material that can undergo photohardening or photopolymerization, such as a prepolymer.

Figures 8A, 8B, 8C, 8D:
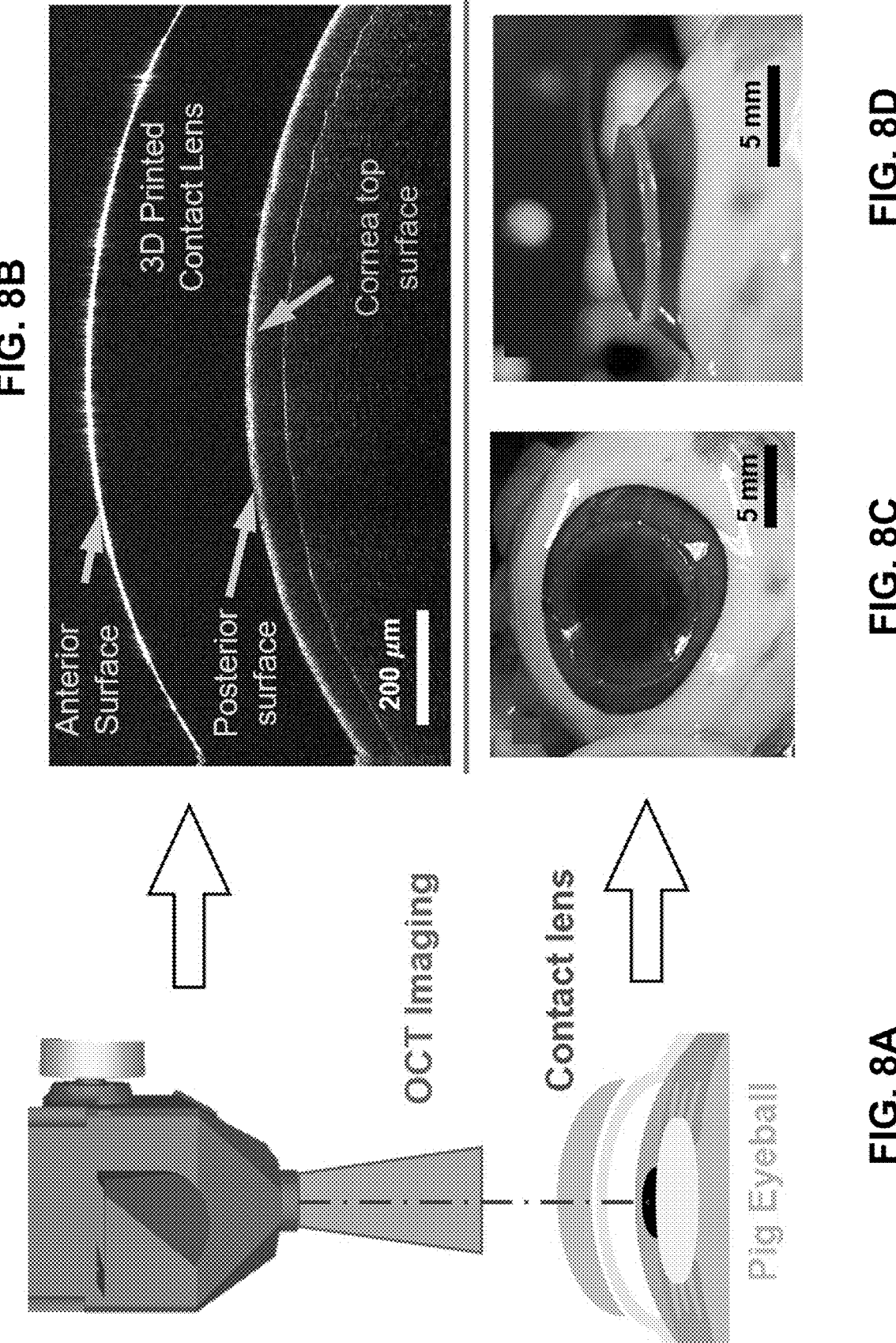
FIGS. 8A-8D: 3D Print Contact Lens is placed on the same pig eyeball.

In some embodiments, the term "up-facing" describes a feature that is curved or angled such that its surface normal (or, the normal to its surface) along the curve or at the vertex points toward a source of light that is used for photohardening the feature. For example, in some additive manufacturing techniques light, which is used for photohardening, is directed to the precursor material from above the object, and in some additive manufacturing techniques the light is directed to the precursor material from below the object. In some embodiments, the term "up-facing" describes a feature that is curved or angled such that its surface normal (or, the normal to its surface) along the curve or at the vertex points toward a direction opposite of the direction of gravity, or within ±89.9 degrees and opposite of said direction of gravity. In some embodiments, the term "up-facing" describes a feature that is curved or angled such that its surface normal (or, the normal to its surface) along the curve or at the vertex points toward a direction in which the feature, or object having said feature, is additively manufactured (e.g., toward the direction along which subsequent layers are formed). For example, the anterior surface of the lens shown in FIG. 8A is curved such that its surface normal (or, the normal to its surface) along the curve points (i) toward a direction in which the feature, or object having said feature, is additively manufactured, (ii) toward a direction opposite of the direction of gravity, or within ±90 degrees and opposite of said direction of gravity, as well as (iii) toward a source of light that is used for photohardening the feature (assuming the lens was manufactured starting with the bottom portion and ending with the top portion, as shown on the page, and the light for photohardening came from above the top of the lens as picture).

In some embodiments, the term "down-facing" describes a feature that is curved or angled such that its surface normal (or, the normal to its surface) along the curve or at the vertex points away from a source of light that is used for photohardening the feature. In some embodiments, the term "down-facing" describes a feature that is curved or angled such that its surface normal (or, the normal to its surface) along the curve or at the vertex points toward the direction of gravity, or within ±89.9 degrees of said direction of gravity. In some embodiments, the term "down-facing" describes a feature that is curved or angled such that its surface normal (or, the normal to its surface) along the curve or at the vertex points away from a direction in which the feature, or object having said feature, is additively manufactured (e.g., toward the direction along which subsequent layers are formed). For example, the posterior surface of the lens shown in FIG. 8A is curved such that its surface normal (or, the normal to its surface) along the curve points (i) away from a direction in which the feature, or object having said feature, is additively manufactured, (ii) toward the direction of gravity, or within ±90 degrees of said direction of gravity, as well as (iii) away from a source of light that is used for photohardening the feature (assuming the lens was manufactured starting with the bottom portion and ending with the top portion, as shown on the page, and the light for photohardening came from above the top of the lens as picture).

The term "meniscus" or "liquid meniscus" refers to a curve of a liquid or a liquid having a curved surface, where the curve is caused by surface tension or capillary action. In some embodiments, a liquid meniscus, such as a liquid meniscus formed of a precursor material such as a prepolymer, is hardened, photohardened, or photopolymerized to form a hardened meniscus coating. In some embodiments, a liquid meniscus is hardened, photohardened, or photopolymerized into a hardened meniscus coating such that the liquid meniscus and the hardened meniscus coating have the same or substantially the same shape, optionally also having the same or substantially the same size dimensions. In some embodiments, hardening of a liquid meniscus, to form a hardened meniscus coating, is achieved or performed via heat, light, or a combination of these.

The term "maximal imaging resolution" refers to the size or dimension of the finest feature that can be resolved in an image, such as an image formed by a lens.

The term "field distortion" refers to spatial deformation of the formed optical image in comparison with the original objects.

The term "theoretical optimal lateral resolution" refers to the theoretical upper limit of the attainable imaging resolution given the numerical aperture and the operating wavelength of the light. It is determined by the diffraction limit of the light.

The term "surface profile" such as when referring to the measurement of AZ, refers to a surface morphology or geometry of an object, such as a lens. Exemplary descriptions of and methods for determining at least maximal imaging resolution, field distortion, theoretical optimal lateral resolution, and surface profile is provided in Bass, et al. ["Handbook of Optics, Vol. 2: Devices, Measurements, and Properties", Second Edition 2nd edition by Optical Society Of America, 1994, edited by Michael Bass, et al. (ISBN 0-07-047974-7)], which is incorporated herein by reference in its entirety to the extent not inconsistent herewith.

The term "spatial grayscale distribution function" refers to a mathematic relationship or dependence of a grayscale pixel value of a grayscale image, or portion or region of said grayscale image, with respect to a spatial position or coordinate of the grayscale image. A radial spatial grayscale distribution function is an exemplary spatial grayscale distribution function describing a mathematical relationship or dependence (e.g., such as a linear or exponential dependence) of grayscale pixel values with respect to radial coordinate points of a grayscale image, such as a grayscale image having rotational symmetry. Exemplary descriptions of and methods for determining a spatial grayscale distribution function is provided in Chen, et al. [Xiangfan Chen, Wenzhong Liu, Biqin Dong, Jongwoo Lee, Henry Oliver T. Ware, Hao F. Zhang, & Cheng Sun, "High-speed 3D printing millimeter-size customized aspheric imaging lenses with sub-7 nm surface roughness", Advanced Materials, 30(18), 1705683, (2018)], which is incorporated herein by reference in its entirety to the extent not inconsistent herewith.

The term "edge" as used in reference to an ocular contact lens refers to a surface of the ocular contact lens that is not the posterior surface nor the anterior surface. The edge of an ocular contact lens is generally located at the outer perimeter of the lens where the posterior surface and anterior surface approach each other or come into contact with each other. The edge of an ocular contact lens can comprise a variety of shapes. For example, the edge of an ocular contact lens can be a flat border or a positive border. Generally, the edge of an ocular contact lens is designed such that the ocular contact lens is free of or substantially free of any sharp corners.

The term "sharp corner" refers to a portion of a surface where the surface is not differentiable. For example, when considering the anterior and posterior surfaces of an ocular contact lens, the natural intersection of the surfaces creates a sharp corner. However, such a sharp corner increases the likelihood of damage to the subject's eye. Therefore, it is advantageous to remove the sharp corners from an ocular contact lens. This can, for example, be accomplished using smoothing algorithms known in the art. As another example, a sharp corner can be replaced with a simple design, a flat border, a positive border, or a lenticular with negative border.

Figure 21:
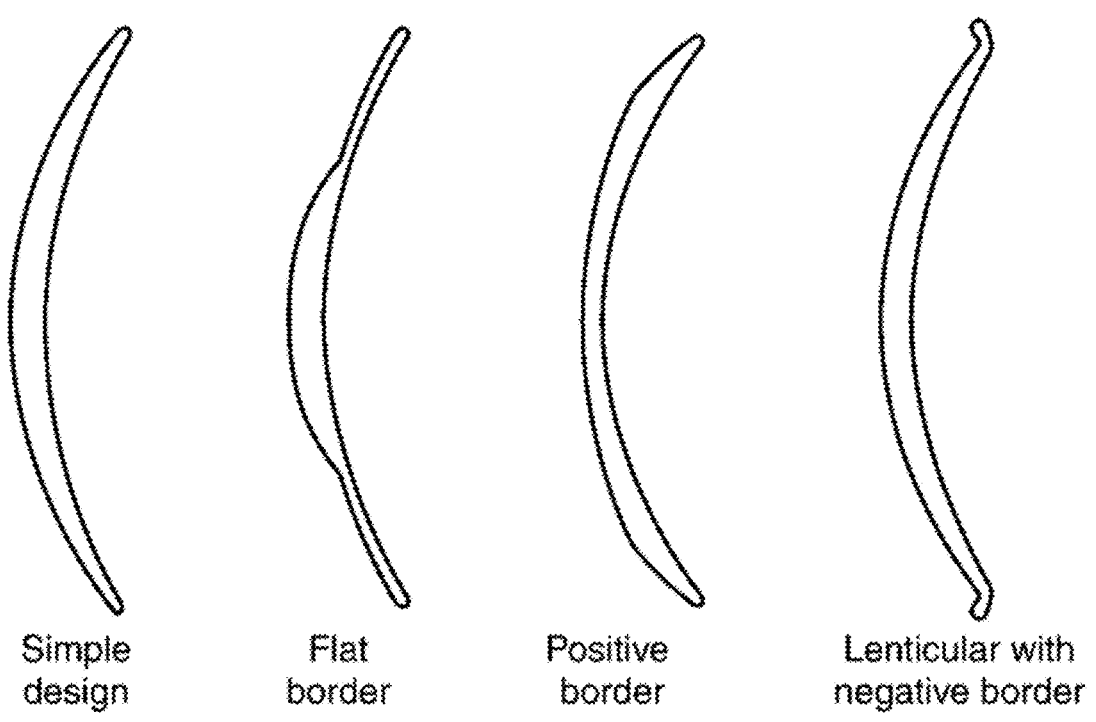
FIG. 21: Illustrations of the cross-sections of different types of contact lenses, including simple design, flat border, positive border, and lenticular with negative border contact lenses. Any of these shapes may be used, or substantially used, to replace the sharp corners that would otherwise result from the intersection of the anterior and posterior surfaces of a contact lens. Reproduced from Filho, R. G., Giovedi, M. A., Nichols, J. J., (2004). Design and Nomenclature of Contact Lenses. In: Contact Lenses in Ophthalmic Practice. Springer, New York, NY. doi: 10.1007/0-387-21758-4.

The terms "simple design", "flat border", "positive border", and "lenticular with negative border" refer to various shapes of contact lenses as illustrated in FIG. 21. For example, a contact lens with a simple design has a cross-section that follows, or substantially follows, the cross-section of a simple design shown in FIG. 21. As a further example, a contact lens with a flat border has a cross-section that follows, or substantially follows, the cross-section of a flat border shown in FIG. 21. As a further example, a contact lens with a positive border has a cross-section that follows, or substantially follows, the cross-section of a positive border shown in FIG. 21. As a further example, a contact lens with a lenticular with negative border has a cross-section that follows, or substantially follows, the cross-section of a lenticular with negative border shown in FIG. 21. FIG. 21 is reproduced from Filho, R. G., Giovedi, M. A., Nichols, J. J., (2004). Design and Nomenclature of Contact Lenses. In: Contact Lenses in Ophthalmic Practice. Springer, New York, NY. doi: 10.1007/0-387-21758-4.

The term "surface roughness" refers to the amount of deviations in the direction of the normal vector of a surface from its ideal form. Surface roughness is expressed as the average of profile height deviations from the mean line. Surface roughness is measured by placing an object, specifically a contact lens, under an optical profiler, for example a Nexview optical profiler (Zygo Corporation, Middlefield, CT). The optical profiler automatically scans the surface of the contact lens and generates a 3D surface geometry of the contact lens. This 3D surface geometry is analyzed to determine the surface roughness of the contact lens.

The term "posterior surface" as used when referring to an ocular contact lens refers to the surface of the lens that is configured to contact the cornea of a subject when the ocular contact lens is placed on the subject's cornea. Inversely, the term "anterior surface" as used when referring to an ocular contact lens refers to the surface of the lens that is configured to generally not contact the cornea of the subject when the ocular contact lens is placed on the subject's cornea.

The term "computationally and automatically" refers to a method or process that is performed by a computer without human invention after an initial input and command. For example, a customized ocular contact lens is manufactured computationally and automatically, or a step of manufacture is performed computationally and automatically, if after directly or indirectly providing a computer with an initial input (e.g., a 3-D computational model) and command (e.g., a trigger for a pre-programmed set of instructions, or a run command) the computer subsequently directs the analysis, processing, and manufacture of the customized ocular contact lens, including the control of other machines, devices, or apparatuses, without further human intervention.

Ranges can be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint. The term "about" as used herein refers to a range that is 15% plus or minus from a stated numerical value within the context of the particular usage. For example, about 10 would include a range from 8.5 to 11.5.

Thus, certain examples enable production of aspheric imaging lenses 3D-printed with precision control of 7-10 micron to produce a lens with a roughness of no more than 50 nm. An optical element can be formed using liquid crystal on silicone, for example, via a PµSL system. Grayscale fabrication can be applied for improved control and better transitions between pixels for step-case smoothing. Grayscale fabrication defines a baseline lens, and a liquid meniscus coating can be applied to smooth the lens, providing a spherical surface with high resolution and minimal distortion.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

CERTAIN ASPECTS AND EMBODIMENTS

Various aspects are contemplated herein, several of which are set forth in the paragraphs below. It is explicitly contemplated that any aspect or portion thereof can be combined to form an aspect. Moreover, the terms "any preceding aspect" and "any one of the preceding aspects" means any aspect that appears prior to the aspect that contains such phrase (for example, the sentence "Aspect 32: The method or system of any preceding aspect . . . " means that any aspect prior to aspect 32 is referenced, including letter versions, including aspects 1 through 31). For example, it is contemplated that, optionally, any material, method, or device of any the below aspects may be useful with or combined with any other aspect provided below. Further, for example, it is contemplated that any embodiment or aspect described above may, optionally, be combined with any of the below listed aspects.

Aspect 1: A method for additive manufacture of a customized ocular contact lens for a subject, the method comprising steps of:

imaging and acquiring image data of an outer surface of a cornea of the subject using visible-light optical coherence tomography (vis-OCT);

designing the customized ocular contact lens from the image data; wherein the step of designing comprises:

processing the image data to generate a 3-D computational model of the outer surface of the cornea based on the acquired image data;

determining a posterior surface of the customized ocular contact lens using the 3-D computational model;

determining an anterior surface of the customized ocular contact lens to provide a selected optical power to the customized ocular contact lens; and generating a 3-D printable data set of the customized ocular contact lens comprising the determined posterior surface and the determined anterior surface;

manufacturing the customized ocular contact lens using additive manufacturing based on the 3-D printable data set of the customized ocular contact lens; and verifying a shape of the manufactured customized ocular contact lens by imaging the anterior surface and the posterior surface of the manufactured customized ocular contact lens using visible-light optical coherence tomography.

Aspect 2: The method of Aspect 1, wherein imaging the anterior surface and the posterior surface of the manufactured customized ocular contact lens comprises imaging the anterior surface and the posterior surface of the manufactured customized ocular contact lens when the manufactured customized ocular contact lens is wet.

Aspect 3: The method of any one of the previous Aspects, wherein imaging the anterior surface and the posterior surface of the manufactured customized ocular contact lens comprises imaging the anterior surface and the posterior surface of the manufactured customized ocular contact lens when the manufactured customized ocular contact lens is suspended in a liquid.

Aspect 4: The method of Aspect 3, wherein the liquid is water. Optionally, the liquid is an oil or a diluted intralipid.

Aspect 5: The method of any one of the previous Aspects, wherein imaging the anterior surface and the posterior surface of the manufactured customized ocular contact lens comprises imaging the anterior surface and the posterior surface of the manufactured customized ocular contact lens when the manufactured customized ocular contact lens is positioned on and in contact with the cornea of the subject.

Aspect 6: The method of any one of the previous Aspects, wherein at least one of the steps of processing the image data, determining the posterior surface, determining the anterior surface, generating the 3-D printable data set, and manufacturing the customized ocular contact lens is performed computationally and automatically without human intervention.

Aspect 7: The method of any one of the previous Aspects, wherein each of the steps of processing the image data, determining the posterior surface, determining the anterior surface, generating the 3-D printable data set, and manufacturing the customized ocular contact lens is performed computationally and automatically without human intervention.

Aspect 8: The method of any one of the previous Aspects, wherein generating the 3-D printable data set comprises adding support structures to the 3-D printable data set.

Aspect 9: The method of Aspect 8, wherein the support structures are connected to the customized ocular contact lens at an edge of the customized ocular contact lens. Optionally, the support structures are configured to be removed from the customized ocular contact lens. Optionally, removal of the support structures does not damage the customized ocular contact lens.

Aspect 10: The method of any one of the previous Aspects, wherein generating the 3-D printable data set comprises generating high-resolution slicing images of the 3-D printable data set. Optionally, generating the 3-D printable data set comprises generating at least 1000 high-resolution slicing images of the 3-D printable data set. Optionally, the high-resolution slicing images of the 3-D printable data set each have a thickness selected from the range of 5 to 10 µm.

Aspect 11: The method of any one of the previous Aspects, wherein sharp corners are computationally and automatically removed from the 3-D printable data set.

Aspect 12: The method of any one of the previous Aspects, wherein the vis-OCT is characterized by an axial resolution less than or equal to 19 µm. Optionally, the vis-OCT is characterized by an axial resolution less than or equal to 20 µm, 15 µm, 10 µm, 5 µm, or 2 µm.

Aspect 13: The method of any one of the previous Aspects, wherein the vis-OCT is characterized by a lateral resolution less than or equal to 8 µm. Optionally, the vis-OCT is characterized by a lateral resolution less than or equal to 10 µm.

Aspect 14: The method of any one of the previous Aspects, wherein processing the image data to generate a 3-D computational model of the outer surface of the cornea comprises:

translating the image data into binarized images;

using a Sobel edge detection function to delineate the cornea from the binarized images; and using a surface fit function to generate the 3-D computational model of the outer surface of the cornea.

Aspect 15: The method of any one of the previous Aspects, wherein the selected optical power is selected from the range of –6D to +6D. Optionally, the selected optical power is selected from the range of –10D to +10D, –7D to +7D, –5D to +5D, –4D to +4D, –3D to +3D, –2D to +2D, or –1 D to +1 D.

Aspect 16: The method of any one of the previous Aspects, wherein the posterior surface is determined to have the same shape as the 3-D computational model.

Aspect 17: The method of any one of the previous Aspects, wherein a best-fit spherical shape is generated based on the 3-D computational model, and the best-fit spherical shape is used to design the customized ocular contact lens.

Aspect 18: The method of any one of the previous Aspects, wherein the anterior surface is determined using the lensmaker equation.

Aspect 19: The method of any one of the previous Aspects, wherein the step of designing comprises determining one or more edge surfaces connecting the anterior surface with the posterior surface.

Aspect 20: The method of Aspect 19, wherein the one or more edge surfaces comprise a flat border, a positive border, a simple design, or a lenticular with negative border.

Aspect 21: The method of any one of the previous Aspects, wherein the additive manufacturing comprises projection micro-stereolithography (PµSL), micro-continuous liquid interface production (µCLIP), digital light processing (DLP), or any combination thereof.

Aspect 22: The method of any one of the previous Aspects, wherein the additive manufacturing manufactures the customized ocular contact lens in a vertical orientation, such that each of a majority of printable layers of the customized ocular contact lens comprises a portion of both the posterior surface and the anterior surface. Optionally, each of at least 60%, 70%, 80%, 90%, 95%, or 99% of the printable layers of the customized ocular contact lens comprises a portion of both the posterior surface and the anterior surface.

Aspect 23: The method of any one of the previous Aspects, wherein the entire method is completed within 30 minutes or less. Optionally, the entire method is completed within 25 minutes or less, or within 23 minutes or less.

Aspect 24: The method of any one of the previous Aspects, wherein the steps of processing the image data, determining the posterior surface, determining the anterior surface, generating the 3-D printable data set, and manufacturing the customized ocular contact lens are completed within a total time of 30 minutes or less. Optionally, the steps of processing the image data, determining the posterior surface, determining the anterior surface, generating the 3-D printable data set, and manufacturing are completed within 25 minutes or less, or within 23 minutes or less.

Aspect 25: The method of any one of the previous Aspects, wherein the additive manufacturing has a voxel resolution of 6 µm or less. Optionally, the additive manufacturing has a voxel resolution of 10 µm or less, 5 µm or less, or 1 µm or less.

Aspect 26: The method of any one of the previous Aspects, wherein the customized ocular contact lens has a diameter selected from the range of 3 mm to 15 mm. Optionally, the customized ocular contact lens has diameter selected from the range of 1 mm to 15 mm, or about 10 mm.

Aspect 27: The method of any one of the previous Aspects, wherein the customized ocular contact lens has a surface roughness of 2 nm or less. Optionally, the customized ocular contact lens has a surface roughness of 10 nm or less, or 5 nm or less.

Aspect 28: The method of any one of the previous Aspects, wherein the customized ocular contact lens has a thickness selected from the range of 300 µm to 700 µm. Optionally, the customized ocular contact lens has a thickness selected from the range of 100 µm to 900 µm.

Aspect 29: The method of any one of the previous Aspects, wherein the customized ocular contact lens has a tolerance in thickness of less than 5%. Optionally, the customized ocular contact lens has a tolerance in thickness of less than 3% or less than 1%.

Aspect 30: The method of any one of the previous Aspects, wherein the customized ocular contact lens has an absorption/absorbance of less than 1% at wavelengths selected from the range of 400 nm to 800 nm. Optionally, the customized ocular contact lens has an absorbance of less than 5% at wavelengths selected from the range of 400 nm to 800 nm.

Aspect 31: The method of Aspect 30, wherein the absorbance of the customized ocular contact lens is measured via ellipsometry measurements.

Aspect 32: The method of any one of the previous Aspects, wherein the customized ocular contact lens has a refractive index between 1.4 and 1.6 for wavelengths selected from the range of 400 nm to 800 nm. Optionally, the customized ocular contact lens has a refractive index of about 1.5 for wavelengths selected from the range of 400 nm to 800 nm.

Aspect 33: The method of Aspect 32, wherein the refractive index is measured via ellipsometry measurements.

Aspect 34: The method of any one of the previous Aspects, wherein the customized ocular contact lens is hydrophilic such that the contact angle of deionized water thereon is selected from the range of 35° to 50°. Optionally, the contact angle of deionized water thereon is selected from the range of 30° to 60°, or 40° to 50°

Aspect 35: The method of any one of the previous Aspects, wherein the entire method is completed in an hour or less. Optionally, the entire method is completed in less than 2 hours.

Aspect 36: The method of any one of the previous Aspects, wherein the manufactured customized ocular contact lens has a composition comprising one or more of methacrylate polymers, poly(ethylene glycol) diacrylate, trimethylolpropane ethoxylate triacrylate, ethylene glycol dimethacrylate, avobenzone, Irgacure 819 (phenylbis(2,4,6-trimethylbenzoyl) (phosphine oxide)), or any combination thereof.

Aspect 37: The method of any one of the previous Aspects, wherein the manufactured customized ocular contact lens is characterized by:

an ultimate tensile strength (UTS) selected from the range of 6 MPa to 900 MPa;

a maximum elongation at failure selected from the range of 8% to 175%;

or any combination thereof.

Optionally, the UTS is selected from the range of 100 MPa to 1000 MPa.

Optionally the maximum elongation at failure is selected from the range of 10% to 200%.

Aspect 38: A system for additive manufacture of a customized ocular contact lens, the system comprising:

a visible-light optical coherence tomography (vis-OCT) apparatus configured to perform vis-OCT on a cornea of a subject;

an additive manufacturing apparatus configured to manufacture the customized ocular contact lens; and a non-transitory computer readable medium having stored thereon computer implementable instructions executable by a processor in a computing device configured to:

image and acquire image data of an outer surface of a cornea of the subject using the vis-OCT apparatus;

process the image data to generate a 3-D computational model of the outer surface of the cornea based on the acquired image data;

determine a posterior surface of the customized ocular contact lens using the 3-D computational model;

determine an anterior surface of the customized ocular contact lens to provide a selected optical power to the customized contact lens;

generate a 3-D printable data set of the customized ocular contact lens comprising the determined posterior surface and the determined anterior surface;

manufacture the customized ocular contact lens based on the 3-D printable data set of the customized ocular contact lens using the additive manufacturing apparatus;

verify a shape of the manufactured customized ocular contact lens using the apparatus for visible-light optical coherence tomography to image the anterior surface and posterior surface of the customized ocular contact lens.

Aspect 39: The system of Aspect 38, wherein the additive manufacturing apparatus comprises an apparatus for micro-continuous liquid interface production (μCLIP).

The invention can be further understood by the following non-limiting examples.

Example 1A: Visible-Light Optical Coherent Tomography Imaging-Driven 3D Printing of Customized Contact Lens Abstract Additive manufacturing, or 3D printing, offers a streamlined approach to lens fabrication, augmenting design flexibility and providing a cost-effective means to create optical lenses of various scales, from nanometer to millimeter dimensions. Remarkably, despite these capabilities, the application of 3D printing to custom-fit optical lenses has been largely unexplored. This study fills this gap by introducing an innovative approach that combines visible-light optical coherence tomography with micro-continuous liquid interface production, a high-resolution 3D printing technique. This synergistic integration enables the rapid production of custom-fit contact lenses, measuring 10 mm in diameter, with an optical power range from −6D to +6D. The entire process, including acquisition of the corneal 3D structure, lens design, 3D printing, and lens fitting validation, is achieved within one hour. This groundbreaking study not only presents a novel protocol for 3D printing custom-fit optical lenses but also showcases the successful implementation of this protocol, marking a significant advancement in the field. The methodology described herein opens new possibilities for efficient and personalized optical device manufacturing, demonstrating the potential of 3D printing technology in the realm of custom-fit optical solutions.

In this study, an introduction to the entire processes of OCT-driven 3D printing contact lens is to show how to complete 4 steps of customized lens fabrication.

Additive manufacturing (AM), commonly known as three-dimensional (3D) printing, has undergone significant advancements. The ability to construct intricate and complex geometries with additive methods and directly translate the design model to the final product has not only enhanced design possibilities but has also significantly reduced production costs and time,[1-3] making it an attractive option to be applied in a myriad of fields, including robot development,[4] medicine,[1,5] aerospace industries,[6] construction, [7] and automotive manufacturing.[8] Notably, AM has also revolutionized optical manufacturing processes by enabling the construction of complex geometries, and design possibilities.[9-11] Two-photon polymerization, as one of the highest spatial resolution 3D printing techniques which can achieve a sub-100 nm voxel resolution, has been demonstrated to fabricate micro- and nano-optics with complex lens design. However, the application of two-photon polymerization was limited to only produce microlenses due to its rather slow "point-by-point" fabrication nature.[12-15] To overcome the speed-accuracy trade-off inherent in two-photon polymerization-based 3D printing optics process, a method integrating another type of 3D printing technique called projection micro-stereolithography (PμSL), which parallelizes the point-by-point scanning process and cures a 2D layer in one single exposure, and uses grayscale photopolymerization and a meniscus postprocessing technique has been developed to enable high-speed fabrication of millimeter-size optics with enhanced geometric precision and surface smoothness.[16] Micro-continuous liquid interface production (μCLIP), as a continuous derivative of PμSL, which improves the printing speed of the PμSL by eliminating the resin-recoating process between adjacent printing layers, has been applied to produce optical lenses and further reduce the millimeter-size lens fabrication time from hours to minutes.[17-19]

Although AM has presented the capability to fabricate various types of lenses for different purposes, there was no study carried out to show the merit of applying 3D printing in custom-fit lens fabrication. To date, numerous case studies have effectively demonstrated the application of 3D printing technology in crafting custom-fit devices to enhance both wearing comfort and functional capabilities, exemplified by successful instances like 3D printed custom-fit chin implants,[20] shoes,[21,22] eyelid crutches,[23] and hemi-talus replacement.[24] The general process of developing custom-fit devices can be succinctly summarized in four steps. The first step involves obtaining a customized profile, such as the 3D geometry of a customer's feet for designing custom-fit shoes.[22] Next, computer-aided design (CAD) software like SolidWorks or Autodesk generates a digital model based on the acquired profile, followed by the 3D printing of the customized device. The final step is a fitting test, such as wearing the customized shoes, which is crucial for ensuring the quality of the 3D printed device. In this study, we aim to extend and leverage the merits of 3D printing technology for personalized device fabrication, focusing specifically on the production of customized lenses.

In the past decade, customized contact lenses present a remarkable opportunity for individuals who face challenges wearing regular lenses, such as those with corneal damage or patients with keratoconus, to have their unique lens to improve their visual acuity and enhance their wearing comfort.[25-29] The traditional methods of the fabrication of contact lenses include cast molding, spin casting, and lathe cutting. All of these methods are designed for the large majority of commercial contact lenses production and are cost-effective at a large scale. However, they are expensive for low-volume production. Additional polishing processes to smooth the lens surface also further adds time and cost to the manufacturing process.[30,31] Therefore, in this study, we choose to showcase the methodology of 3D printing personalized contact lenses, serving as a case study to highlight the achievements in the custom-fit lens manufacturing process.

Similar to other custom-fit device fabrication protocols, the 3D printing personalized contact lenses involves four steps as shown in FIG. 9: obtaining a customized lens profile through the acquisition of the corneal surface's 3D image, customized contact lens design, 3d printing, and final validation. To accomplish the first step, we found that visible-light optical coherence tomography (vis-OCT) has been well developed and applied to acquire a high-resolution topography of the anterior segment of the target eyeball,[32] and the volumetric resolution of vis-OCT is much higher than the requirement of contact lens fabrication tolerance.[33] After we acquired the corneal surface's 3D image, we processed the OCT B-scan images to reconstruct the corneal surface, and then used this corneal surface as the posterior surface of the contact lens and applied the lens-maker equation to create the anterior surface profile of the contact lens to fulfill the corrective power needs for individuals. In next step, the designed contact lens was saved as a digital model which was uploaded to our home-made μCLIP 3D printer to complete the lens fabrication. Post-processing, including meniscus and post-curing, was done to the 3D printed lens and final validation was conducted by using the vis-OCT system again to evaluate the fitting of the 3D printed contact lens with a sample eye. The breakdown and detailed processes will be presented in the next section. Overall time consumption (presented in Table 1A) from OCT scanning of cornea to contact lens fitting test was only one hour which was much faster than traditional customized contact lens production line. We also evaluated the surface smoothness and the geometry quality of 3D printed contact lens, which showed that our 3D printed contact lens has a nanometer-scale surface roughness and less than 2% tolerance in thickness.

TABLE 1A

Time consumption of vis-OCT image-driven
3D printing customized contact lens

| Process | Time |
| --- | --- |
| Vis-OCT scanning (×3) | <5 mins |
| Image process prior to 3D printing. | <15 mins |
| Processing OCT image. (<5 mins) | |
| Segment cornea structure from B-scan images. (<5 mins) | |
| Design contact lens and create contact lens 3D geometry. (<1 mins) | |
| Generate 3D printing slicing images based on designed contact lens. (<2 mins) | |
| Fabrication with μCLIP system (10 mm diameter contact lens with necessary support). | 10 mins |
| Post-processing | <10 mins |
| Fitting test and evaluating the result | <10 mins |
| Other | <10 mins |
| Total | <60 mins |

TABLE 1B

Time consumption of vis-OCT image-driven
3D printing customized contact lens

| Process | Time |
| --- | --- |
| Vis-OCT scanning (×3) | 3 mins |
| Image process prior to 3D printing. | 13 mins |
| Processing OCT image. (5 mins) | |
| Segment cornea structure from OCT B-scan images. (5 mins) | |
| Design contact lens and create contact lens 3D geometry. (1 mins) | |
| Generate 3D printing slicing images based on designed contact lens. (2 mins) | |
| Fabrication with μCLIP system (a contact lens with a diameter of 10 mm). | 10 mins |
| Post-processing | 10 mins |
| Fitting test and evaluating the result | 10 mins |
| Other | 10 mins |
| Total | 56 mins |

A Dell PC, which has an Intel i9-13900K central processing unit (CPU) and a Dell NVIDIA RTX Aab 2000 12 GB graphics card is used to perform all image processing.

Results and Discussion

Design of Customized Contact Lens

FIG. 1 shows the schematic of the home-made vis-OCT system which we used to acquire images of sample eyeballs. Compared with other OCT systems, our vis-OCT provides 1.3-μm axial resolution imaging of patients' corneal anatomy. The sample image of acquired anterior segment of the sample eye is shown in FIG. 2A. Based on these raw OCT images, a series of image processing steps were performed to convert the B-scan data to 3D printing slicing images. First, the box-filtered raw image was translated into a binarized image to enhance the capabilities to define the cornea geometry of the sample eye (FIG. 2B). Next, a Sobel edge detection function was used to delineate the cornea from binarized image. Then a surface fit function was applied to acquire a smooth 3D geometry of the scanned cornea. (FIG. 2C) To design the contact lens, the smooth 3D structure of the cornea was set as the posterior surface of the contact lens and the optical power of the lens was controlled by adjusting the thickness between the posterior and anterior surfaces of the contact lens. After that, the designed contact lens was output as a computer-aided design (CAD) 3D model—stereolithography (.stl) file (FIG. 2D) and a commercial software, CHITUBOX, was used to add necessary support structures (FIG. 2E) and generate the high-resolution slicing images to allow our home-made μCLIP system to 3D print the contact lens (FIG. 2F). The overall processes are shown in FIGS. 3A-3D. MATLAB was used as the coding platform for image processing and contact lens design.

Fabrication and Characterization of Customized Contact Lens

We chose well-studied hydrogel resin as the material for soft contact lens fabrication. The procedure for hydrogel synthesis was followed previously reported paper with some adjustments to better fit the contact lens printing.[39] We first mixed (2-hydroxyethyl)methacrylate (HEMA, Sigma-Aldrich) as a monomer, Irgacure 819 as a photoinitiator, and ethylene glycol dimethacrylate (EGDMA, Sigma-Aldrich) as a crosslinker, and then the mixture was stirred until clear. The final HEMA resin by weight consisted of 94.8% HEMA, 2.2% photoinitiator, and 3% EGDMA.

Figure 4A:
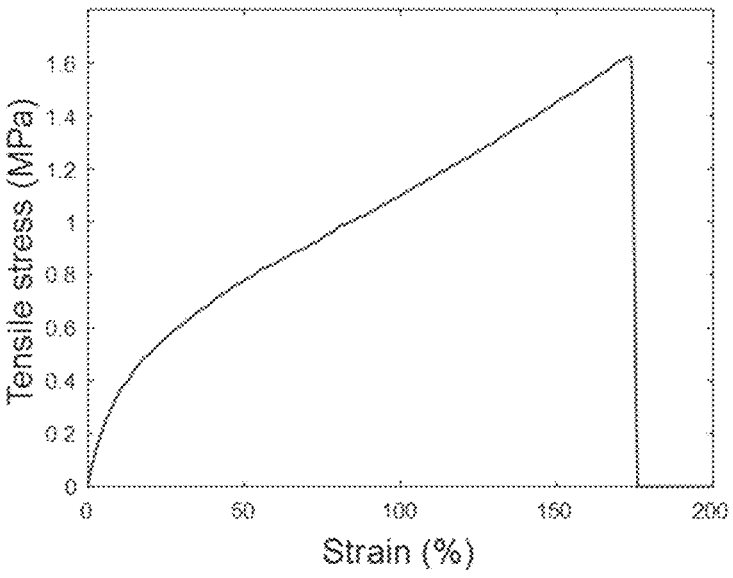
FIGS. 4A-4C.
Figure 4B:
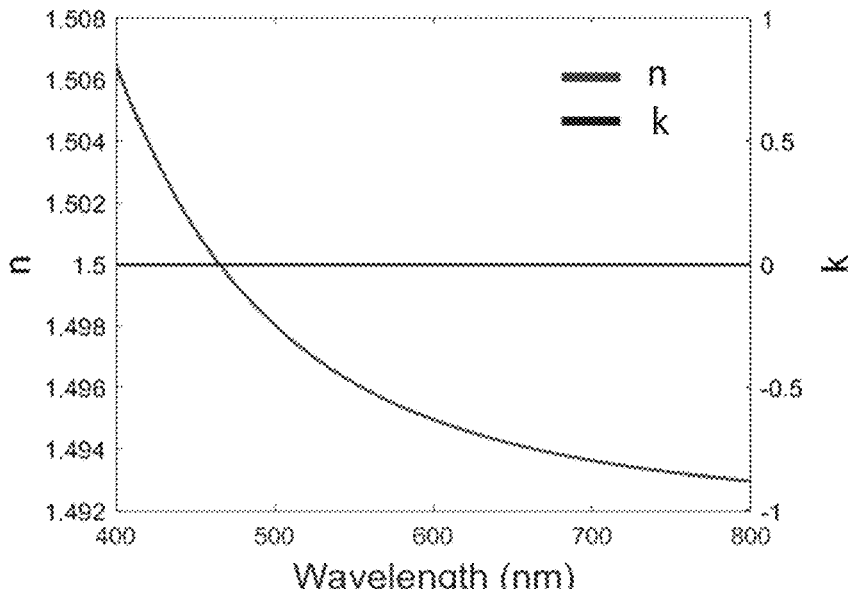
Figure 4C:
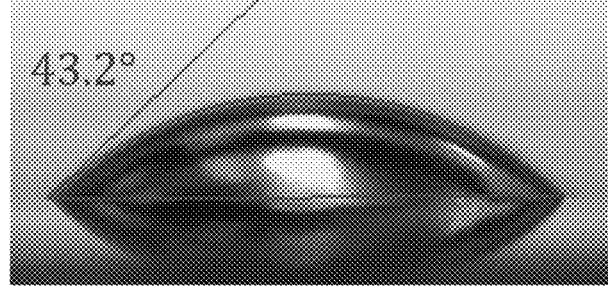

The mechanical properties of the selected material provides the key information of the comfort and durability of contact lens.[35] In this work, we 3D printed a dogbone shape and performed tensile tests thereon following the ASTM-D412 Standard to identify the mechanical properties of pHEMA. The tensile test results showed that fully hydrated 3D printed pHEMA has an ultimate tensile strength (UTS) of 1.6 MPa and presents a maximum elongation of 170% at failure (FIG. 4A). The wavelength dependent complex refractive index of dry pHEMA was measured using a spectroscopic ellipsometer. Measurement procedures were followed as described in previously reported work with some adjustments.[17] FIG. 4B shows the optical properties of this photocurable resin where the pHEMA shows a zero absorption of visible light (k=0 when wavelength is in the range from 400 nm to 800 nm) and with refractive indices ranging from 1.493 to 1.506 in the spectra range from 400 nm to 800 nm, and these results are consistent with data reported in a polymer handbook.[40] To identify the surface wettability of the contact lens materials, a thin layer of pHEMA was prepared to perform a dynamic contact angle measurement and a series of digital images of the time-dependent deionized (DI) water droplet was recorded to present the wettability of the pHEMA. As shown in FIG. 4C, the water contact angle was in the range of 38-45 degrees shortly after a droplet was formed on a dry pHEMA film and decreased when pHEMA was getting wet. This confirms that pHEMA is hydrophilic.[41]

Figure 6A:
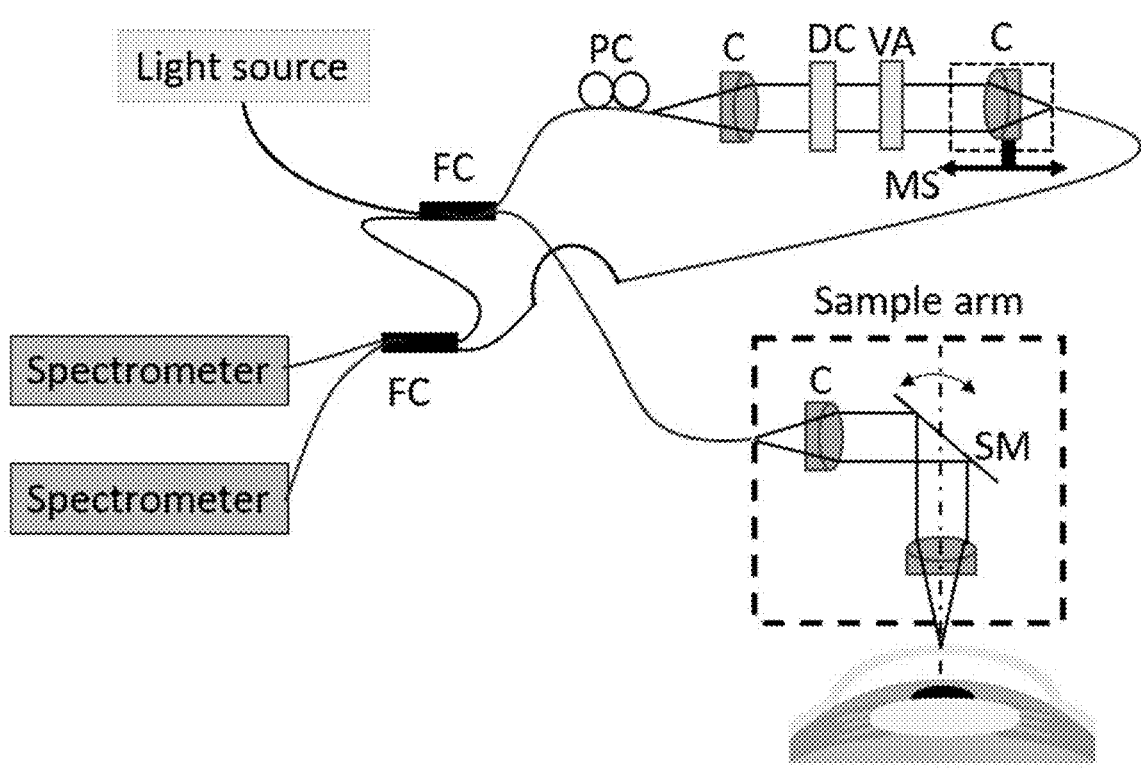
FIGS. 6A-6G.
Figure 6B:
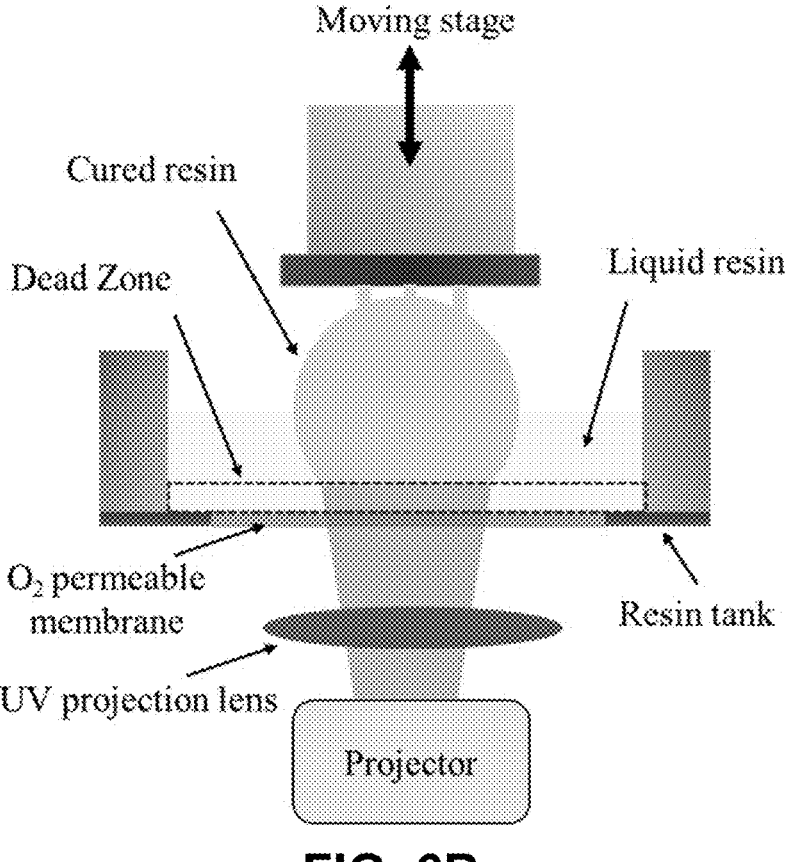
Figure 6C:
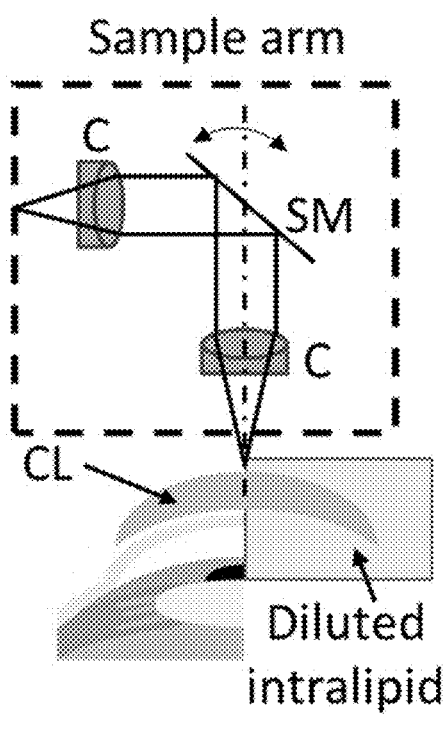
Figure 6D:
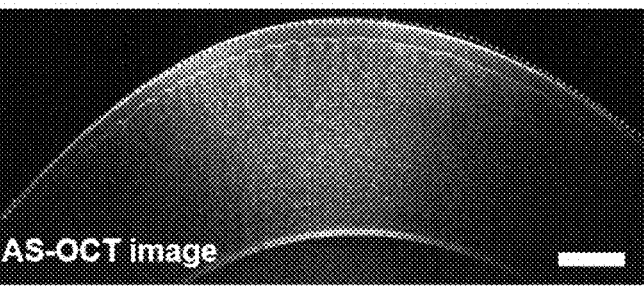
Figure 6E:
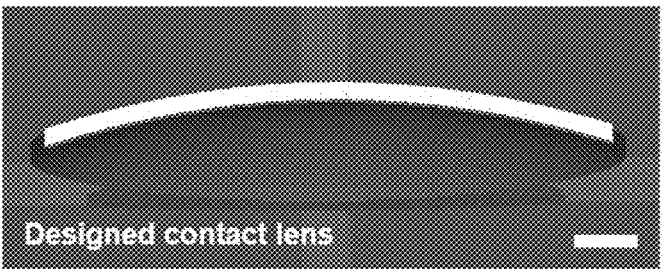
Figure 6F:
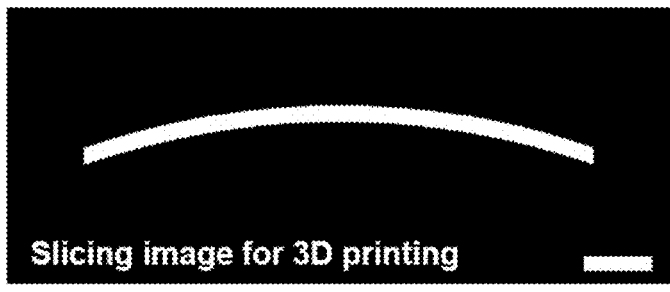
Figure 6G:
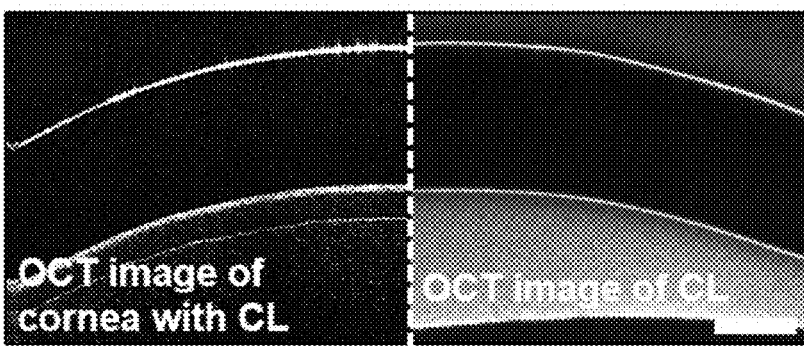

A homemade μCLIP system was used to complete all contact lens fabrication, and the printer setup and operation followed previously reported procedures[34] (FIG. 6B, see also Example 1B). Focal plane pixel resolution was set at 6.75 μm×6.75 μm and 5 μm layer thickness. With optimized printing parameters, a set of three contact lens with a diameter of 14 mm can be finished within one hour. After quick post-processing tasks including washing, meniscus, post-curing, etc. were done, a flexible and transparent contact lens with nanometer scale surface smoothness was ready to be used. FIGS. 7A-7C show the cross-section view of the 3D printed contact lens under a scanning electron microscope (SEM, FEI Quanta 650 ESEM), and zoomed-in SEM images of both sides of the contact lens showing smooth surfaces. Furthermore, the smooth surface profiles were confirmed by optical profiler (Nexview, Zygo) measurement (FIGS. 7D-7F). The images captured with a 2 mm diameter aperture for the contact lens showed a smooth surface profile. The extracted linear profile is shown in FIGS. 7E-7F. The 3D printed contact lens showed a nanometer scale surface smoothness (Ra=1.3 nm).

The post-processed contact lens was placed on the same sample eyeball and the fitting test was carried out via vis-OCT scanning the cornea with the contact lens. FIGS. 8A-8D show that the posterior surface of the 3D printed contact lens fit with the cornea.

We have successfully developed a novel method for fabrication of customized contact lenses using vis-OCT imaging-driven 3D printing. This method offers a fast and easy approach to produce contact lenses with personalized aspherical profiles, allowing for more effective aberration correction and addressing the needs of keratoconus patients with irregular corneas. By employing vis-OCT scanning, we obtained a micrometer level resolution 3D map of the anterior segment of the eye, which serves as a blueprint for the design of the personalized corrective lens. The fabrication material of the soft contact lens, pHEMA, has been synthesized and tested, demonstrating its transparency to visible light and its softness for comfortable wearing while maintaining sufficient rigidity for easy handling. Utilizing 3D printing techniques not only grants lens designers the freedom to incorporate multiple functions but also simplifies the entire corrective lens fabrication process. Our μCLIP system can produce a contact lens with diameter of 10 mm in just 30 minutes, and subsequent post-processing techniques provide the 3D printed contact lens with nanometer level surface finish. To ensure proper fit, a follow-up vis-OCT scan of the eye with the contact lens in place was conducted within seconds. As a conclusion, the vis-OCT imaging-driven 3D printing contact lens method offers a rapid and convenient solution for producing and verifying customized contact lenses. With this approach, customers can obtain their required lenses within 8 hours. In the future, this method can also be broadly applied to other ophthalmological devices.

EXPERIMENTAL SECTION

Tensile Test

Figure 22:
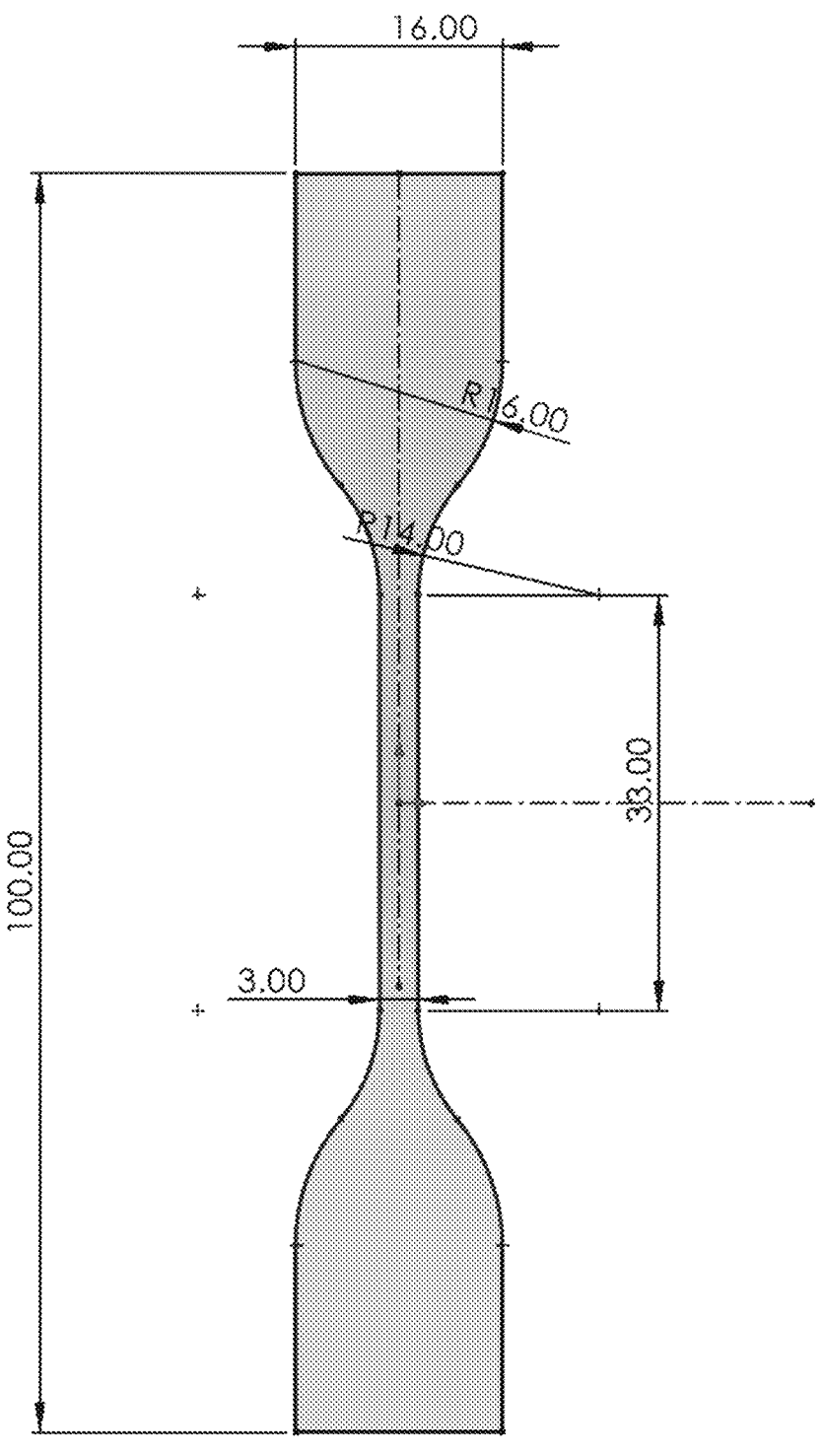
FIG. 22: An illustration of the front view of a dogbone shape used for testing the ultimate tensile strength and maximum elongation at failure of various materials.

The CAD 3D model of the dogbone following the ASTM D-412 Standard was developed by SOLIDWORKS and the dimensions of the dogbone are shown in FIG. 22. After the CAD model was saved as an .stl file, CHITUBOX was used to translate the saved stl file into slicing images. Then these slicing images were input to the μCLIP system to complete the printing of the dogbone. The 3D printed dogbone was washed and post-cured, and then immersed in DI water for 3 days to make sure the dogbone was fully hydrated. Finally, the wet dogbone was loaded into the tensile test machine and the uniaxial quasi-static tensile test was carried out with a constant crosshead speed (elongation rate) of 1 mm/min at ambient temperature (~24° C.) and stopped when failure happened. The mechanical properties such as tensile strength and elongation were obtained from the stress-strain curve calculated from load-displacement curves which were measured by tensile test machine. The cross-section area and gauge length were measured by caliper before tensile test was carried out.

Ellipsometry Measurement

A 100 nm thin film of pHEMA was used as the testing sample to obtain the wavelength-dependent complex refractive index of the pHEMA. The preparation of 100 nm thin pHEMA film is shown as follows: 1) A 100 nm thin double-line gold and platinum (Au—Pt) layer was coated onto a cleaned glass though sputter coating. 2) Another cleaned glass was placed on the previous glass with a pressure added on top. 3) A small droplet of pHEMA resin was added from the side and a sandwich structure was formed. 4) A UV light was added to perform the curing process. 5) A 100 nm pHEMA thin film appeared after the two pieces of glass were separated. Finally, the piece of glass with a 100 nm pHEMA layer was placed into the spectroscopic ellipsometer (M2000U, J. A. Woollam Co) to perform a reflective index test with incident angles of 55, 60, 65, 70 and 75 degrees, and final data was fitted with the Cauchy-film model.

Contact Angle Measurement

The contact angle measurement system (VCA-Optima, AST Products Inc.) and its built-in software were used to carry out the pHEMA contact angle measurement. The contact angle test was performed by adding a small DI water droplet on top of the pHEMA flat film and measuring the time-dependent contact angle though the system's built-in software.

Vis-OCT Scanning of Sample Eyes

We aligned the central axis of each eye with the optical axis of the OCT sample arm. Following alignment, we acquired a volumetric scan of the cornea with and without the contact lens. The vis-OCT images consisted of 1024 A-lines per B-scan and 1024 B-scans. The incident power on the eye was 1.5 mW and the integration time for each A-line was 40 µs. The field of view was 7.85 mm by 7.85 mm for pig eyes.

Fabrication of Contact Lens

The slicing images were loaded into our homemade µCLIP system, and the printing parameters were set as follows: the layer thickness was 5 µm, the exposure time for each layer was 1.35 s, and the overall printing speed was 3.7 µm/s. We set the light intensity to be 3.5 mW/cm² and the first layer exposure time to be 10 s to ensure adhesion between the base layer and printing platform. Once the printing process was done, the printed contact lens was washed with ethanol and then meniscus coating was done on both sides of the 3D printed contact lens followed by a post-curing process. The post-cured contact lens was immersed in DI water and became soft once it was fully hydrated. The fully hydrated contact lens can be punched to a desired size and the final lens was ready to go to the fitting test.

REFERENCES CORRESPONDING TO
EXAMPLE 1A

[1] D. Kalaskar, 3D Printing in Medicine, Woodhead Publishing, An Imprint Of Elsevier, Duxford, United Kingdom, 2017.

[2] M. Salmi, Design and Applications of Additive Manufacturing and 3D Printing, MDPI—Multidisciplinary Digital Publishing Institute, Basel, 2022.

[3] I. V Shishkovsky, New Trends in 3D Printing, IntechOpen, Rijeka, Croatia, 2016.

[4] J. Z. Gul, M. Sajid, M. M. Rehman, G. U. Siddiqui, I. Shah, K.-H. Kim, J.-W. Lee, K. H. Choi, Science and technology of advanced materials 2018, 19, 243.

[5] A. W. Basit, S. Gaisford, SpringerLink, 3D Printing of Pharmaceuticals, Springer International Publishing, Cham, 2018.

[6] A. A. Shapiro, J. P. Borgonia, Q. N. Chen, R. P. Dillon, B. McEnerney, R. Polit-Casillas, L. Soloway, Journal of Spacecraft and Rockets 2016, 53, 952.

[7] C. BAÑÓN, 3D Printing Architecture: Workflows, Applications, and Trends, Springer Singapore, Singapore, 2021.

[8] International journal for traffic and transport engineering 2021, 11, DOI 10.7708/ijtte.2021.11(1).05.

[9] A. Camposeo, L. Persano, M. Farsari, D. Pisignano, Advanced Optical Materials 2019, 7, 1800419.

[10] D. T. Nguyen, C. Meyers, T. D. Yee, N. A. Dudukovic, J. F. Destino, C. Zhu, E. B. Duoss, T. F. Baumann, T. Suratwala, J. E. Smay, R. Dylla-Spears, Advanced Materials 2017, 29, 1701181.

[11] G. Loke, R. Yuan, M. Rein, T. Khudiyev, Y. Jain, J. Joannopoulos, Y. Fink, Nat Commun 2019, 10, 4010.

[12] T. Gissibl, S. Thiele, A. Herkommer, H. Giessen, Nature Photon 2016, 10, 554.

[13] D. Wu, J.-N. Wang, L.-G. Niu, X. L. Zhang, S. Z. Wu, Q.-D. Chen, L. P. Lee, H. B. Sun, Advanced Optical Materials 2014, 2, 751.

[14] J. Li, S. Thiele, R. W. Kirk, B. C. Quirk, A. Hoogendoorn, Y. C. Chen, K. Peter, S. J. Nicholls, J. W. Verjans, P. J. Psaltis, C. Bursill, A. M. Herkommer, H. Giessen, R. A. McLaughlin, Small 2022, 18, 2107032.

[15] T. Gissibl, S. Thiele, A. Herkommer, H. Giessen, Nat Commun 2016, 7, 11763.

[16] X. Chen, W. Liu, B. Dong, J. Lee, H. O. T. Ware, H. F. Zhang, C. Sun, Advanced Materials 2018, 30, 1705683.

[17] R. Hai, G. Shao, H. O. T. Ware, E. H. Jones, C. Sun, Advanced Materials 2023, 35, 2208365.

[18] Y. Zhang, L. Wu, M. Zou, L. Zhang, Y. Song, Advanced Materials 2022, 34, 2107249.

[19] G. Shao, R. Hai, C. Sun, Advanced Optical Materials 2020, 8, 1901646.

[20] P.-C. Chang, Aesthetic surgery journal 2018, 38, 1.

[21] W. Kenny, R & D: reading for the R & D community 2017.

[22] "Design of a segmented custom ankle foot orthosis with custom-made metal strut and 3D-printed footplate and calf shell—Northwestern University," can be found under https://search.library.northwestern.edu/discovery/fulldisplay?docid=cdi_openaire_primary_doi_dedup_cdec75f8-a5388cd6546faf74306fa333&context=PC&vid=01N-WU_INST:NULVNEW&lang=en&search_scope=Mylnst_and_CI&adaptor=Primo%20Central&tab=Everything&query=any,contains,3d%20printing%20custom-fit, n.d.

[23] M. G. Sun, D. Rojdamrongratana, M. I. Rosenblatt, V. K. Aakalu, C. Q. Yu, Orbit (Amsterdam) 2019, 38, 342.

[24] P. D. Highlander, Clinical Applications of 3D Printing in Foot and Ankle Surgery, Elsevier, Philadelphia, PA, 2024.

[25] V. M. Rathi, P. S. Mandathara, S. Dumpati, Indian J Ophthalmol 2013, 61, 410.

[26] A. Jinabhai, W. Neil Charman, C. O'Donnell, H. Radhakrishnan, Ophthalmic & Physiological Optics 2012, 32, 200.

[27] R. Sabesan, T. M. Jeong, L. Carvalho, I. G. Cox, D. R. Williams, G. Yoon, Opt. Lett., OL 2007, 32, 1000.

[28] J. D. Marsack, K. E. Parker, Y. Niu, K. Pesudovs, R. A. Applegate, J Refract Surg 2007, 23, 960.

[29] C. Katsoulos, L. Karageorgiadis, N. Vasileiou, T. Mousafeiropoulos, G. Asimellis, *Ophthalmic and Physiological Optics* 2009, 29, 321.

[30] N. Efron, C. Maldonado-Codina, in *Comprehensive Biomaterials* (Ed.: P. Ducheyne), Elsevier, Oxford, 2011, pp. 517-541.

[31] J. J. Newman, S. D. Newman, W. M. Tipton, T. O. Glasbey, H. S. Sutton, *Contact Lenses and Processes for Manufacturing Contact Lenses*, 2006, EP1694494A2.

[32] X. Shu, L. Beckmann, H. Zhang, *J Biomed Opt* 2017, 22, 1.

[33] "ISO 18369-2:2017(en), Ophthalmic optics—Contact lenses—Part 2: Tolerances," can be found under https://www.iso.org/obp/ui/en/#iso:std:iso:18369:-2:ed-3:v1:en, n.d.

[34] J. Huang, H. O. T. Ware, R. Hai, G. Shao, C. Sun, *Advanced Materials* 2021, 33, 2005672.

[35] F. Alam, M. Elsherif, B. AlQattan, A. Salih, S. M. Lee, A. K. Yetisen, S. Park, H. Butt, *ACS Biomater. Sci. Eng.* 2021, 7, 794.

[36] F. Zhao, J. Wang, L. Wang, L. Chen, *Contact Lens and Anterior Eye* 2019, 42, 165.

[37] J. R. Tumbleston, D. Shirvanyants, N. Ermoshkin, R. Janusziewicz, A. R. Johnson, D. Kelly, K. Chen, R. Pinschmidt, J. P. Rolland, A. Ermoshkin, E. T. Samulski, J. M. DeSimone, *Science* 2015, 347, 1349.

[38] M. Zare, A. Bigham, M. Zare, H. Luo, E. Rezvani Ghomi, S. Ramakrishna, *International Journal of Molecular Sciences* 2021, 22, 6376.

[39] R. L. Keate, J. Tropp, C. P. Collins, H. O. T. Ware, A. J. Petty I I, G. A. Ameer, C. Sun, J. Rivnay, *Macromolecular Bioscience* 2022, 22, 2200103.

[40] "Polymer Handbook, 2 Volumes Set, 4th Edition|Wiley," can be found under https://www.wiley.com/en-us/Polymer+Handbook%2C+2+Volumes+Set%2C+4th+Edition-p-9780471479369, n.d.

[41] M. L. Read, P. B. Morgan, J. M. Kelly, C. Maldonado-Codina, *J Biomater Appl* 2011, 26, 85.

Example 1B: Additional Exemplary Details and Aspects Supplemental to Example 1A Vis-OCT System FIG. 1 shows a schematic of the vis-OCT system we used to image the eyes. Briefly, light from a supercontinuum laser with a 300 MHz repetition rate is sent through a short pass filter (Semrock FF02-692) to serve as a light source. The light source was sent to a 20:80 fiber coupler (Gould Fiber Optics) with 20% of light going to the sample arm. The reference arm consisted of bk7 dispersion glass and a variable ND filter (Thorlabs NDC-100S-4M). The sample arm consisted of a galvanometer (scannermax compact-506 galvo) and a 25 mm achromatic objective lens (Thorlabs AC127-019-A). The lateral resolution of our sample arm is about 6 μm. We used a commercial spectrometer (Blizzard S R, Opticent Health) with a spectral range of 510 to 614 nm. The experimentally measured axial resolution in air was 1.8 μm, close to the theoretical value of 1.4 μm given by $\delta z = 0.44 \lambda c^2 / \Delta \lambda$ for a Gaussian spectrum. Assuming a refractive index of 1.376 for the cornea, this corresponds to an axial resolution of 1.3 μm in tissue.

μCLIP System

Our homemade μCLIP printer consists of a digital micro-mirror device (DMD) light engine (Pro 6600, Wintech Digital System Technology Corporation) with a resolution of 4K (3860×2160 pixels) and 385 nm ultraviolet (UV) light source, a UV projection lens (UV8040BK2, Universe Kogaku America Inc.), a resin tank with a piece of PDMS membrane functioning as an oxygen permeable window and a building platform controlled by a six-axis robotic arm (Meca500 R3, Mecademic). The control of the image projection and building platform movement was done via Python code. FIG. 6B shows the schematic of the μCLIP system. The image was projected by the DMD light engine to the liquid resin from bottom. The oxygen in air diffused into the liquid resin though the oxygen permeable window (PDMS thin film) and inhibited free radical polymerization which generates a non-reaction region on top of the PDMS film, named "deadzone". This deadzone prevents the adhesion between the bottom layer of the cured part and the top surface of the transparent window, which allows the printing process to become continuous.

TABLE 2

Cost breakdown of the resin used for fabricating a single CL with PEGDA based hydrogel.

| Chemical name | Ratio (wt. %) | Unit Price (USD/g) |
|---|---|---|
| PEGDA (Poly(ethylene glycol) diacrylate) | 65.85 | 0.300 |
| TET (Trimethylolpropane ethoxylate triacrylate) | 33 | 0.232 |
| Irgacure 819 (Phenylbis(2,4,6-trimethylbenzoyl)phosphine oxide) | 1.0 | 3.893 |
| Avobenzone | 0.15 | 1.380 |
| | Total cost | 0.315 |

Prices were obtained from the Sigma-Aldrich and TCI websites on 4 Dec. 2023

TABLE 3

Cost breakdown of the resin used for fabricating a single CL with HEMA based hydrogel.

| Chemical name | Ratio (wt. %) | Unit Price (USD/g) |
|---|---|---|
| HEMA (2-Hydroxyethyl methacrylate) | 94.8 | 0.052 |
| EGDEA (Ethylene glycol dimethacrylate) | 3 | 0.318 |
| Irgacure 819 (Phenylbis(2,4,6-trimethylbenzoyl)phosphine oxide) | 2.2 | 3.893 |
| | Total cost | 0.315 |

Prices were obtained from the Sigma-Aldrich website on 4 Dec. 2023

TABLE 4

Cost breakdown of our customized 3D printing system.

| Components | Price (USD) |
|---|---|
| UV Projector (Pro 6600, Wintech Digital Systems Technology Corp. 3860 × 2160 pixels) | 6,473 |
| UV Projection lens (UV8040BK2, Universe Kogaku America Inc.) | 1,350 |
| Robot arm (Meca500, R3, Mecademic Inc.) | 14,040 |
| Resin tank (CNC machined) | 50 |
| Other components for installation | 500 |
| Computer | 1,000 |
| Total cost | 23,413 |

Example 2: Other Polymeric Materials in Some Exemplary Embodiments

Figure 5A:
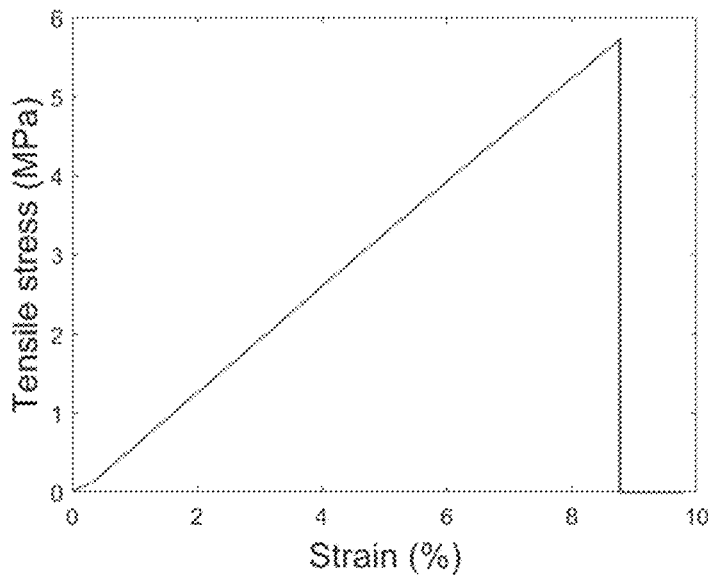
FIGS. 5A-5C.
Figure 5B:
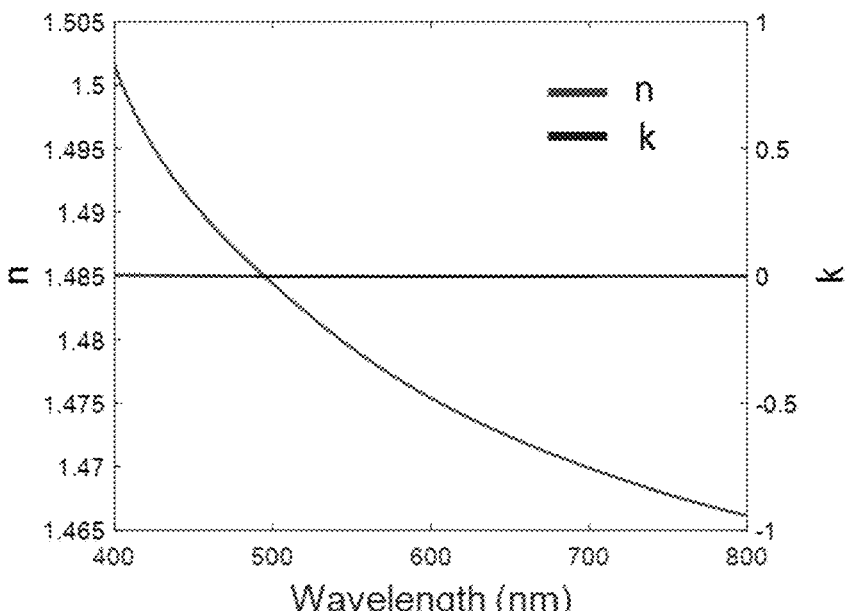
Figure 5C:
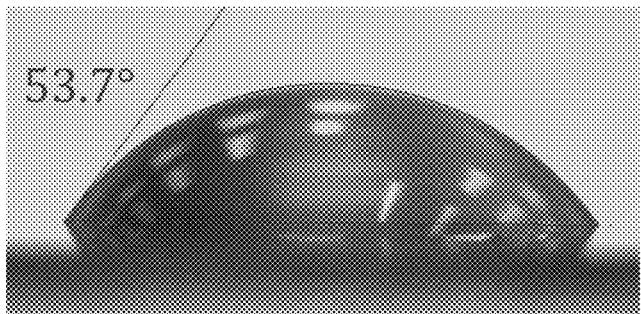

FIGS. 5A-5C show the mechanical properties of PEGDA. A dogbone was 3D printed and tensile tests were performed following the ASTM-D412 Standard to identify the mechanical properties of PEGDA. The tensile test results (shown in FIG. 5A) showed that fully hydrated 3D printed PEGDA has an ultimate tensile strength (UTS) of over 5.5 MPa and presents a maximum elongation of over 8% at failure. The wavelength dependent complex refractive index of dry PEGDA was measured using a spectroscopic ellipsometer. Measurement procedures were followed as described in previously reported work with some adjustments. FIG. 5B shows the optical properties of this photocurable resin where the PEGDA shows a zero absorption of visible light (k=0) when wavelength is in the range from 400 nm to 800 nm) and with refractive indices ranging from 1.465 to 1.505 in the spectra range from 400 nm to 800 nm. To identify the surface wettability of the contact lens materials, a thin layer of PEGDA was prepared to perform a dynamic contact angle measurement and a series of digital images of the time-dependent deionized (DI) water droplet was recorded to present the wettability of the PEGDA. As shown in FIG. 5C, the water contact angle was in the range of 45 to 60 degrees shortly after a droplet was formed on a dry PEGDA film and decreased when PEGDA was getting wet. This confirms that PEGDA is hydrophilic.

Example 3: Exemplary Methods of the Invention

FIG. 19 shows exemplary methods in more detail. The method 2200 comprises imaging and acquiring data of an outer surface of a cornea of a subject using visible-light optical coherence tomography (vis-OCT) (step 2210). In some embodiments, method 2200 further comprises designing a customized ocular contact lens from the image data (step 2220). In some embodiments, method 2200 further comprises manufacturing a customized ocular contact lens using additive manufacturing (step 2230). In some embodiments, method 2200 further comprises verifying the shape of the manufactured customized ocular contact lens by imaging the anterior surface and posterior surface of the manufactured customized ocular contact lens using vis-OCT.

FIG. 20 provides more detail regarding step 2220. In some embodiments, step 2220 comprises processing the image data to generate a 3-D computational model of an outer surface of the cornea based on the acquired image data (step 2222). In some embodiments, step 2220 further comprises determining the posterior surface of the customized ocular contact lens using the 3-D computational model (step 2224). In some embodiments, step 2220 further comprises determining the anterior surface of the customized ocular contact lens to provide a selected optical power to the customized ocular contact lens (step 2226). In some embodiments, step 2220 further comprises generating a 3-D printable data set of the customized ocular contact lens comprising the determined posterior surface and the determined anterior surface (step 2228).

Example 4: Exemplary Methods of 3D Printing an Ocular Contact Lens

In some exemplary methods of the invention, a μCLIP system (FIG. 10A) is used to 3D print an ocular contact lens. The μCLIP system comprises a building platform, where the ocular contact lens is printed and a resin tank containing a photocurable liquid resin. As the ocular contact lens is printed on the building platform, supports are also printed to support the ocular contact lens as it is being printed.

Figure 10C:
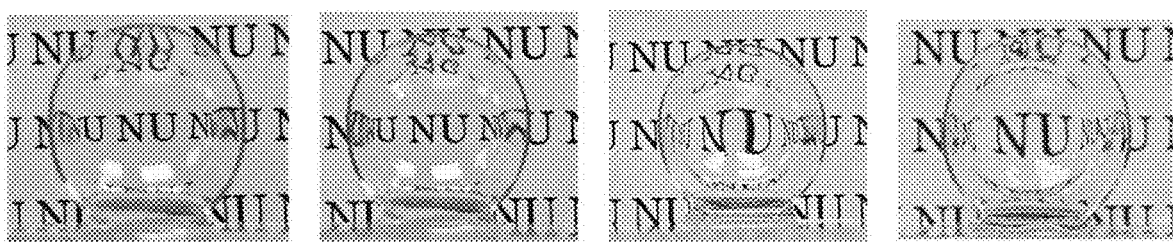

FIG. 10B shows an example ocular contact lens after printing having zero optical power. However, the ocular contact lens need not be restricted to have zero optical power. FIG. 10C shows a series of ocular contact lenses having a variety of optical powers, ranging from −6D to +6D.

Figure 10D:
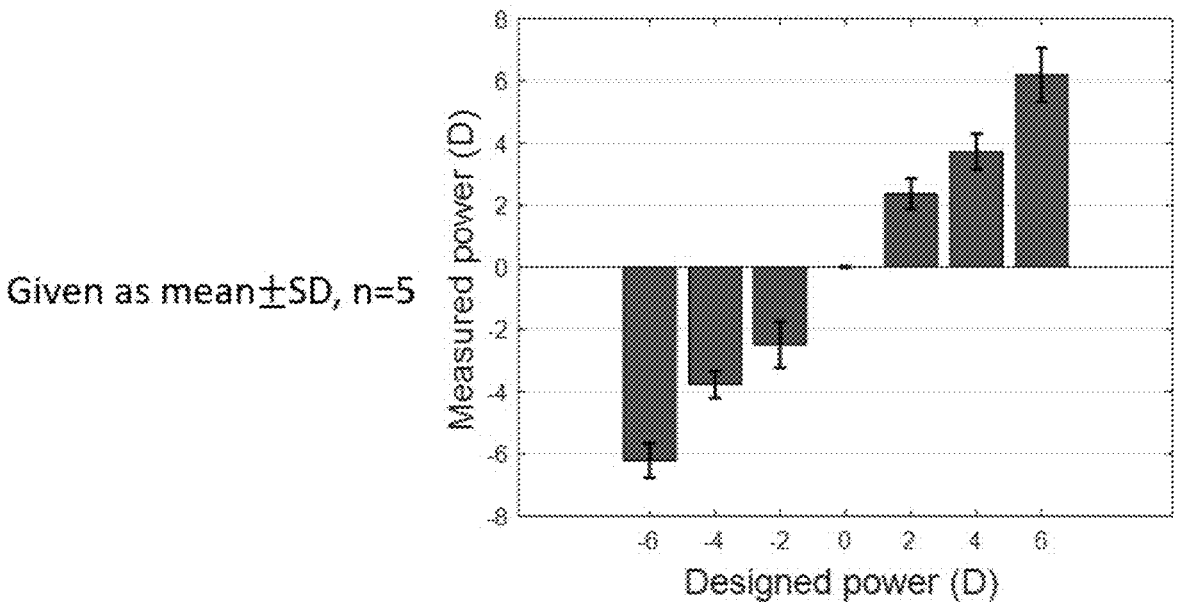

The resulting optical power of the manufactured ocular contact lenses is very accurate when compared to the designed optical power. In particular, five lenses were printed at each power, after which the power of the lenses was measured using a lensometer. The resulting accuracy of the optical power is shown in FIG. 10D.

Figure 10E:
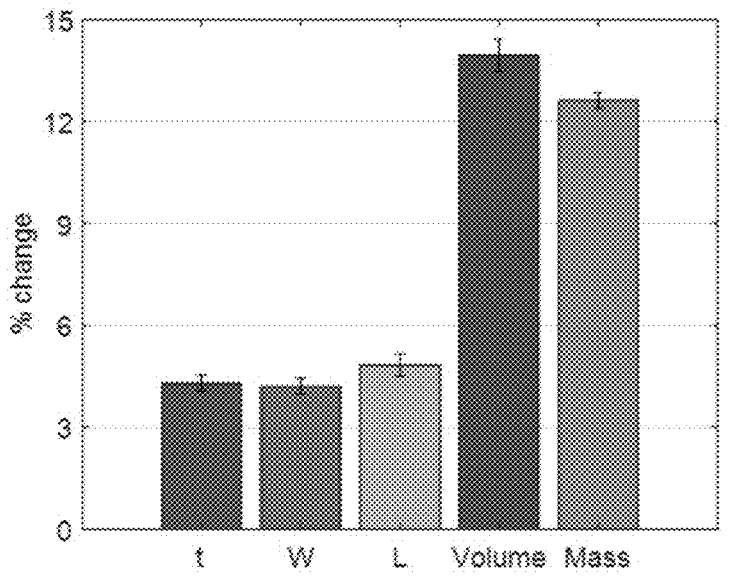

Each lens was also measured while dry, and then after being submerged in water for over 48 hours. The resulting differences in thickness (t), width (W), length (L), volume, and mass are illustrated in FIG. 10E.

Figure 11A:
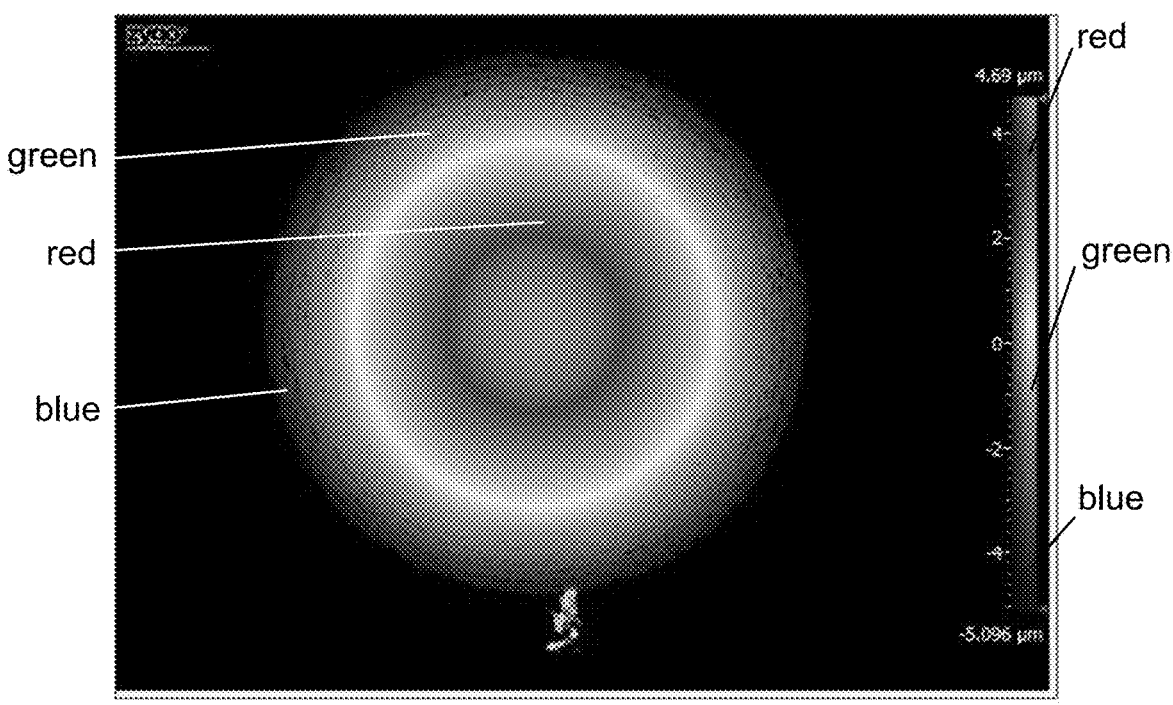
FIGS. 11A-11C.
Figure 11B:
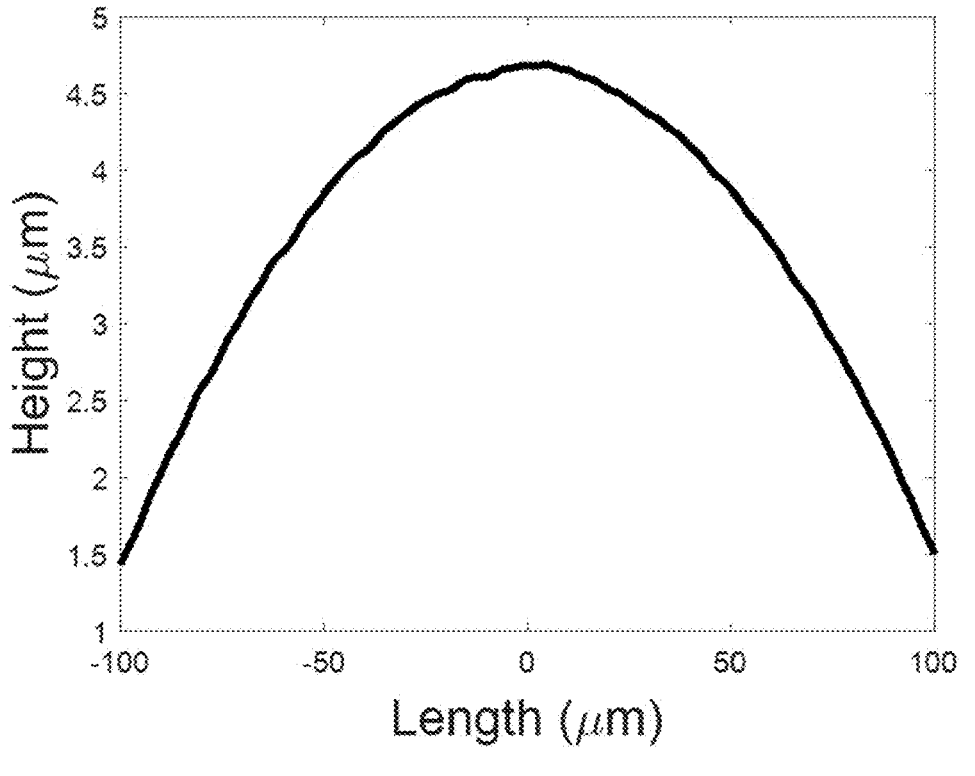
Figure 11C:
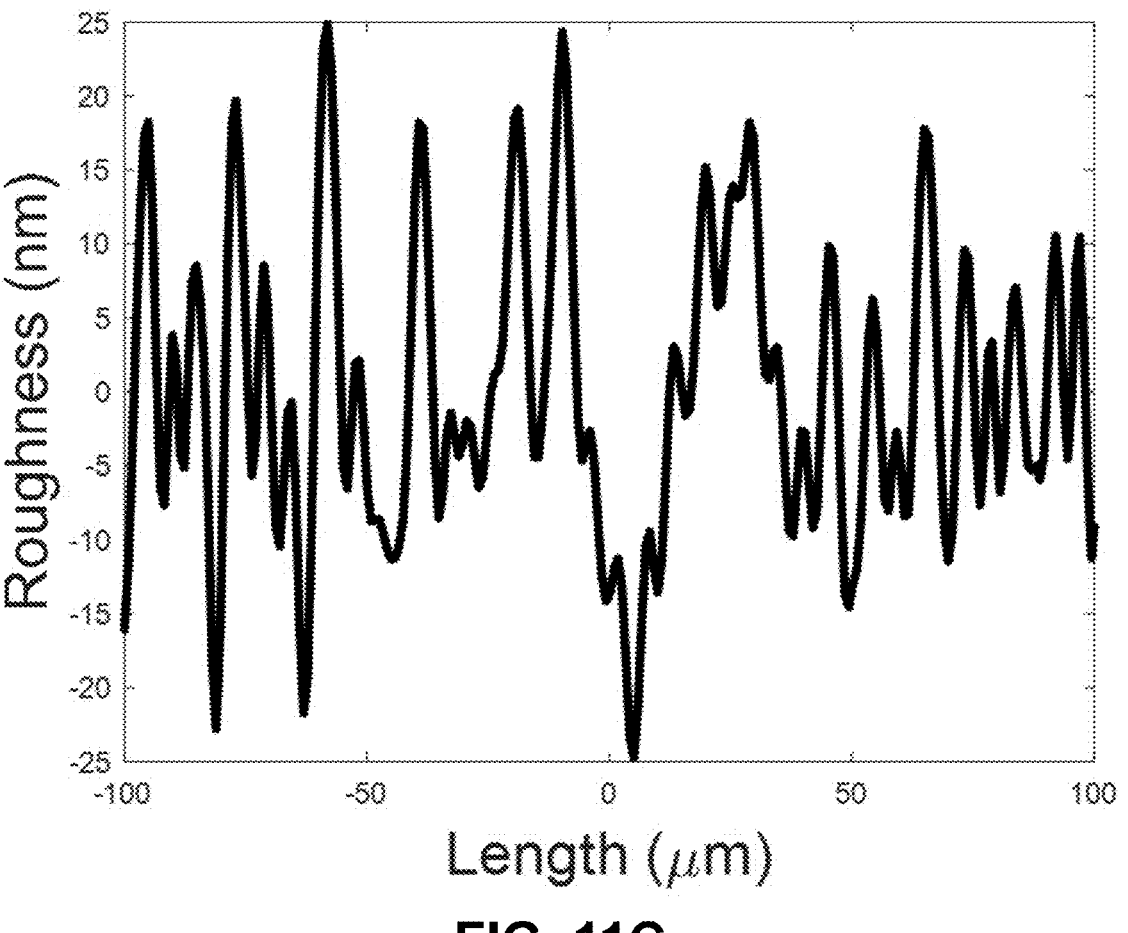

Furthermore, smooth surface profiles were measured by optical profiler (Nexview, Zygo) measurement (FIGS. 11A-11C). The images were captured with a 2 mm diameter aperture for the contact lens showed a smooth surface profile. The extracted linear profile is shown in FIGS. 7E-7F. The 3D printed contact lens showed a nanometer scale surface smoothness.

Figure 15:
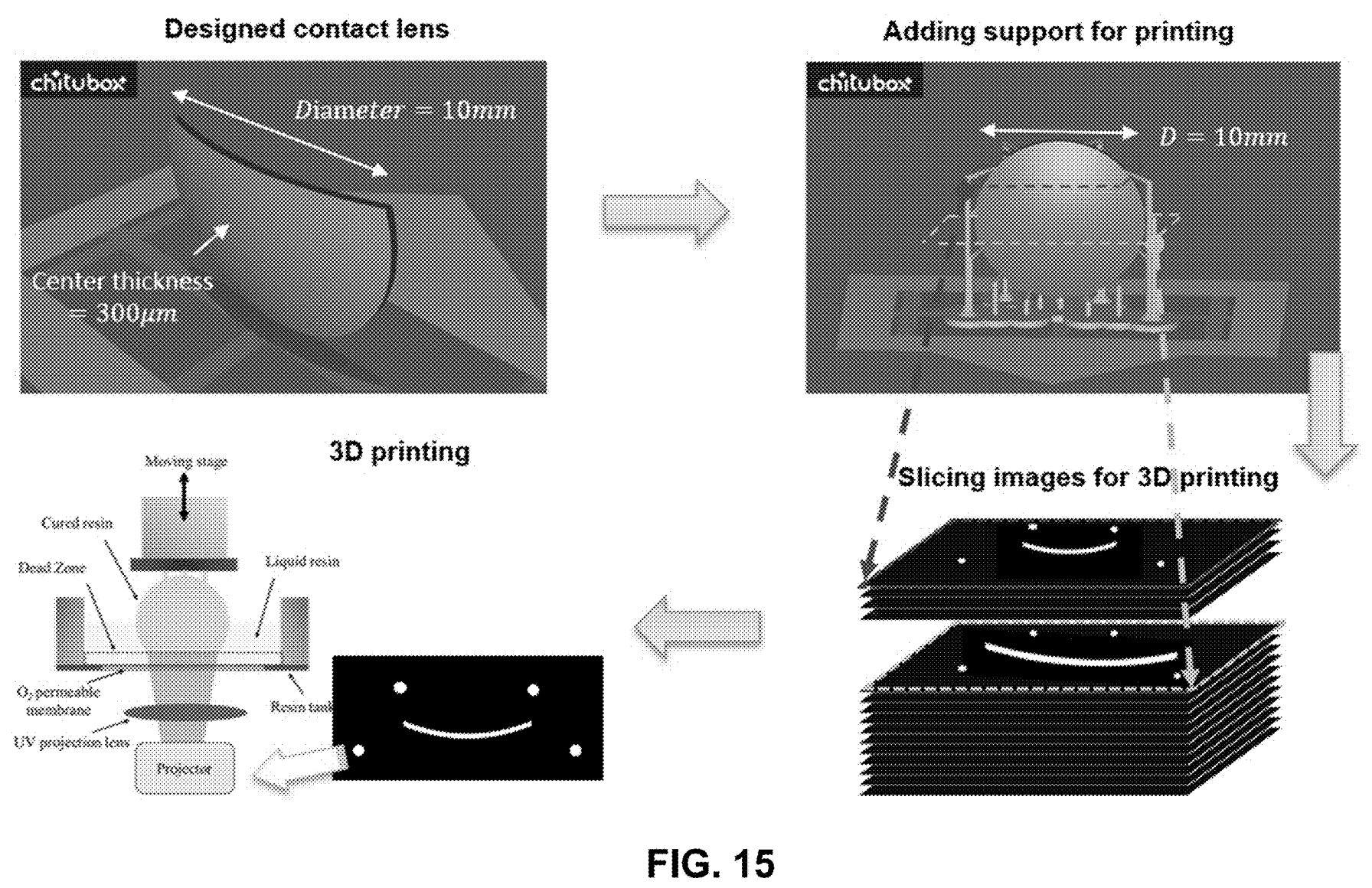

As shown in FIG. 15, once an ocular contact lens is designed and the shape to be printed is determined, supports are added to the design. The supports support the ocular contact lens as the lens is printed.

After supports are added to the shape to be printed, the shape is sliced, thereby generating a series of images to be printed. Each of this series of images is passed to the projector of a μCLIP 3D printing system to print the ocular contact lens.

Figure 16C:
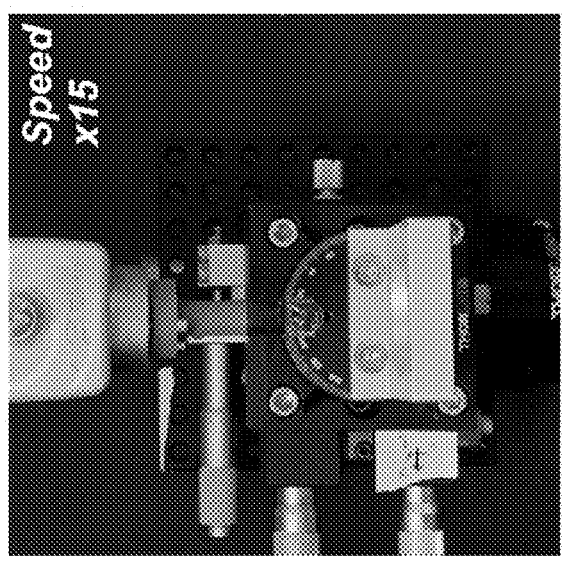
FIGS. 16A-16C: Stills from a video of a 3D printer printing a contact lens.
Figure 16B:
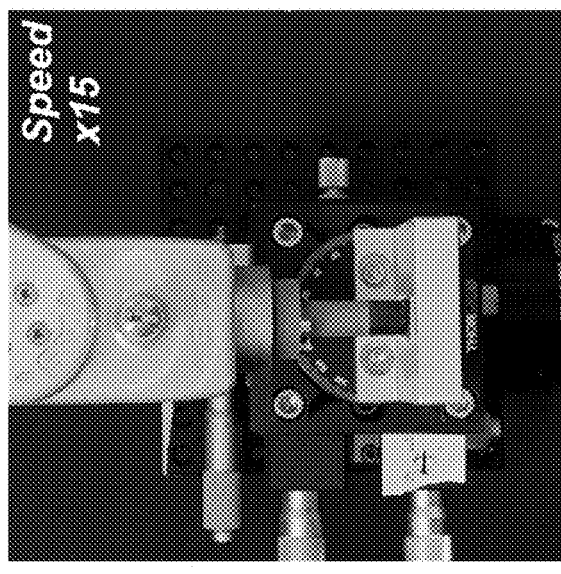
Figure 16A:
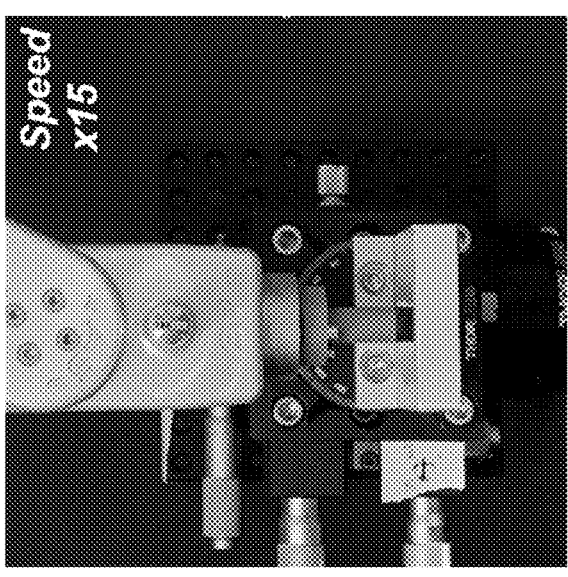

FIGS. 16A-16C shows the progression of an ocular contact lens being 3D printed near the beginning of the print (FIG. 16A), towards the middle of the print (FIG. 16B), and at the end of the print (FIG. 16C). Notably, it can be seen that the contact lens is printed here in a vertical orientation.

Figure 12:
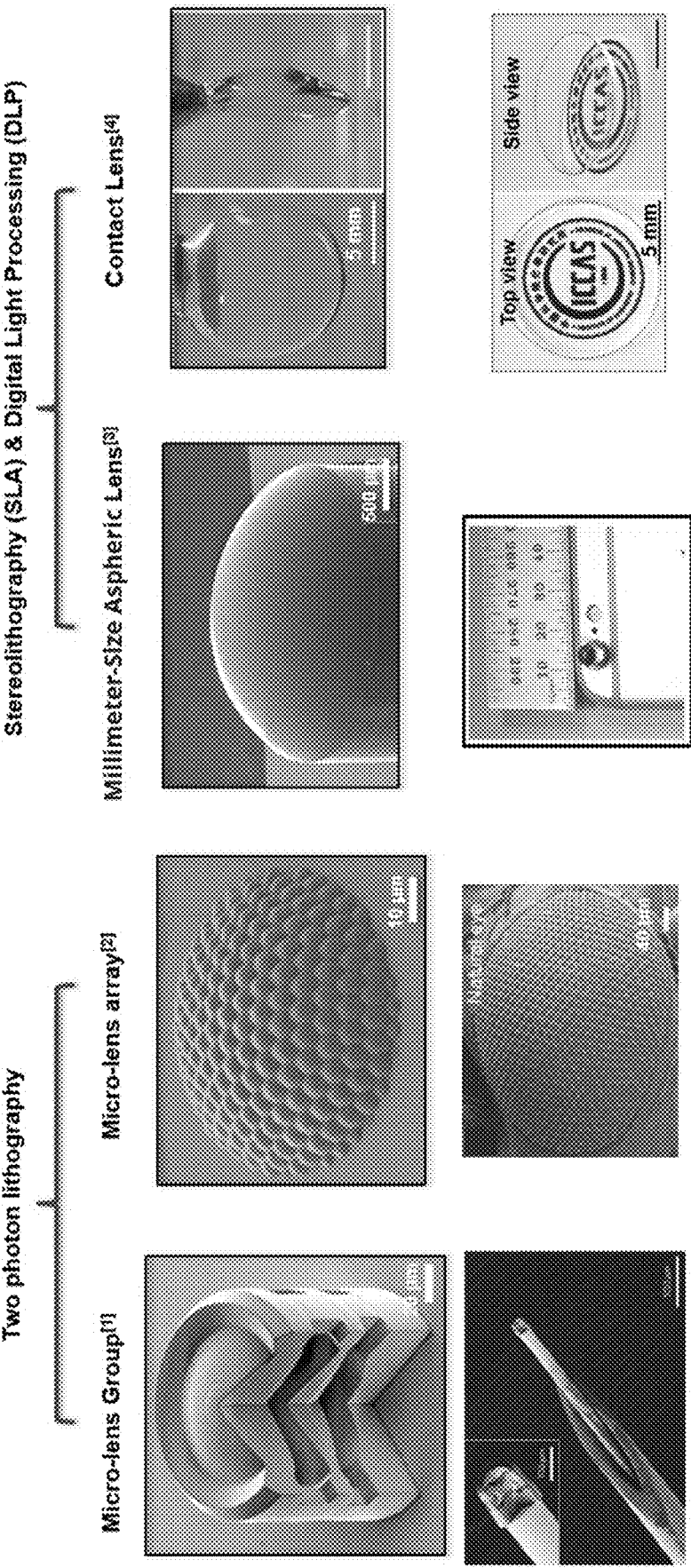
FIG. 12: Optical lenses were fabricated with different 3D printing techniques.

Example 5: Examples of Ocular Contact Lenses Printed Using Different Printing Techniques As shown in FIG. 12, ocular contact lenses can be printed using various printing techniques. For example, ocular contact lenses can be printed using two-photon lithography, including a micro-lens group and a micro-lens array. Ocular contact lenses can also be printed using stereolithography (SLA) or digital light processing (DLP), including millimeter-size aspheric lenses and regular lenses.

Figure 13:
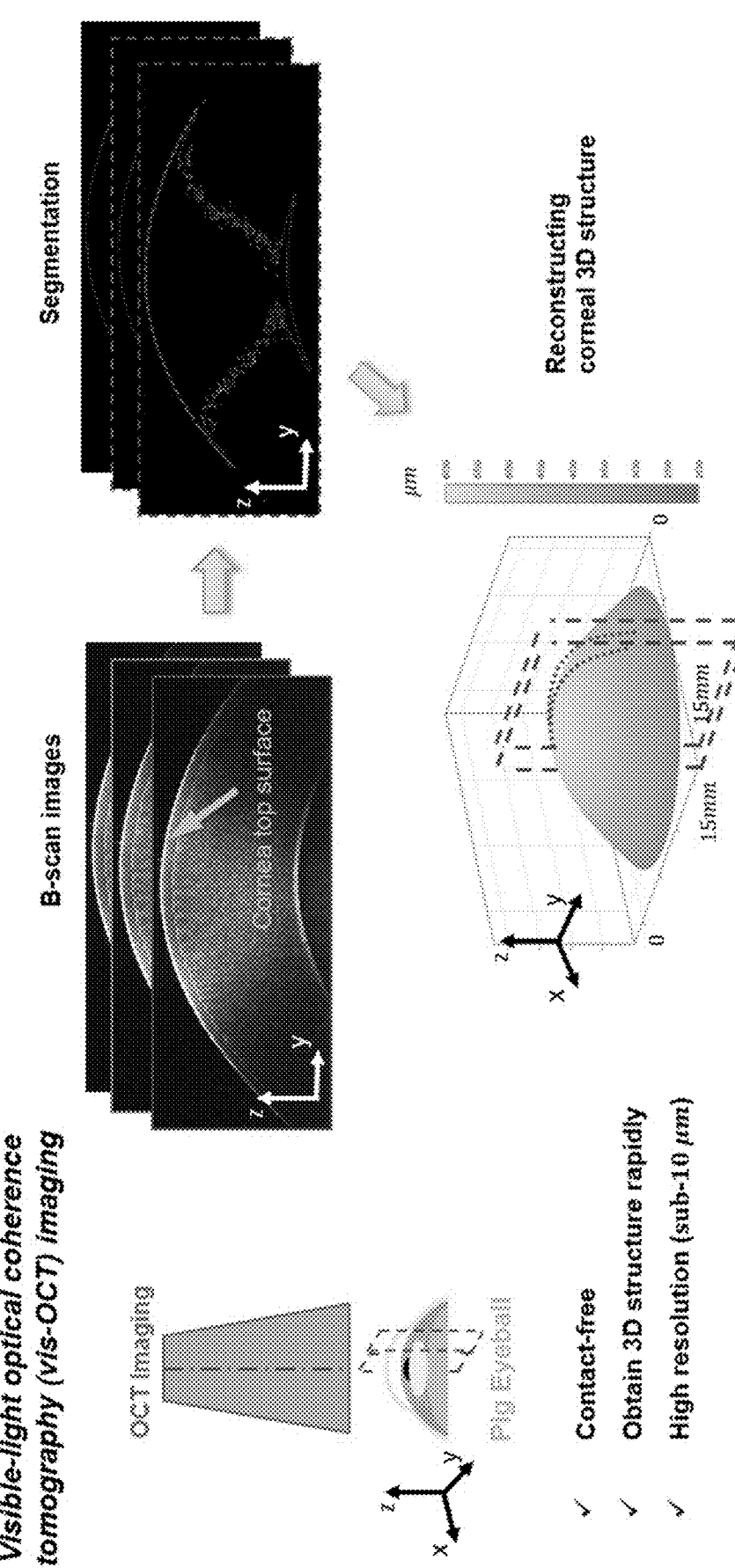
FIG. 13: A schematic showing how the 3D surface geometry of a scanned cornea is obtained based on OCT B-scan images.

Example 6: Exemplary Methods of Customizing an Ocular Contact Lens Based on the Cornea of a Subject and a Selected Optical Power As shown in FIG. 13, an exemplary method of customizing an ocular contact lens based on the cornea of a subject includes using vis-OCT imaging to obtain a series of B-scan images of the cornea. Imaging the cornea using vis-OCT has the advantages of being free of physical contact with the cornea, and being capable of rapidly obtaining a high resolution 3D structure of the cornea. Each of the series of B-scan images is segmented to determine the outer surface of the cornea in each image. The determined outer surfaces are reconstructed into a 3D structure.

Figure 14:
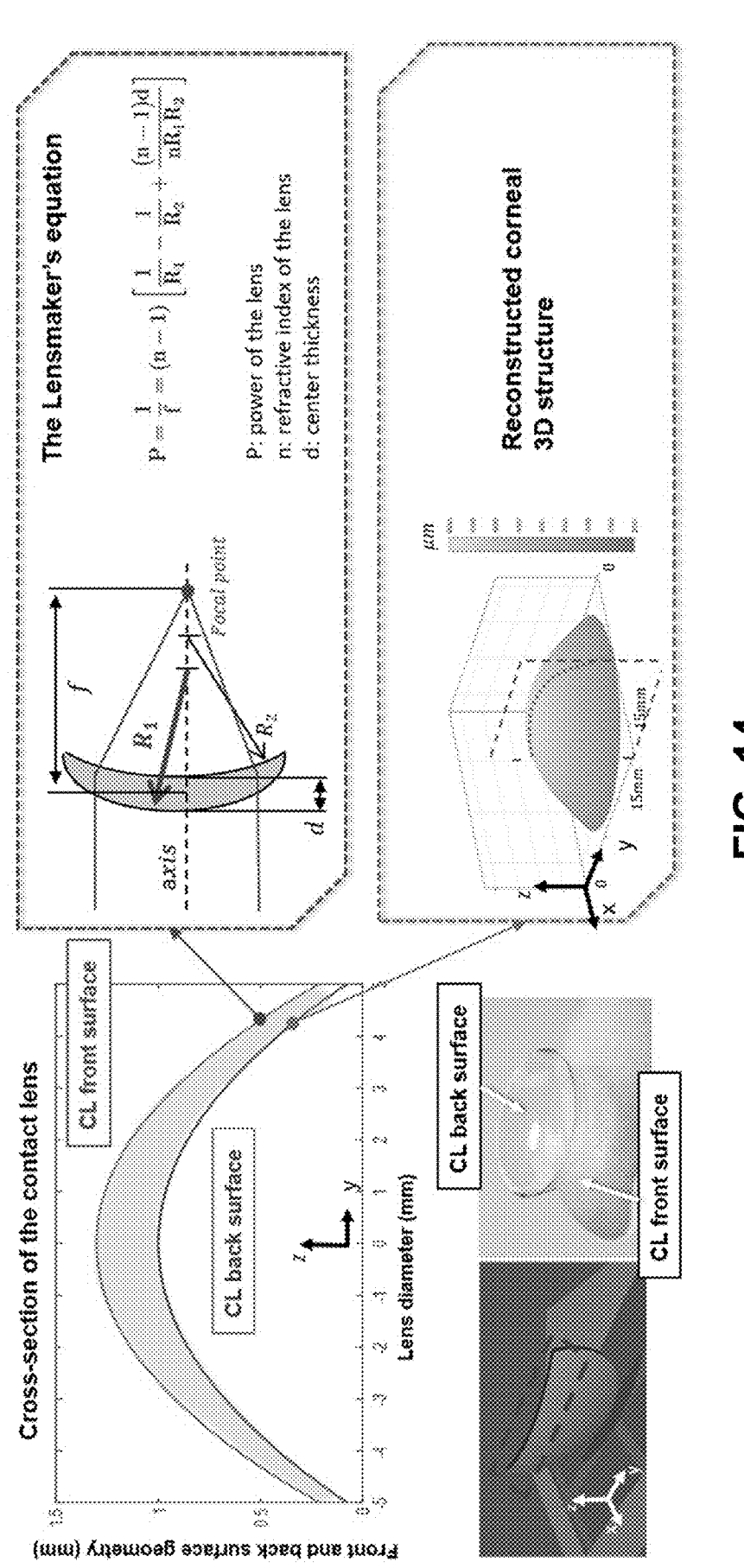
FIG. 14: A diagram showing the use of the 3D surface geometry of a scanned cornea as the posterior surface of a contact lens, and the application of the lensmaker equation to generate the anterior surface of the contact lens and thereby give the contact lens a selected optical power.

As shown in FIG. 14, the posterior (back) surface of the customized ocular contact lens is designed to follow the surface of the reconstructed 3D structure. The anterior (front) surface is designed using the lensmaker equation to provide a selected optical power to the lens when it is manufactured.

Example 7: Exemplary Methods of Verifying the Optical Power and Printing Quality of a 3D Printed Ocular Contact Lens As shown in FIG. 17A, multiple ocular contact lenses can be printed simultaneously on the building platform of a µCLIP system. The ocular contact lenses each comprise a 2 mm support ring for handling of the lens. Each lens is then placed on a lensometer to measure the optical power of the lens. In this case, the lens was designed to have an optical power of +4D.

Figure 17B:
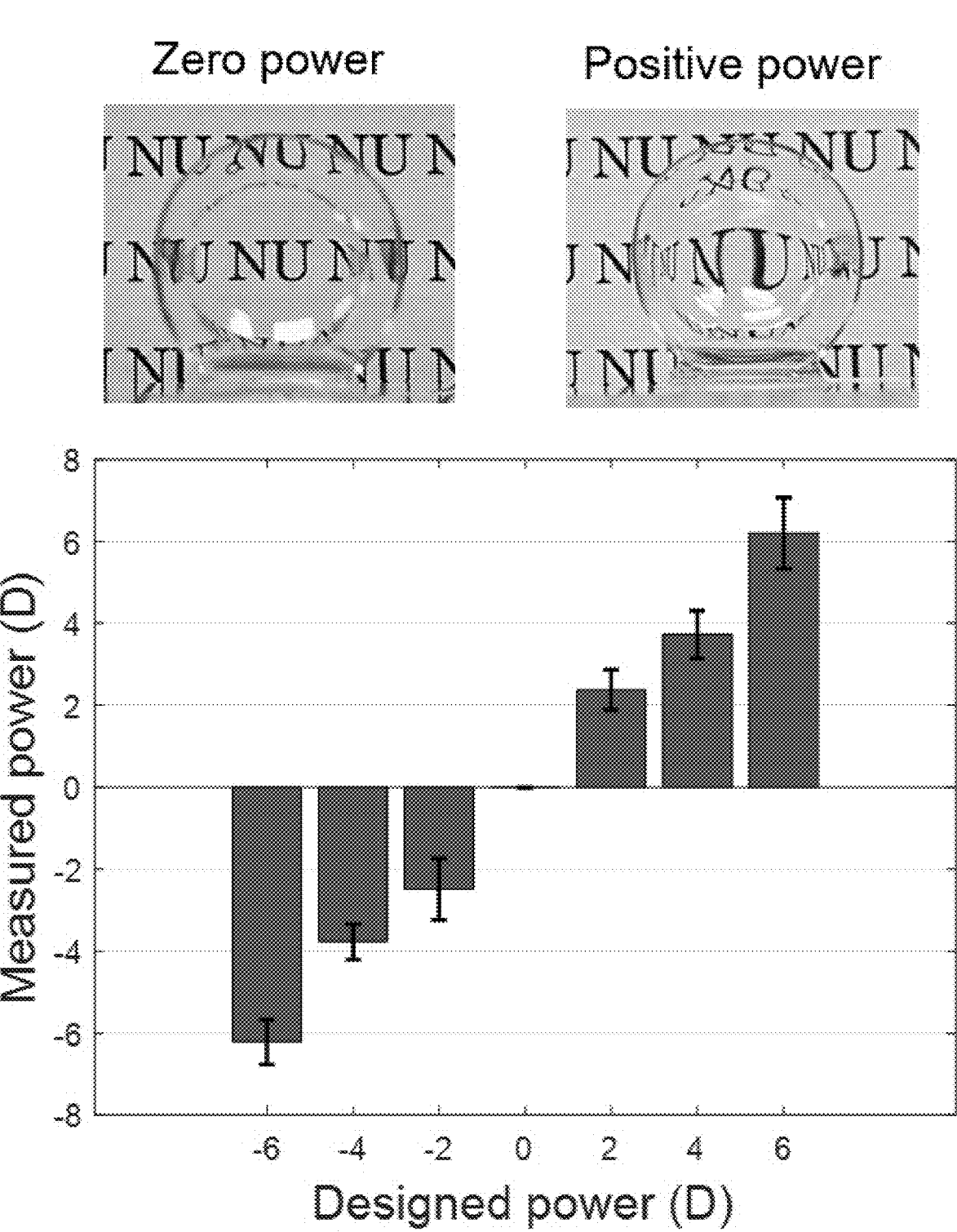
Figure 18:
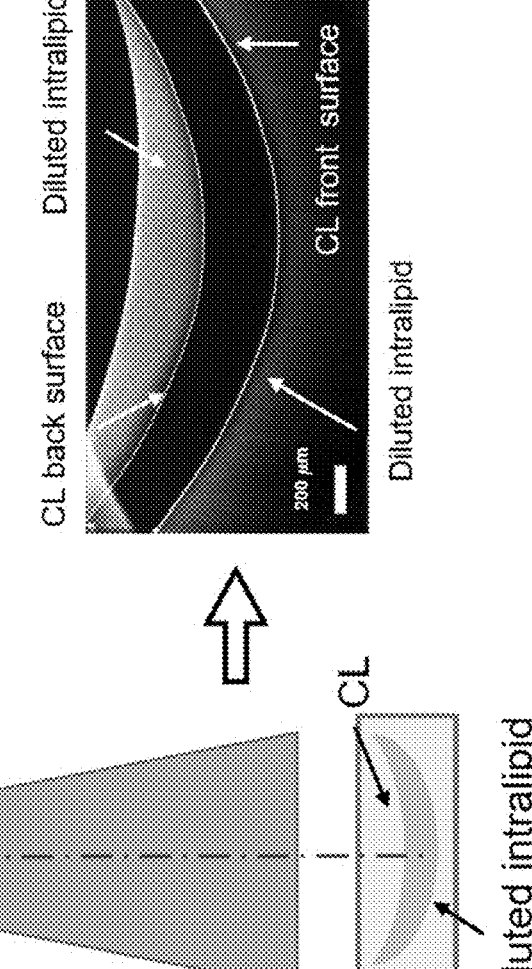
FIG. 18: An OCT image of a contact lens suspended in dilute intralipid. The dilute intralipid generates scattering of the light, which appears as white in the OCT image. At the same time, the contact lens is clear and transparent, and thus appears black in the OCT image. The OCT image clearly shows the anterior and posterior surfaces of the lens.

As shown in FIG. 17B, the measured power of each lens and the designed power of each lens align closely. In the graph, the y axis shows the actual optical power data from the lensometer, while the x axis shows the designed optical power.

STATEMENTS REGARDING INCORPORATION BY REFERENCE AND VARIATIONS

All references throughout this application, for example, patent documents, including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods, and steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomer and enantiomer of the compound described individually or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for additive manufacture of a customized ocular contact lens for a subject, the method comprising steps of:

imaging and acquiring image data of an outer surface of a cornea of the subject using visible-light optical coherence tomography (vis-OCT);

designing the customized ocular contact lens from the image data;

wherein the step of designing comprises:

processing the image data to generate a 3-D computational model of the outer surface of the cornea based on the acquired image data;

determining a posterior surface of the customized ocular contact lens using the 3-D computational model;

determining an anterior surface of the customized ocular contact lens to provide a selected optical power to the customized ocular contact lens; and generating a 3-D printable data set of the customized ocular contact lens comprising the determined posterior surface and the determined anterior surface;

manufacturing the customized ocular contact lens using additive manufacturing based on the 3-D printable data set of the customized ocular contact lens; and verifying a shape of the manufactured customized ocular contact lens by imaging the anterior surface and the posterior surface of the manufactured customized ocular contact lens using visible-light optical coherence tomography.

2. The method of claim 1, wherein imaging the anterior surface and the posterior surface of the manufactured customized ocular contact lens comprises imaging the anterior surface and the posterior surface of the manufactured customized ocular contact lens when the manufactured customized ocular contact lens is wet.

3. The method of claim 1, wherein imaging the anterior surface and the posterior surface of the manufactured customized ocular contact lens comprises imaging the anterior surface and the posterior surface of the manufactured customized ocular contact lens when the manufactured customized ocular contact lens is suspended in a liquid, wherein the liquid is water, oil, or diluted intralipid.

4. The method of claim 1, wherein imaging the anterior surface and the posterior surface of the manufactured customized ocular contact lens comprises imaging the anterior surface and the posterior surface of the manufactured customized ocular contact lens when the manufactured customized ocular contact lens is positioned on and in contact with the cornea of the subject.

5. The method of claim 1, wherein at least one of the steps of processing the image data, determining the posterior surface, determining the anterior surface, generating the 3-D printable data set, and manufacturing the customized ocular contact lens is performed computationally and automatically without human intervention.

6. The method of claim 1, wherein each of the steps of processing the image data, determining the posterior surface, determining the anterior surface, generating the 3-D printable data set, and manufacturing the customized ocular contact lens is performed computationally and automatically without human intervention.

7. The method of claim 1, wherein sharp corners are computationally and automatically removed from the 3-D printable data set.

8. The method of claim 1, wherein processing the image data to generate a 3-D computational model of the outer surface of the cornea comprises:

translating the image data into binarized images;

using a Sobel edge detection function to delineate the cornea from the binarized images; and using a surface fit function to generate the 3-D computational model of the outer surface of the cornea.

9. The method of claim 1, wherein the selected optical power is selected from the range of −6D to +6D.

10. The method of claim 1, wherein the posterior surface is determined to have a shape complementary to a shape of the 3-D computational model.

11. The method of claim 1, wherein a best-fit spherical shape is generated based on the 3-D computational model, and the best-fit spherical shape is used to design the customized ocular contact lens; or wherein the anterior surface is determined using the lensmaker equation.

12. The method of claim 1, wherein the step of designing further comprises determining one or more edge surfaces connecting the anterior surface with the posterior surface.

13. The method of claim 1, wherein the additive manufacturing comprises projection micro-stereolithography (PuSL), micro-continuous liquid interface production (μCLIP), digital light processing (DLP), or any combination thereof.

14. The method of claim 1, wherein the additive manufacturing manufactures the customized ocular contact lens in a vertical orientation, such that each of a majority of printable layers of the customized ocular contact lens comprises a portion of both the posterior surface and the anterior surface.

15. The method of claim 1, wherein the entire method is completed within an hour or less.

16. The method of claim 1, wherein the steps of processing the image data, determining the posterior surface, determining the anterior surface, generating the 3-D printable data set, and manufacturing the customized ocular contact lens are completed within a total time of 30 minutes or less.

17. The method of claim 1, wherein the additive manufacturing has a voxel resolution of 6 μm or less.

18. The method of claim 1, wherein the customized ocular contact lens has a diameter selected from the range of 3 mm to 15 mm; wherein the customized ocular contact lens has a surface roughness of 2 nm of less; wherein the customized ocular contact lens has a thickness selected from the range of 300 μm to 700 μm; or wherein the customized ocular contact lens has a tolerance in thickness of less then 5%.

19. The method of claim 1, wherein the customized ocular contact lens has an absorbance of less than 1% at wavelengths selected from the range of 400 nm to 800 nm.

20. The method of claim 1, wherein the customized ocular contact lens has a refractive index between 1.4 and 1.6 for wavelengths selected from the range of 400 nm to 800 nm.

21. The method of claim 1, wherein the customized ocular contact lens is hydrophilic such that a contact angle of deionized water thereon is selected from the range of 35° to 50°.

22. The method of claim 1, wherein the manufactured customized ocular contact lens has a composition comprising one or more of methacrylate polymers, poly(ethylene glycol) diacrylate, trimethylolpropane ethoxylate triacrylate, ethylene glycol dimethacrylate, avobenzone, Irgacure 819 (phenylbis(2,4,6-trimethylbenzoyl) (phosphine oxide)), or any combination thereof.

23. The method of claim 1, wherein the manufactured customized ocular contact lens is characterized by:

an ultimate tensile strength (UTS) selected from the range of 6 MPa to 900 MPa;

a maximum elongation at failure selected from the range of 8% to 175%;

or any combination thereof.

24. A system for additive manufacture of a customized ocular contact lens, the system comprising:

a visible-light optical coherence tomography (vis-OCT) apparatus configured to perform vis-OCT on a cornea of a subject;

an additive manufacturing apparatus configured to manufacture the customized ocular contact lens; and a non-transitory computer readable medium having stored thereon computer implementable instructions executable by a processor in a computing device configured to:

image and acquire image data of an outer surface of the cornea of the subject using the vis-OCT apparatus;

process the image data to generate a 3-D computational model of the outer surface of the cornea based on the acquired image data;

determine a posterior surface of the customized ocular contact lens using the 3-D computational model;

determine an anterior surface of the customized ocular contact lens to provide a selected optical power to the customized ocular contact lens;

generate a 3-D printable data set of the customized ocular contact lens comprising the determined posterior surface and the determined anterior surface;

manufacture the customized ocular contact lens based on the 3-D printable data set of the customized ocular contact lens using the additive manufacturing apparatus; and verify a shape of the manufactured customized ocular contact lens using the visible-light optical coherency tomography apparatus to image the anterior surface and the posterior surface of the manufactured customized ocular contact lens.

25. The system of claim 24, wherein the additive manufacturing apparatus comprises an apparatus for micro-continuous liquid interface production (μCLIP).

* * * * *